(12) United States Patent
Kim et al.

(10) Patent No.: US 12,475,528 B2
(45) Date of Patent: Nov. 18, 2025

(54) IMAGE AI-CODING METHOD AND DEVICE, AND IMAGE AI-DECODING METHOD AND DEVICE

(71) Applicant: SAMSUNG ELECTRONICS CO., LTD., Suwon-si (KR)

(72) Inventors: Jaehwan Kim, Suwon-si (KR); Jongseok Lee, Suwon-si (KR); Youngo Park, Suwon-si (KR); Chaeeun Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 739 days.

(21) Appl. No.: 17/696,518

(22) Filed: Mar. 16, 2022

(65) Prior Publication Data

US 2022/0207650 A1 Jun. 30, 2022

Related U.S. Application Data

(63) Continuation of application No. PCT/KR2020/012435, filed on Sep. 15, 2020.

(30) Foreign Application Priority Data

Sep. 17, 2019 (KR) .......................... 10-2019-0114363

(51) Int. Cl.
   *G06T 3/4046* (2024.01)
   *G06T 3/4053* (2024.01)
(52) U.S. Cl.
   CPC .......... *G06T 3/4046* (2013.01); *G06T 3/4053* (2013.01)
(58) Field of Classification Search
   CPC ..... G06T 3/4046; G06T 3/4053; G06N 3/045; G06N 3/044; G06N 3/048; G06N 3/084;
   (Continued)

(56) References Cited

U.S. PATENT DOCUMENTS 10,735,748 B2  8/2020  Helle et al.
11,200,702 B2  12/2021  Dinh et al.
(Continued)

FOREIGN PATENT DOCUMENTS

KR  1020180050832 A  5/2018
KR  1020180099914 A  9/2018
(Continued)

OTHER PUBLICATIONS

Jie Dong et al. "Adaptive Downsampling for High Definition Video Coding," XP011542202, IEEE Transactions On Circuits and Systems for Video Technology vol. 24, No. 3, Mar. 2014, (9 Total Pages) (Year: 2014).*
Salvador J, "Chapter 8 Deep Learning, Elsevier Science & Technology," XP093003546, 2016, (15 total pages) (Year: 2016).*
(Continued)

*Primary Examiner* — Van D Huynh
(74) *Attorney, Agent, or Firm* — Sughrue Mion, PLLC

(57) ABSTRACT

An AI decoding apparatus includes a memory storing instructions and a processor configured to execute the instructions to obtain AI data related to AI down-scaling of an original image and image data generated as a result of encoding a first image, obtain a second image corresponding to the first image by decoding the image data, determine a resolution ratio in a horizontal direction and a resolution ratio in a vertical direction between the original image and the first image, based on the AI data, and obtain, by an up-scaling deep neural network (DNN), a third image in which a resolution in at least one of a horizontal direction and a vertical direction is increased from the second image based on the resolution ratio in the horizontal direction and the resolution ratio in the vertical direction.

11 Claims, 36 Drawing Sheets

(58) Field of Classification Search
CPC ........ G06N 3/063; G06N 3/08; H04N 19/132; H04N 19/59; H04N 19/147; H04N 19/423
See application file for complete search history.

(56) References Cited

U.S. PATENT DOCUMENTS

| | | | |
|---|---|---|---|
| 2006/0164698 A1* | 7/2006 | Kurumisawa | G09G 3/3611 358/515 |
| 2007/0127847 A1* | 6/2007 | Aoki | H04N 1/3871 382/298 |
| 2007/0183687 A1* | 8/2007 | Nishimura | G06T 3/4007 382/300 |
| 2012/0026288 A1* | 2/2012 | Tourapis | H04N 19/597 348/43 |
| 2015/0042878 A1* | 2/2015 | Jeon | H04N 7/0117 348/441 |
| 2015/0193913 A1* | 7/2015 | Funada | G09G 5/005 345/658 |
| 2018/0205967 A1 | 7/2018 | Kim et al. | |
| 2018/0276850 A1* | 9/2018 | Igarashi | G06T 7/97 |
| 2019/0075301 A1* | 3/2019 | Chou | H04N 19/132 |
| 2020/0014603 A1* | 1/2020 | Kuo | H04L 65/765 |
| 2020/0053362 A1* | 2/2020 | Fu | G06N 3/045 |
| 2020/0059667 A1 | 2/2020 | Lee | |
| 2020/0162751 A1 | 5/2020 | Kim et al. | |
| 2022/0030260 A1 | 1/2022 | Park et al. | |
| 2022/0030291 A1 | 1/2022 | Park et al. | |

FOREIGN PATENT DOCUMENTS

| | | |
|---|---|---|
| KR | 1020180103732 A | 9/2018 |
| KR | 102022648 B1 | 9/2019 |
| KR | 1020200044661 A | 4/2020 |
| KR | 1020200044662 A | 4/2020 |
| WO | 2016/132152 A1 | 8/2016 |
| WO | 2017034311 A1 | 3/2017 |
| WO | 2019009490 A1 | 1/2019 |
| WO | 2020/080782 A1 | 4/2020 |

OTHER PUBLICATIONS

Jie Dong et al. "Adaptive Downsampling for High-Definition Video Coding," XP011542202, IEEE Transactions On Circuits and Systems for Video Technology vol. 24, No. 3, Mar. 2014, (9 Total Pages).

Salvador J, "Chapter 8 Deep Learning, Elsevier Science & Technology," XP093003546, 2016, (15 total pages).

Heewon Kim et al, "Task-Aware Image Downscaling," XP055857073, EECV 2020, vol. 11208, Department of ECE, ASRI, Seoul National University, Seoul Korea, (16 total pages).

Yue Li et al, "Learning a Convolutional Neural Network for Image Compact-Resolution," XP011703593, IEEE Transactions on Image Processing, vol. 28, No. 3, Mar. 2019, (16 Total Pages).

Feng Jiang et al, "An End-to-End Compression Framework Based on Convolutional Networks," XP080951105, Submitted to IEEE Transactions On Circuits and Systems For Video Technology, Aug. 2, 2017, (13 Total Pages).

Feng Wu et al. "Description of SDR video coding technology proposal by University of Science and Technology of China, Peking University, Harbin Institute of Technology, and Wuhan University (IEEE 1857.10 Study Group)," XP030248163, JVET-J0032-v2, Joint Video Experts Team (JVET), Apr. 2018, (48 Pages).

Viet-Anh Nguyen, et al., "Adaptive Downsampling/ Upsampling for Better Video Compression at Low Bit Rate," XP031392300, 2008, IEEE, (4 Total Pages).

Mariana Afonso et al, "Spatial Resolution Adaptation Framework for Video Compression," University of Bristol, Merchant Ventures Building, Woodland Road BS8 1UB, Bristol, United Kingdom, XP060110653, Proc. of SPIE vol. 10752, (10 Total Pages), 2018.

European Search Report, dated Dec. 8, 2022, issued by the European Patent Office, Application No. 20866485.4.

Notice of Allowance dated Sep. 16, 2020 issued by the Korean Intellectual Property Office in application No. 10-2019-0114363.

Communication (PCT/IB/373, PCT/ISA/220, PCT/ISA/210, and PCT/ISA/237) dated Nov. 30, 2020 issued by the International Searching Authority in International Application No. PCT/KR2020/012435.

Notice of Allowance dated Jul. 22, 2025, issued by EP Patent Office in EP Patent App. No. 20 866 485.4.

* cited by examiner

FIG. 5

| IMAGE-RELATED INFORMATION | DNN SETTING INFORMATION |
|---|---|
| SD, 10Mbps, AV1 | A DNN SETTING INFORMATION |
| HD, 15Mbps, H.264 | B DNN SETTING INFORMATION |
| Full HD, 20Mbps, HEVC | C DNN SETTING INFORMATION |
| Full HD, 15Mbps, HEVC | D DNN SETTING INFORMATION |

FIG. 14

| INDEX | RESOLUTION RATIO IN HORIZONTAL DIRECTION | RESOLUTION RATIO IN VERTICAL DIRECTION |
|---|---|---|
| 0 | 1/2 | 1 |
| 1 | 1 | 1/2 |
| 2 | 1/4 | 1 |
| 3 | 1 | 1/4 |
| 4 | 1/4 | 1/2 |
| 5 | 1/2 | 1/4 |

FIG. 15

| IMAGE-RELATED INFORMATION, RESOLUTION RATIOS IN HORIZONTAL DIRECTION AND VERTICAL DIRECTION | DNN SETTING INFORMATION |
|---|---|
| SD, 10Mbps, AV1, 1/2, 1 | A DNN SETTING INFORMATION |
| SD, 10Mbps, AV1, 1, 1/2 | B DNN SETTING INFORMATION |
| SD, 10Mbps, AV1, 1/4, 1 | C DNN SETTING INFORMATION |
| SD, 10Mbps, AV1, 1, 1/4 | D DNN SETTING INFORMATION |
| HD, 15Mbps, H.264, 1/2, 1 | E DNN SETTING INFORMATION |
| HD, 15Mbps, H.264, 1, 1/2 | F DNN SETTING INFORMATION |
| HD, 15Mbps, H.264, 1/4, 1 | G DNN SETTING INFORMATION |
| HD, 15Mbps, H.264, 1, 1/4 | H DNN SETTING INFORMATION |

FIG. 16

| RESOLUTION RATIO IN HORIZONTAL DIRECTION | RESOLUTION RATIO IN VERTICAL DIRECTION | NUMBER OF FIRST INTERMEDIATE IMAGES | NUMBER OF SECOND INTERMEDIATE IMAGES |
|---|---|---|---|
| 1/2 | 1 | 2 | 4 |
| 1 | 1/2 | 2 | 4 |
| 1/4 | 1 | 4 | 16 |
| 1 | 1/4 | 4 | 16 |
| 1/4 | 1/2 | 2 | 16 |
| 1/2 | 1/4 | 2 | 16 |

FIG. 30

| RESOLUTION RATIO IN HORIZONTAL DIRECTION | RESOLUTION RATIO IN VERTICAL DIRECTION | NUMBER OF FIRST INTERMEDIATE IMAGES | NUMBER OF SECOND INTERMEDIATE IMAGES |
|---|---|---|---|
| 1/2 | 1 | 4 | 2 |
| 1 | 1/2 | 4 | 2 |
| 1/4 | 1 | 16 | 4 |
| 1 | 1/4 | 16 | 4 |
| 1/4 | 1/2 | 16 | 2 |
| 1/2 | 1/4 | 16 | 2 |

IMAGE AI-CODING METHOD AND DEVICE, AND IMAGE AI-DECODING METHOD AND DEVICE

CROSS-REFERENCE TO RELATED APPLICATION(S)

This application is a by-pass continuation of International Application No. PCT/KR2020/012435, filed on Sep. 15, 2020, in the Korean Intellectual Property Receiving Office, which is based on and claims priority to Korean Patent Application No. 10-2019-0114363, filed on Sep. 17, 2019, in the Korean Intellectual Property Office, the disclosures of which are incorporated by reference herein in their entireties.

BACKGROUND

1. Field

The disclosure relates to the fields of image processing and, more particularly, to methods and apparatuses for encoding and decoding images based on artificial intelligence (AI).

2. Description of Related Art

An image is encoded by a codec conforming to a certain data compression standard, for example, the moving picture expert group (MPEG) standard, and then stored in a recording medium or transmitted through a communication channel, in the form of a bitstream.

With the development and supply of hardware capable of reproducing and storing high-resolution/high-quality images, the necessity for a codec capable of effectively encoding and decoding the high-resolution/high-quality images is increasing.

SUMMARY

Provided are an image artificial intelligence (AI) encoding method and apparatus, and an image AI decoding method and apparatus, according to an embodiment, for encoding and decoding an image based on AI, so as to achieve a low bitrate.

Also provided are an image AI encoding method and apparatus, and an image AI decoding method and apparatus, according to an embodiment, for preventing occurrence of information omission in a reconstructed image compared to an original image.

Additional aspects will be set forth in part in the description which follows and, in part, will be apparent from the description, or may be learned by practice of the presented embodiments.

In accordance with an aspect of the disclosure, an AI decoding apparatus may include a memory storing instructions and a processor configured to execute the instructions to obtain AI data related to AI down-scaling of an original image and image data generated as a result of encoding a first image, obtain a second image corresponding to the first image by decoding the image data, determine a resolution ratio in a horizontal direction and a resolution ratio in a vertical direction between the original image and the first image, based on the AI data, and obtain, by an up-scaling deep neural network (DNN), a third image in which a resolution in at least one of a horizontal direction and a vertical direction is increased from the second image based on the resolution ratio in the horizontal direction and the resolution ratio in the vertical direction. The resolution ratio in the horizontal direction and the resolution ratio in the vertical direction may be determined as different values.

In accordance with an aspect of the disclosure, an AI decoding apparatus may include a memory storing instructions and a processor configured to execute the instructions to determine a resolution ratio in a horizontal direction and a resolution ratio in a vertical direction between an original image and a first image, obtain, by a down-scaling DNN, the first image, in which a resolution in at least one of a horizontal direction and a vertical direction is decreased from the original image based on the resolution ratio in the horizontal direction and the resolution ratio in the vertical direction, obtain image data by encoding the first image, and transmit the image data and AI data including information indicating the resolution ratio in the horizontal direction and the resolution ratio in the vertical direction. The resolution ratio in the horizontal direction and the resolution ratio in the vertical direction may be determined as different values.

An image AI encoding method and apparatus, and an image AI decoding method and apparatus, according to an embodiment, may process an image at a low bitrate, using AI-based image encoding and decoding.

Also, an image AI encoding method and apparatus, and an image AI decoding method and apparatus, according to an embodiment, may prevent occurrence of information omission in a reconstructed image compared to an original image.

However, effects achievable by an image AI encoding method and apparatus, and an image AI decoding method and apparatus, according to an embodiment, are not limited to those mentioned above, and other effects that not mentioned could be clearly understood by one of ordinary skill in the art from the following description.

BRIEF DESCRIPTION OF DRAWINGS

The above and other aspects, features, and advantages of certain embodiments of the present disclosure will be more apparent from the following description taken in conjunction with the accompanying drawings, in which:

FIG. 5 is a diagram of a mapping relationship between several pieces of image-related information and several pieces of DNN setting information, according to an embodiment.

FIG. 14 is a diagram of a resolution ratio of a first image in a horizontal direction and a resolution ratio of the first image in a vertical direction, which are indicated by an index, according to an embodiment.

FIG. 15 is a diagram of DNN setting information mapped to image-related information and resolution ratios of a first image in a horizontal direction and vertical direction, according to an embodiment.

FIG. 16 is a diagram of the numbers of first intermediate images and second intermediate images related to a second DNN vary according to resolution ratios of a first image in a horizontal direction and vertical direction, according to an embodiment.

FIG. 30 is a diagram of the numbers of first intermediate images and second intermediate images related to a first DNN vary according to resolution ratios of a first image in a horizontal direction and vertical direction, according to an embodiment.

DETAILED DESCRIPTION

Figure 1:
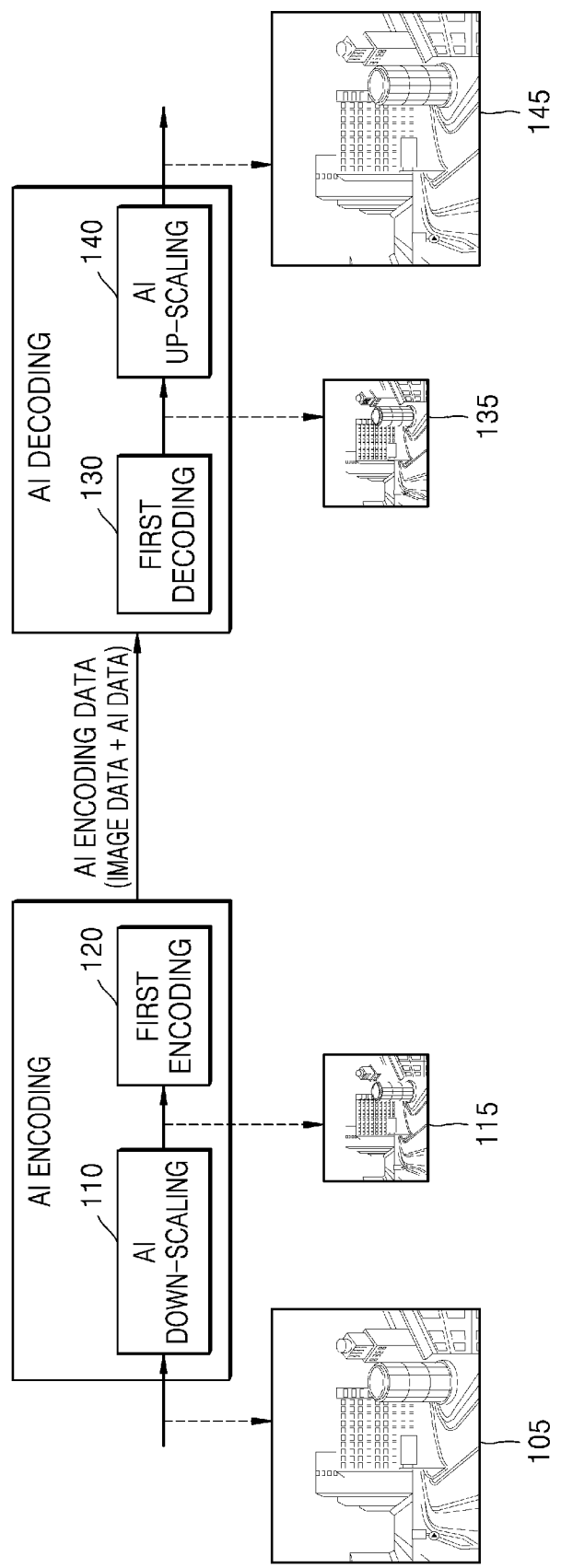
FIG. 1 is a diagram of an artificial intelligence (AI) encoding process and an AI decoding process, according to an embodiment.

An artificial intelligence (AI) decoding apparatus according to an embodiment includes a memory storing one or more instructions, and a processor configured to execute the one or more instructions stored in the memory, where the processor is further configured to obtain AI data related to AI down-scaling of an original image, and image data generated as a result of encoding a first image, obtain a second image corresponding to the first image by decoding the image data, determine a resolution ratio in a horizontal direction and a resolution ratio in a vertical direction, between the original image and the first image, based on the AI data, and obtain, via an up-scaling deep neural network (DNN), a third image, in which a resolution in at least one of a horizontal direction and a vertical direction is increased from the second image according to the resolution ratio in the horizontal direction and the resolution ratio in the vertical direction, where the resolution ratio in the horizontal direction and the resolution ratio in the vertical direction are determined as different values.

The processor may be configured to obtain, from the second image, a plurality of first intermediate images having a resolution lower than that of the second image, obtain a plurality of second intermediate images output from the up-scaling DNN, based on the plurality of first intermediate images, and obtain the third image having a resolution greater than that of the plurality of second intermediate images by combining the plurality of second intermediate images.

The processor may be configured to obtain the plurality of first intermediate images including some pixel lines from among pixel lines included in the second image.

The processor may be configured to obtain the third image by alternately connecting pixels included in the plurality of second intermediate images.

The processor may be configured to determine a number of the plurality of first intermediate images and a number of the plurality of second intermediate images, based on the resolution ratio in the horizontal direction and the resolution ratio in the vertical direction, and obtain DNN setting information allowing the up-scaling DNN to output the determined number of the plurality of second intermediate images by processing the determined number of the plurality of first intermediate images.

The up-scaling DNN may include a plurality of convolution layers, and when the obtained DNN setting information is set in the up-scaling DNN, a number of filter kernels of a last convolution layer from among the plurality of convolution layers may be determined to be the same as the number of the plurality of second intermediate images.

The processor may be configured to determine a number of operations of the up-scaling DNN, based on the resolution ratio in the horizontal direction and the resolution ratio in the vertical direction, and obtain the third image by combining the plurality of second intermediate images output from the up-scaling DNN as a result of operations performed according to the number of operations, where the up-scaling DNN may output a pre-determined number of the plurality of second intermediate images by processing a pre-determined number of the plurality of first intermediate images.

When the up-scaling DNN operates to increase one of a resolution of the second image in a horizontal direction and a resolution of the second image in a vertical direction by n times, where n is a natural number, the processor may be configured to determine the number of operations of the up-scaling DNN to be a+b when the resolution ratio in the horizontal direction is $1/n^a$ and the resolution ratio in the vertical direction is $1/n^b$, where a and b are each an integer equal to or greater than 0.

The processor may be configured to combine the plurality of second intermediate images obtained as a result of a previous operation of the up-scaling DNN while the up-scaling DNN operates according to the determined number of operations, and input a plurality of first intermediate images obtained from an image to which the plurality of second intermediate images are combined to the up-scaling DNN.

The processor may be configured to scale the second image, and obtain a final third image by adding the scaled second image and the third image.

The first image may be obtained as a result of AI down-scaling of the original image via a down-scaling DNN, and DNN setting information set in the down-scaling DNN and DNN setting information set in the up-scaling DNN may be jointly trained.

An AI encoding apparatus according to an embodiment includes a memory storing one or more instructions, and a processor configured to execute the one or more instructions stored in the memory, where the processor is configured to determine a resolution ratio in a horizontal direction and a resolution ratio in a vertical direction between an original image and a first image, obtain, via a down-scaling DNN, a first image, in which a resolution in at least one of a horizontal direction and a vertical direction is decreased from the original image according to the resolution ratio in the horizontal direction and the resolution ratio in the vertical direction, obtain image data by encoding the first image, and transmit the image data and AI data including information indicating the resolution ratio in the horizontal direction and the resolution ratio in the vertical direction, where the resolution ratio in the horizontal direction and the resolution ratio in the vertical direction are determined as different values.

The processor may be configured to determine the resolution ratio in the horizontal direction and the resolution ratio in the vertical direction, based on edge intensity of the original image in a horizontal direction and edge intensity of the original image in a vertical direction.

The processor may be configured to determine a resolution ratio in a direction in which edge intensity is greater from among the horizontal direction and the vertical direction of the original image to be greater than a resolution ratio in another direction.

The processor may be configured to determine an arrangement direction of a text present in the original image, and determine the resolution ratio in the horizontal direction and the resolution ratio in the vertical direction, based on the determined arrangement direction.

The processor may be configured to determine a resolution ratio in a direction closer to the arrangement direction of the text from among the horizontal direction and the vertical direction of the original image to be greater than a resolution ratio in another direction.

An AI decoding method according to an embodiment includes obtaining AI data related to AI down-scaling of an original image, and image data generated as result of encoding a first image, obtaining a second image corresponding to the first image by decoding the image data, determining a resolution ratio in a horizontal direction and a resolution ratio in a vertical direction, between the original image and the first image, based on the AI data, and obtaining, via an up-scaling DNN, a third image, in which a resolution in at least one of a horizontal direction and a vertical direction is increased from the second image according to the resolution ratio in the horizontal direction and the resolution ratio in the vertical direction, where the resolution ratio in the horizontal direction and the resolution ratio in the vertical direction are determined as different values.

An AI encoding method according to an embodiment includes determining a resolution ratio in a horizontal direction and a resolution ratio in a vertical direction between an original image and a first image, obtaining, via a down-scaling DNN, a first image, in which a resolution in at least one of a horizontal direction and a vertical direction is decreased from the original image according to the resolution ratio in the horizontal direction and the resolution ratio in the vertical direction, obtaining image data by encoding the first image, and transmitting the image data and AI data including information indicating the resolution ratio in the horizontal direction and the resolution ratio in the vertical direction, where the resolution ratio in the horizontal direction and the resolution ratio in the vertical direction are determined as different values.

As the disclosure allows for various changes and numerous examples, particular embodiments will be illustrated in the drawings and described in detail in the written description. However, this is not intended to limit the disclosure to particular modes of practice, and it will be understood that all changes, equivalents, and substitutes that do not depart from the spirit and technical scope of the disclosure are encompassed in the disclosure.

In the description of embodiments, certain detailed explanations of related art are omitted when it is deemed that they may unnecessarily obscure the essence of the disclosure. Also, numbers (for example, a first, a second, and the like) used in the description of the specification are merely identifier codes for distinguishing one element from another.

Also, in the present specification, it will be understood that when elements are "connected" or "coupled" to each other, the elements may be directly connected or coupled to each other, but may alternatively be connected or coupled to each other with an intervening element therebetween, unless specified otherwise.

In the present specification, regarding an element represented as a "unit" or a "module", two or more elements may be combined into one element or one element may be divided into two or more elements according to subdivided functions. In addition, each element described hereinafter may additionally perform some or all of functions performed by another element, in addition to main functions of itself, and some of the main functions of each element may be performed entirely by another component.

In the present specification, an 'image' or a 'picture' may denote a still image, a moving image including a plurality of continuous still images (or frames), or a video.

Also, in the present specification, a DNN is a representative example of an artificial neural network model simulating brain nerves, and is not limited to an artificial neural network model using a specific algorithm.

Also, in the present specification, a 'parameter' is a value used in an operation process of each layer forming a neural network, and for example, may include a weight used when an input value is applied to a certain operation expression. Here, the parameter may be expressed in a matrix form. The parameter is a value set as a result of training, and may be updated through separate training data when necessary.

Also, in the present specification, a 'first DNN' indicates a DNN used for AI down-scaling an image, and a 'second DNN' indicates a DNN used for AI up-scaling an image.

Also, in the present specification, 'DNN setting information' includes the parameter described above as information related to an element constituting a DNN. The first DNN or the second DNN may be set by using the DNN setting information.

Also, in the present specification, an 'original image' denotes an image to be AI encoded, and a 'first image' denotes an image obtained as a result of performing AI down-scaling on the original image during an AI encoding process. Also, a 'second image' denotes an image obtained via first decoding during an AI decoding process, and a 'third image' denotes an image obtained by AI up-scaling the second image during the AI decoding process.

In addition, in the present specification, a 'first intermediate image' denotes an image input to the first DNN and the second DNN, and a 'second intermediate image' denotes an image output from the first DNN and the second DNN.

Also, in the present specification, 'AI down-scale' denotes a process of decreasing resolution of an image based on AI, and 'first encoding' denotes an encoding process according to an image compression method based on frequency transformation. Also, 'first decoding' denotes a decoding process according to an image reconstruction method based on frequency transformation, and 'AI up-scale' denotes a process of increasing resolution of an image based on AI.

FIG. 1 is a diagram of an artificial intelligence (AI) encoding process and an AI decoding process, according to an embodiment.

As described above, when a resolution of an image remarkably increases, the throughput of information for encoding and decoding the image is increased, and accordingly, a method for improving encoding and decoding of an image is required.

As shown in FIG. 1, according to an embodiment of the disclosure, a first image 115 is generated by performing AI down-scaling 110 on an original image 105 having a high resolution. Then, first encoding 120 and first decoding 130 are performed on the first image 115 having a relatively low resolution, and thus a bitrate may be largely reduced compared to when the first encoding 120 and the first decoding 130 are performed on the original image 105.

In detail, referring to FIG. 1, the first image 115 is obtained by performing the AI down-scaling 110 on the original image 105 and the first encoding 120 is performed on the first image 115 during the AI encoding process, according to an embodiment. During the AI decoding process, AI encoding data including AI data and image data, which are obtained as a result of AI encoding, is received, a second image 135 is obtained via the first decoding 130, and a third image 145 is obtained by performing AI up-scaling 140 on the second image 135.

Referring to the AI encoding process in detail, when the original image 105 is input, the AI down-scaling 110 is performed on the original image 105 to obtain the first image 115 of a certain resolution or certain quality. Here, the AI down-scaling 110 is performed based on AI, and AI for the AI down-scaling 110 needs to be jointly trained with AI for the AI up-scaling 140 of the second image 135. This is because, when the AI for the AI down-scaling 110 and the AI for the AI up-scaling 140 are separately trained, a difference between the original image 105 to be AI encoded and the third image 145 reconstructed through AI decoding is increased.

In an embodiment of the disclosure, the AI data may be used to maintain such a relationship during the AI encoding process and the AI decoding process. Accordingly, the AI data obtained through the AI encoding process may include information indicating an up-scaling target, and during the AI decoding process, the AI up-scaling 140 is performed on the second image 135 according to the up-scaling target verified based on the AI data.

The AI for the AI down-scaling 110 and the AI for the AI up-scaling 140 may be embodied as a DNN. As will be described below with reference to FIG. 9, because a first DNN and a second DNN are jointly trained by sharing loss information under a certain target, an AI encoding apparatus may provide target information used during joint training of the first DNN and the second DNN to an AI decoding apparatus, and the AI decoding apparatus may perform the AI up-scaling 140 on the second image 135 to a target resolution, based on the provided target information.

Regarding the first encoding 120 and the first decoding 130 of FIG. 1, the first image 115 obtained by performing AI down-scaling 110 on the original image 105 may have a reduced information amount through the first encoding 120. The first encoding 120 may include a process of generating prediction data by predicting the first image 115, a process of generating residual data corresponding to a difference between the first image 115 and the prediction data, a process of transforming the residual data of a spatial domain component to a frequency domain component, a process of quantizing the residual data transformed to the frequency domain component, and a process of entropy-encoding the quantized residual data. Such a process of the first encoding 120 may be realized using one of image compression methods using frequency transform, such as moving picture expert group (MPEG)-2, H.264 advanced video coding (AVC), MPEG-4, high efficiency video coding (HEVC), VC-1, VP8, VP9, and AOMedia video 1 (AV1).

The second image 135 corresponding to the first image 115 may be reconstructed by performing the first decoding 130 on the image data. The first decoding 130 may include a process of generating the quantized residual data by entropy-decoding the image data, a process of inverse-quantizing the quantized residual data, a process of transforming the residual data of the frequency domain component to the spatial domain component, a process of generating the prediction data, and a process of reconstructing the second image 135 by using the prediction data and the residual data. Such a process of the first decoding 130 may be realized using an image reconstruction method corresponding to one of the image compression methods using frequency transform, such as MPEG-2, H.264, MPEG-4, HEVC, VC-1, VP8, VP9, and AV1.

The AI encoding data obtained through the AI encoding process may include the image data obtained as a result of performing the first encoding 120 on the first image 115, and the AI data related to the AI down-scaling 110 of the original image 105. The image data may be used during the first decoding 130 and the AI data may be used during the AI up-scaling 140.

The image data may be transmitted in a form of a bitstream. The image data may include data obtained based on pixel values in the first image 115, for example, residual data that is a difference between the first image 115 and prediction data of the first image 115. Also, the image data includes information used during the first encoding 120 performed on the first image 115. For example, the image data may include prediction mode information used to perform the first encoding 120 on the first image 115, motion information, and information related to a quantization parameter used during the first encoding 120. The image data may be generated according to a rule, for example, syntax, of an image compression method used during the first encoding 120 from among the image compression methods using frequency transform, such as MPEG-2, H.264 AVC, MPEG-4, HEVC, VC-1, VP8, VP9, and AV1.

The AI data is used in the AI up-scaling 140 based on the second DNN. As described above, because the first DNN and the second DNN are jointly trained, the AI data includes information enabling the AI up-scaling 140 to be performed accurately on the second image 135 through the second DNN. During the AI decoding process, the AI up-scaling 140 may be performed on the second image 135 to have the targeted resolution and/or quality, based on the AI data.

The AI data may be transmitted together with the image data in a form of a bitstream. Alternatively, according to an embodiment, the AI data may be transmitted separately from the image data, in a form of a frame or a packet. The AI data and the image data obtained as a result of the AI encoding may be transmitted through a same network or through different networks.

Figure 2:
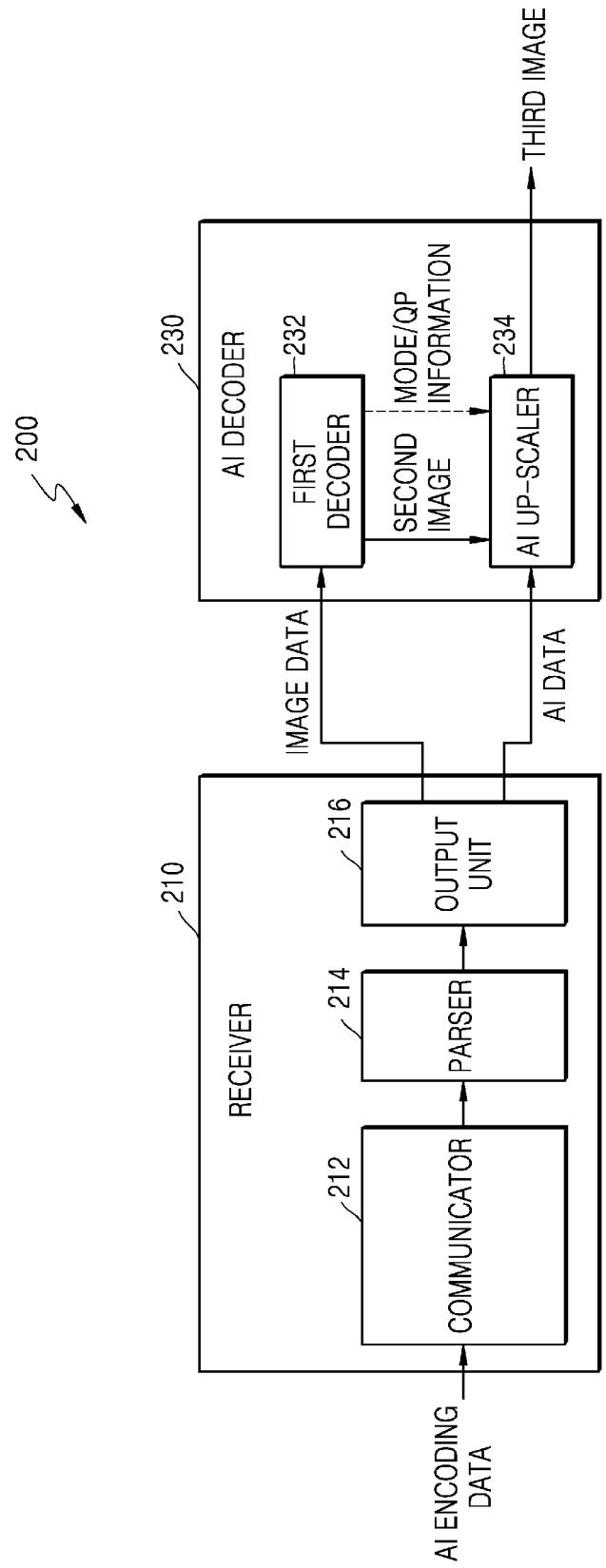
FIG. 2 is a block diagram of a configuration of an AI decoding apparatus, according to an embodiment.

FIG. 2 is a block diagram of a configuration of an AI decoding apparatus, according to an embodiment.

Referring to FIG. 2, the AI decoding apparatus 200 according to an embodiment may include a receiver 210 and an AI decoder 230. The receiver 210 may include a communicator 212, a parser 214, and an output unit 216. The AI decoder 230 may include a first decoder 232 and an AI up-scaler 234.

The receiver 210 receives and parses AI encoding data obtained as a result of AI encoding, and distinguishably outputs image data and AI data to the AI decoder 230.

In particular, the communicator 212 receives the AI encoding data obtained as the result of AI encoding through a network. The AI encoding data obtained as the result of AI encoding includes the image data and the AI data. The image data and the AI data may be received through a same type of network or different types of networks.

The parser 214 receives the AI encoding data received through the communicator 212 and parses the AI encoding data to distinguish the image data and the AI data. For example, the parser 214 may distinguish the image data and the AI data by reading a header of data obtained from the communicator 212. According to an embodiment, the parser 214 distinguishably transmits the image data and the AI data to the output unit 216 via the header of the data received through the communicator 212, and the output unit 216 transmits the distinguished data to the first decoder 232 and the AI up-scaler 234. Here, the image data included in the AI encoding data may be verified to be image data obtained using a certain codec (for example, MPEG-2, H.264, MPEG-4, HEVC, VC-1, VP8, VP9, or AV1). In this case, corresponding information may be transmitted to the first decoder 232 through the output unit 216 such that the image data is processed using the verified codec.

According to an embodiment, the AI encoding data parsed by the parser 214 may be obtained from a data storage medium including a magnetic medium such as a hard disk, a floppy disk, or a magnetic tape, an optical recording medium such as CD-ROM or DVD, or a magneto-optical medium such as a floptical disk.

The first decoder 232 reconstructs the second image 135 corresponding to the first image 115, based on the image data. The second image 135 obtained by the first decoder 232 is provided to the AI up-scaler 234. According to an embodiment, first decoding-related information, such as prediction mode information, motion information, quantization parameter information, or the like included in the image data may be further provided to the AI up-scaler 234.

Upon receiving the AI data, the AI up-scaler 234 performs AI up-scaling on the second image 135, based on the AI data. According to an embodiment, the AI up-scaling may be performed by further using the first decoding-related information, such as the prediction mode information, the quantization parameter information, or the like included in the image data.

The receiver 210 and the AI decoder 230 according to an embodiment are described as individual devices, but may be realized through one processor. In this case, the receiver 210 and the AI decoder 230 may be realized by dedicated processors, or may be realized by a combination of software (S/W) and an application processor (AP) or a general-purpose processor, such as a central processing unit (CPU) or graphics processing unit (GPU). The dedicated processor may be realized by including a memory for implementing an embodiment of the disclosure or by including a memory processor for using an external memory.

Also, the receiver 210 and the AI decoder 230 may be configured by one or more processors. In this case, the receiver 210 and the AI decoder 230 may be realized through a combination of dedicated processors or through a combination of S/W and an AP or a plurality of general-purpose processors, such as CPUs or GPUs. Similarly, the AI up-scaler 234 and the first decoder 232 may be realized by different processors.

The AI data provided to the AI up-scaler 234 includes information enabling the second image 135 to be AI up-scaled. Here, an up-scaling target should correspond to down-scaling of a first DNN. Accordingly, the AI data includes information for verifying a down-scaling target of the first DNN.

Examples of the information included in the AI data include difference information between a resolution of the original image 105 and a resolution of the first image 115, and information related to the first image 115.

The difference information may be expressed as information about a resolution conversion degree of the first image 115 compared to the original image 105 (for example, resolution conversion rate information). Also, because the resolution of the first image 115 is verified through the resolution of the reconstructed second image 135 and the resolution conversion degree is verified accordingly, the difference information may be expressed only as resolution information of the original image 105. Here, the resolution information may be expressed as an aspect ratio or as a ratio (16:9, 4:3, or the like) and a size of one axis. Also, when there is pre-set resolution information, the resolution information may be expressed in a form of an index or flag.

The information related to the first image 115 may include information about at least one of a bitrate of the image data obtained as a result of first encoding of the first image 115, and a codec type used during the first encoding of the first image 115.

The AI up-scaler 234 may determine the up-scaling target of the second image 135, based on at least one of the difference information and the information related to the first image 115, which are included in the AI data. The up-scaling target may indicate, for example, to what degree resolution is to be up-scaled for the second image 135. When the up-scaling target is determined, the AI up-scaler 234 performs AI up-scaling on the second image 135 through a second DNN to obtain the third image 145 corresponding to the up-scaling target.

Before describing a method, performed by the AI up-scaler 234, of performing AI up-scaling on the second image 135 according to the up-scaling target, an AI up-scaling process through the second DNN will be described with reference to FIGS. 3 and 4.

Figure 3:
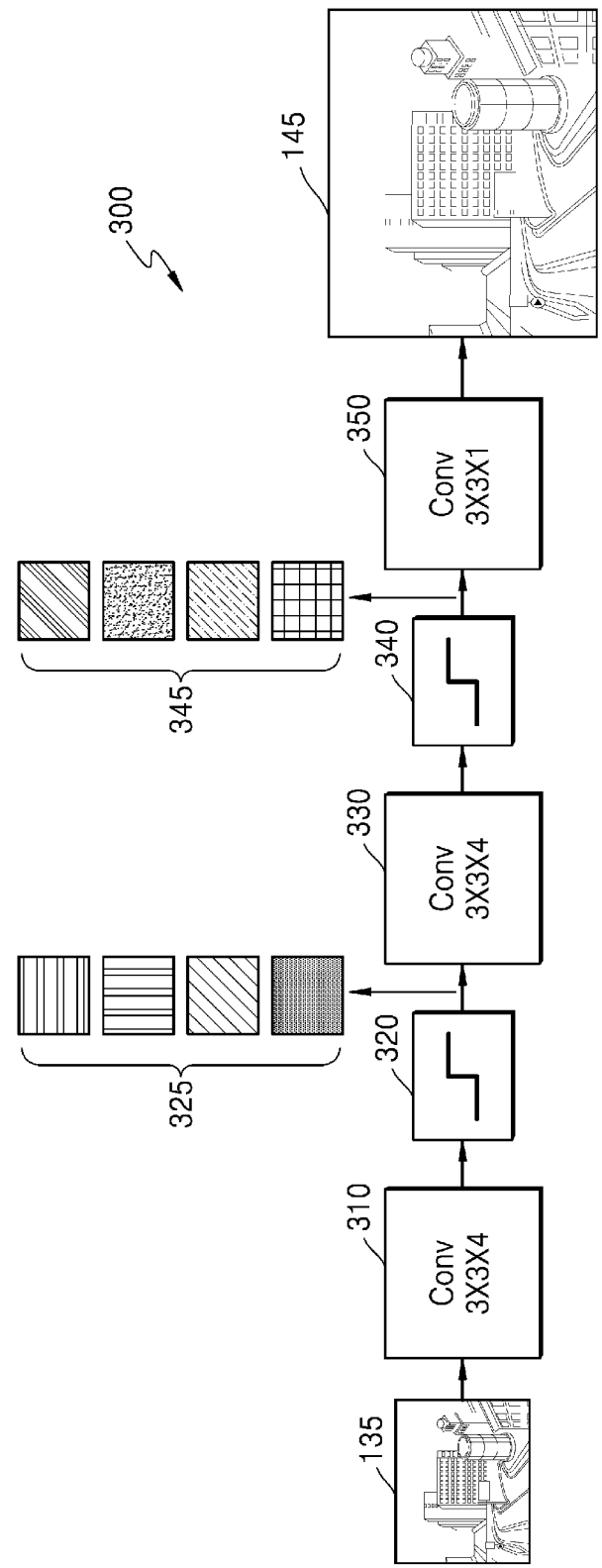
FIG. 3 is a diagram of a second deep neural network (DNN) for AI up-scaling of a second image, according to an embodiment.

FIG. 3 is a diagram of a second deep neural network (DNN) for AI up-scaling of a second image, according to an embodiment. FIG. 4 is a diagram of a convolution operation by a convolution layer, according to an embodiment.

As shown in FIG. 3, the second image 135 is input to the first convolution layer 310. 3×4×4 indicated in the first convolution layer 310 shown in FIG. 3 indicates that a convolution process is performed on one input image by using four filter kernels having a size of 3×3. As a result of the convolution process, four feature maps are generated by the four filter kernels. Each feature map indicates unique features of the second image 135. For example, each feature map may indicate a vertical direction feature, a horizontal direction feature, or an edge feature of the second image 135.

A convolution operation in the first convolution layer 310 will be described in detail with reference to FIG. 4.

One feature map 450 may be generated via multiplication and addition between parameters of a filter kernel 430 having a size of 3×3 used in the first convolution layer 310 and corresponding pixel values in the second image 135. Four filter kernels are used in the first convolution layer 310, and thus four feature maps may be generated through the convolution operation using the four filter kernels.

Figure 4:
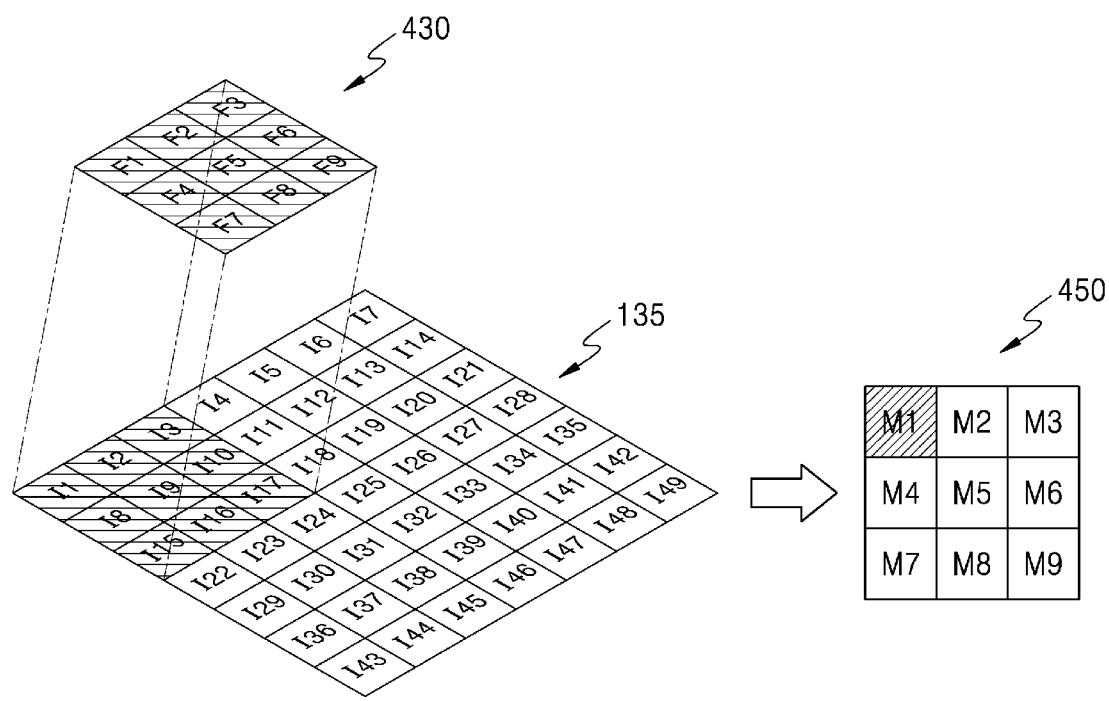
FIG. 4 is a diagram of a convolution operation by a convolution layer, according to an embodiment.

I1 through I49 indicated in the second image 135 of FIG. 4 indicate pixels of the second image 135, and F1 through F9 indicated in the filter kernel 430 indicate parameters of the filter kernel 430. Also, M1 through M9 indicated in the feature map 450 indicate samples of the feature map 450.

FIG. 4 illustrates an example where the second image 135 includes 49 pixels, but this is only an example and when the second image 135 has a resolution of 4 K, the second image 135 may include 3480×2160 pixels.

During the convolution operation, pixel values of I1, I2, I3, I8, I9, I10, I15, I16, and I17 of the second image 135 and F1 through F9 of the filter kernel 430 are respectively multiplied, and a value of combination (for example, addition) of result values of the multiplication may be assigned as a value of M1 of the feature map 450. When a stride of the convolution operation is 2, pixel values of I3, I4, I5, I10, I11, I12, I17, I18, and I19 of the second image 135 and F1 through F9 of the filter kernel 430 are respectively multiplied, and a value of combination of result values of the multiplication may be assigned as a value of M2 of the feature map 450.

While the filter kernel 430 moves along the stride to a last pixel of the second image 135, the convolution operation is performed between the pixel values in the second image 135 and the parameters of the filter kernel 430, and thus the feature map 450 having a certain size may be obtained.

According to the disclosure, through joint training of a first DNN and a second DNN, values of parameters of the second DNN, for example, parameters of a filter kernel used in convolution layers of the second DNN (for example, F1 through F9 of the filter kernel 430), may be optimized. As described above, the AI up-scaler 234 may determine an up-scaling target corresponding to a down-scaling target of the first DNN, based on AI data, and determine parameters corresponding to the determined up-scaling target as the parameters of the filter kernel used in the convolution layers of the second DNN.

Convolution layers included in the first DNN and second DNN may perform processes according to the convolution operation described with reference to FIG. 4, but the convolution operation described in FIG. 4 is only an example and is not limited thereto.

Referring back to FIG. 3, the feature maps output from the first convolution layer 310 are input to a first activation layer 320.

The first activation layer 320 may assign a non-linear feature to each feature map. The first activation layer 320 may include a sigmoid function, a Tan h function, a rectified linear unit (ReLU) function, or the like, but is not limited thereto.

The first activation layer 320 assigning the non-linear feature indicates that some sample values of the feature map, which is an output through the first convolution layer 310, are changed. Here, the change is performed by applying the non-linear feature.

The first activation layer 320 determines whether to transmit the sample values of the feature maps output from the first convolution layer 310 to a second convolution layer 330. For example, some of the sample values of the feature maps are activated by the first activation layer 320 and transmitted to the second convolution layer 330, and some sample values are deactivated by the first activation layer 320 and not transmitted to the second convolution layer 330. The unique features of the second image 135 indicated by the feature maps are emphasized by the first activation layer 320.

Feature maps 325 output from the first activation layer 320 are input to the second convolution layer 330. One of the feature maps 325 shown in FIG. 3 is a result of processing the feature map 450 described with reference to FIG. 4 in the first activation layer 320.

3×4×4 indicated in the second convolution layer 330 indicates that a convolution process is performed on the input feature maps 325 by using four filter kernels having a size of 3×3. An output of the second convolution layer 330 is input to a second activation layer 340. The second activation layer 340 may assign a non-linear feature to input data.

Feature maps 345 output from the second activation layer 340 are input to a third convolution layer 350. 3×4×1 indicated in the third convolution layer 350 shown in FIG. 3 indicates that a convolution process is performed to generate one output image by using one filter kernel having a size of 3×3. The third convolution layer 350 is a layer for outputting a final image, and generates one output by using one filter kernel. According to an embodiment of the disclosure, the third convolution layer 350 may output the third image 145 as a result of a convolution operation.

There may be a plurality of pieces of DNN setting information indicating the numbers of filter kernels of the first, second, and third convolution layers 310, 330, and 350 of a second DNN 300, a parameter of a filter kernel, and the like, as will be described below, and the plurality of pieces of DNN setting information should be linked to a plurality of pieces of DNN setting information of a first DNN. The link between the plurality of pieces of DNN setting information of the second DNN 300 and the plurality of pieces of DNN setting information of the first DNN may be realized via joint training of the first DNN and the second DNN.

FIG. 3 illustrates an example where the second DNN 300 includes three convolution layers (the first, second, and third convolution layers 310, 330, and 350) and two activation layers (the first and second activation layers 320 and 340), but this is only an example, and the numbers of convolution layers and activation layers may vary according to an embodiment. Also, according to an embodiment, the second DNN 300 may be implemented as a recurrent neural network (RNN). In this case, a convolutional neural network (CNN) structure of the second DNN 300 according to an embodiment of the disclosure is changed to an RNN structure.

According to an embodiment, referring to FIG. 2, the AI up-scaler 234 may include at least one arithmetic logic unit (ALU) for a convolution operation and an operation of an activation layer. The ALU may be embodied as a processor. For the convolution operation, the ALU may include a multiplier for performing multiplication between sample values of a feature map output from the second image 135 or previous layer, and sample values of a filter kernel, and an adder for adding result values of the multiplication. Also, for the operation of the activation layer, the ALU may include a multiplier for multiplying an input sample value by a weight used in a pre-determined sigmoid function, Tan h function, or ReLU function, and a comparator for comparing a multiplication result with a certain value to determine whether to transmit the input sample value to a next layer.

Hereinafter, a method, performed by the AI up-scaler 234, of performing the AI up-scaling on the second image 135 according to the up-scaling target will be described.

According to an embodiment, the AI up-scaler 234 may store a plurality of pieces of DNN setting information settable in the second DNN.

Here, the DNN setting information may include information about at least one of the number of convolution layers included in the second DNN, the number of filter kernels for each convolution layer, and a parameter of each filter kernel. The plurality of pieces of DNN setting information may respectively correspond to various up-scaling targets, and the second DNN may operate based on DNN setting information corresponding to a specific up-scaling target. The second DNN may have different structures based on the DNN setting information. For example, the second DNN may include three convolution layers based on any piece of DNN setting information, and may include four convolution layers based on another piece of DNN setting information.

According to an embodiment, the DNN setting information may only include a parameter of a filter kernel used in the second DNN. In this case, the structure of the second DNN does not change, but only the parameter of the internal filter kernel may change based on the DNN setting information.

The AI up-scaler 234 may obtain the DNN setting information for performing AI up-scaling on the second image 135, among the plurality of pieces of DNN setting information. The plurality of pieces of DNN setting information used at this time are each information for obtaining the third image 145 of a pre-determined resolution and/or pre-determined quality, and are jointly trained with the first DNN.

For example, one piece of DNN setting information among the plurality of pieces of DNN setting information may include information for obtaining the third image 145 of a resolution twice greater than a resolution of the second image 135, for example, the third image 145 of 4 K (4096×2160) twice greater than 2 K (2048×1080) of the second image 135, and another piece of DNN setting information may include information for obtaining the third image 145 of a resolution four times greater than the resolution of the second image 135, for example, the third image 145 of 8 K (8192×4320) four times greater than 2 K (2048×1080) of the second image 135.

Each of the plurality of pieces of DNN setting information is generated jointly with DNN setting information of the first DNN of an AI encoding apparatus 600, and the AI up-scaler 234 obtains one piece of DNN setting information among the plurality of pieces of DNN setting information according to an enlargement ratio corresponding to a reduction ratio of the DNN setting information of the first DNN. In this regard, the AI up-scaler 234 may verify information of the first DNN. In order for the AI up-scaler 234 to verify the information of the first DNN, the AI decoding apparatus 200 according to an embodiment receives AI data including the information of the first DNN from the AI encoding apparatus 600.

In other words, the AI up-scaler 234 may verify information targeted by DNN setting information of the first DNN used to obtain the first image 115, and obtain the DNN setting information of the second DNN jointly trained with the first DNN, by using information received from the AI encoding apparatus 600.

When DNN setting information for AI up-scaling the second image 135 is obtained from among the plurality of pieces of DNN setting information, input data may be processed based on the second DNN operating according to the obtained DNN setting information.

For example, when any one piece of DNN setting information is obtained, the number of filter kernels included in each of the first, second, and third convolution layers 310, 330, and 350 of the second DNN 300 of FIG. 3, and the parameters of the filter kernels are set to values included in the obtained DNN setting information.

In particular, parameters of a filter kernel of 3×3 used in any one convolution layer of the second DNN of FIG. 4 are set to {1, 1, 1, 1, 1, 1, 1, 1, 1}, and when DNN setting information is changed afterwards, the parameters are replaced by {2, 2, 2, 2, 2, 2, 2, 2, 2} that are parameters included in the changed DNN setting information.

The AI up-scaler 234 may obtain the DNN setting information for up-scaling the second image 135 from among the plurality of pieces of DNN setting information, based on information included in the AI data, and the AI data used to obtain the DNN setting information will now be described.

According to an embodiment, the AI up-scaler 234 may obtain the DNN setting information for up-scaling the second image 135 from among the plurality of pieces of DNN setting information, based on difference information included in the AI data. For example, when it is verified that the resolution (for example, 4 K (4096×2160)) of the original image 105 is twice greater than the resolution (for example, 2 K (2048×1080)) of the first image 115, based on the difference information, the AI up-scaler 234 may obtain the DNN setting information for increasing the resolution of the second image 135 two times.

According to another embodiment, the AI up-scaler 234 may obtain the DNN setting information for AI up-scaling the second image 135 from among the plurality of pieces of DNN setting information, based on information related to the first image 115 included in the AI data. The AI up-scaler 234 may pre-determine a mapping relationship between image-related information and DNN setting information, and obtain the DNN setting information mapped to the information related to the first image 115.

FIG. 5 is a diagram of a mapping relationship between several pieces of image-related information and several pieces of DNN setting information, according to an embodiment.

Through an embodiment of the disclosure according to FIG. 5, it will be determined that AI encoding and AI decoding processes according to an embodiment of the disclosure do not only consider a change of resolution. As shown in FIG. 5, the DNN setting information may be selected considering, individually or all, a resolution, such as standard definition (SD), high definition (HD), or full HD, a bitrate, such as 10 Mbps, 15 Mbps, or 20 Mbps, and codec information, such as AV1, H.264, or HEVC. For such consideration, training considering each element should be jointly performed with encoding and decoding processes during an AI training process (see FIG. 9).

Accordingly, when a plurality of pieces of DNN setting information are provided based on image-related information including a codec type, a resolution of an image, and the like, as shown in FIG. 5 according to training, the DNN setting information for AI up-scaling the second image 135 may be obtained based on the information related to the first image 115 received during the AI decoding process.

In other words, the AI up-scaler 234 is capable of using DNN setting information according to image-related information by matching the image-related information on the left of a table of FIG. 5 and the DNN setting information on the right of the table.

As shown in FIG. 5, when it is verified, from the information related to the first image 115, that the resolution of the first image 115 is SD, a bitrate of image data obtained as a result of performing first encoding on the first image 115 is 10 Mbps, and the first encoding is performed on the first image 115 by using AV1 codec, the AI up-scaler 234 may use A DNN setting information among the plurality of pieces of DNN setting information.

Also, when it is verified, from the information related to the first image 115, that the resolution of the first image 115 is HD, the bitrate of the image data obtained as the result of the first encoding is 15 Mbps, and the first encoding is performed on the first image 115 by using H.264 codec, the AI up-scaler 234 may use B DNN setting information from among the plurality of pieces of DNN setting information.

Also, when it is verified, from the information related to the first image 115, that the resolution of the first image 115 is full HD, the bitrate of the image data obtained as the result of performing the first encoding on the first image 115 is 20 Mbps, and the first encoding is performed on the first image 115 by using HEVC codec, the AI up-scaler 234 may use C DNN setting information among the plurality of pieces of DNN setting information, and when it is verified that the resolution of the first image 115 is full HD, the bitrate of the image data obtained as the result of the first encoding on the first image 115 is 15 Mbps, and the first encoding is performed on the first image 115 by using HEVC codec, the AI up-scaler 234 may use D DNN setting information among the plurality of pieces of DNN setting information. One of the C DNN setting information and the D DNN setting information is selected based on whether the bitrate of the image data obtained as the result of performing the first encoding on the first image 115 is 20 Mbps or 15 Mbps. The different bitrates of the image data, obtained when the first encoding is performed on the first image 115 of the same resolution by using the same codec, indicates different qualities of reconstructed images. Accordingly, the first DNN and the second DNN may be jointly trained based on certain image quality, and accordingly, the AI up-scaler 234 may obtain DNN setting information according to the bitrate of image data indicating the quality of the second image 135.

According to another embodiment, the AI up-scaler 234 may obtain the DNN setting information for AI up-scaling the second image 135 from among the plurality of pieces of DNN setting information considering all of information (e.g., prediction mode information, motion information, quantization parameter information, and the like) provided from the first decoder 232 and the information related to the first image 115 included in the AI data. For example, the AI up-scaler 234 may receive the quantization parameter information used during the first encoding process of the first image 115 from the first decoder 232, verify the bitrate of image data obtained as a result of encoding the first image 115 from AI data, and obtain the DNN setting information corresponding to a quantization parameter and the bitrate. Even when the bitrates are the same, the quality of reconstructed images may vary according to the complexity of an image. A bitrate is a value representing the entire first image 115 on which first encoding is performed, and qualities of frames may vary even within the first image 115. Accordingly, the DNN setting information more suitable to the second image 135 may be obtained when all of the prediction mode information, motion information, and/or quantization parameter, which are obtainable for each frame from the first decoder 232, are considered, compared to when only the AI data is used.

Also, according to an embodiment, the AI data may include an identifier of mutually agreed DNN setting information. The identifier of DNN setting information is information for distinguishing a pair of pieces of DNN setting information jointly trained between the first DNN and the second DNN, such that AI up-scaling is performed on the second image 135 to the up-scaling target corresponding to the down-scaling target of the first DNN. The AI up-scaler 234 may perform AI up-scaling on the second image 135 by using the DNN setting information corresponding to the identifier of the DNN setting information, after obtaining the identifier of the DNN setting information included in the AI data. For example, an identifier indicating each of the plurality of pieces of DNN setting information configurable in the first DNN, and an identifier indicating each of the plurality of pieces of DNN setting information configurable in the second DNN may be pre-assigned. In this case, a same identifier may be assigned to a pair of pieces of DNN setting information configurable in each of the first DNN and the second DNN. The AI data may include the identifier of DNN setting information set in the first DNN to perform AI down-scaling on the original image 105. Upon receiving the AI data, the AI up-scaler 234 may perform AI up-scaling on the second image 135 by using the DNN setting information indicated by the identifier included in the AI data from among the plurality of pieces of DNN setting information.

Also, according to an embodiment, the AI data may include the DNN setting information. The AI up-scaler 234 may perform the AI up-scaling on the second image 135 by using the DNN setting information after obtaining the DNN setting information included in the AI data.

According to an embodiment, when pieces of information (for example, the number of convolution layers, the number of filter kernels for each convolution layer, a parameter of each filter kernel, and the like) constituting the DNN setting information are stored in a form of a lookup table, the AI up-scaler 234 may obtain the DNN setting information by combining some values selected from values in the lookup table, based on information included in the AI data, and perform the AI up-scaling on the second image 135 by using the obtained DNN setting information.

According to an embodiment, when a structure of DNN corresponding to the up-scaling target is determined, the AI up-scaler 234 may obtain the DNN setting information, for example, parameters of a filter kernel, corresponding to the determined structure of DNN.

The AI up-scaler 234 obtains the DNN setting information of the second DNN through the AI data including information related to the first DNN, and performs the AI up-scaling on the second image 135 through the second DNN set based on the obtained DNN setting information, and in this case, memory usage and throughput may be reduced compared to when features of the second image 135 are directly analyzed and up-scaled.

According to an embodiment, when the second image 135 includes a plurality of frames, the AI up-scaler 234 may independently obtain DNN setting information for a certain number of frames or obtain DNN setting information common to all frames.

Figure 6:
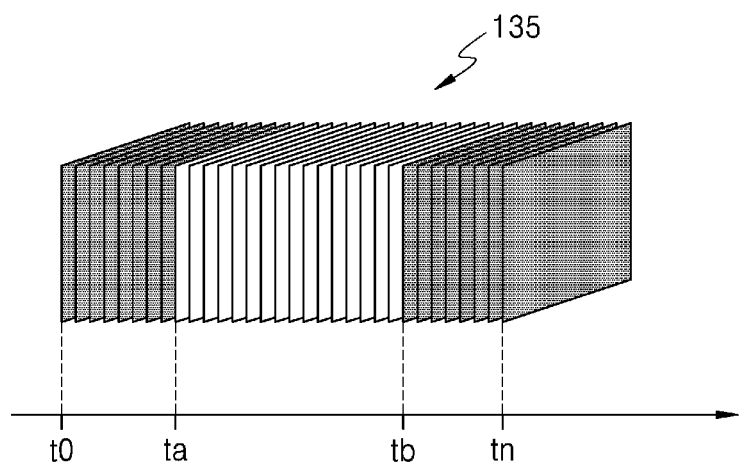
FIG. 6 is a diagram of a second image including a plurality of frames, according to an embodiment.

FIG. 6 is a diagram of a second image including a plurality of frames, according to an embodiment.

As shown in FIG. 6, the second image 135 may include frames corresponding to t0 to tn.

According to an embodiment, the AI up-scaler 234 may obtain the DNN setting information of the second DNN through the AI data, and perform AI-upscaling on the frames corresponding to the t0 to tn, based on the obtained DNN setting information. In other words, the AI up-scaling may be performed on the frames corresponding to t0 to tn, based on common DNN setting information.

According to another embodiment, the AI up-scaler 234 may perform AI up-scaling on some of the frames corresponding to t0 to tn, for example, the frames corresponding to t0 to ta by using "A" DNN setting information obtained from the AI data, and the frames corresponding to ta+1 to tb by using "B" DNN setting information obtained from the AI data. Also, the AI up-scaler 234 may perform AI up-scaling on the frames corresponding to tb+1 to tn by using "C" DNN setting information obtained from the AI data. In other words, the AI up-scaler 234 may independently obtain DNN setting information for each group including a certain number of frames from among the plurality of frames, and perform AI up-scaling on the frames included in each group by using the independently obtained DNN setting information.

According to another embodiment, the AI up-scaler 234 may independently obtain DNN setting information for each frame included in the second image 135. In other words, when the second image 135 includes three frames, the AI up-scaler 234 may perform AI up-scaling on a first frame by using DNN setting information obtained in relation to the first frame, perform AI up-scaling on a second frame by using DNN setting information obtained in relation to the second frame, and perform AI up-scaling on a third frame by using DNN setting information obtained in relation to the third frame. The DNN setting information may be independently obtained for each frame included in the second image 135, according to a method of obtaining the DNN setting information, based on the information (the prediction mode information, the motion information, the quantization parameter information, and the like) provided from the first decoder 232, and the information related to the first image 115 included in the AI data, described above. This is because mode information, the quantization parameter information, and the like may be independently determined for each frame included in the second image 135.

According to another embodiment, the AI data may include information indicating to which frame the DNN setting information obtained based on the AI data is valid. For example, when the AI data includes information indicating that the DNN setting information is valid up to the ta frame, the AI up-scaler 234 performs AI up-scaling on the t0 to ta frames by using the DNN setting information obtained based on the AI data. Also, when the AI data includes information indicating that the DNN setting information is valid up to the tn frame, the AI up-scaler 234 may perform AI up-scaling on the ta+1 to tn frames by using the DNN setting information obtained based on the AI data.

Hereinafter, the AI encoding apparatus 600 for performing AI encoding on the original image 105 will be described with reference to FIG. 7.

Figure 7:
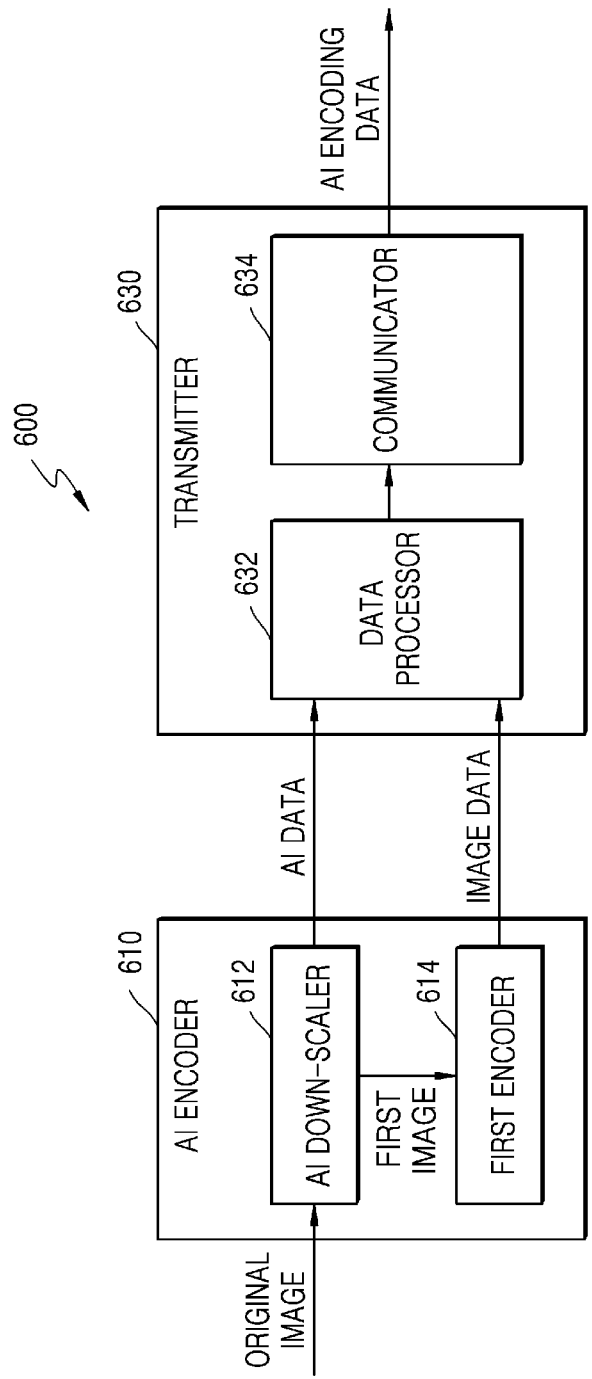
FIG. 7 is a block diagram of a configuration of an AI encoding apparatus, according to an embodiment.

FIG. 7 is a block diagram of a configuration of an AI encoding apparatus, according to an embodiment.

Referring to FIG. 7, the AI encoding apparatus 600 may include an AI encoder 610 and a transmitter 630. The AI encoder 610 may include an AI down-scaler 612 and a first encoder 614. The transmitter 630 may include a data processor 632 and a communicator 634.

In FIG. 7, the AI encoder 610 and the transmitter 630 are illustrated as separate devices, but the AI encoder 610 and the transmitter 630 may be realized through one processor. In this case, the AI encoder 610 and the transmitter 630 may be realized by dedicated processors or through a combination of S/W and an AP or general-purpose processor, such as CPU or GPU. The dedicated processor may be realized by including a memory for implementing an embodiment of the disclosure or by including a memory processor for using an external memory.

Also, the AI encoder 610 and the transmitter 630 may be configured by one or more processors. In this case, the AI encoder 610 and the transmitter 630 may be realized through a combination of dedicated processors or through a combination of S/W and an AP or a plurality of general-purpose processors, such as CPUs or GPUs. Similarly, the AI down-scaler 612 and the first encoder 614 may be realized by different processors.

The AI encoder 610 performs AI down-scaling on the original image 105 and first encoding on the first image 115, and transmits AI data and image data to the transmitter 630. The transmitter 630 transmits the AI data and the image data to the AI decoding apparatus 200.

The image data includes data obtained as a result of performing the first encoding on the first image 115. The image data may include data obtained based on pixel values in the first image 115, for example, residual data that is a difference between the first image 115 and prediction data of the first image 115. Also, the image data includes information used during a first encoding process of the first image 115. For example, the image data may include prediction mode information used to perform the first encoding on the first image 115, motion information, and information related to a quantization parameter used to perform the first encoding on the first image 115.

The AI data includes information enabling AI up-scaling to be performed on the second image 135 to an up-scaling target corresponding to a down-scaling target of a first DNN. According to an embodiment, the AI data may include difference information between the original image 105 and the first image 115. Also, the AI data may include information related to the first image 115. The information related to the first image 115 may include information about at least one of a resolution of the first image 115, a bitrate of the image data obtained as a result of first encoding of the first image 115, and a codec type used during the first encoding of the first image 115.

According to an embodiment, the AI data may include an identifier of mutually agreed DNN setting information such that the AI up-scaling is performed on the second image 135 to the up-scaling target corresponding to the down-scaling target of the first DNN.

Also, according to an embodiment, the AI data may include DNN setting information settable in a second DNN.

The AI down-scaler 612 may obtain the first image 115 obtained by performing AI down-scaling on the original image 105 through the first DNN. The AI down-scaler 612 may determine the down-scaling target of the original image 105, based on a pre-determined standard.

To obtain the first image 115 matching the down-scaling target, the AI down-scaler 612 may store a plurality of pieces of DNN setting information settable in the first DNN. The AI down-scaler 612 obtains DNN setting information corresponding to the down-scaling target from among the plurality of pieces of DNN setting information, and performs the AI down-scaling on the original image 105 through the first DNN set in the obtained DNN setting information.

Each of the plurality of pieces of DNN setting information may be trained to obtain the first image 115 of a pre-determined resolution and/or pre-determined quality. For example, one piece of DNN setting information among the plurality of pieces of DNN setting information may include information for obtaining the first image 115 of a resolution ½ times lower than a resolution of the original image 105, for example, the first image 115 of 2 K (2048×1080) ½ times lower than 4 K (4096×2160) of the original image 105, and another piece of DNN setting information may include information for obtaining the first image 115 of a resolution ¼ times lower than the resolution of the original image 105, for example, the first image 115 of 2 K (2048×1080) ¼ times lower than 8 K (8192×4320) of the original image 105.

According to an embodiment, when pieces of information (for example, the number of convolution layers, the number of filter kernels for each convolution layer, a parameter of each filter kernel, and the like) constituting the DNN setting information are stored in a form of a lookup table, the AI down-scaler 612 may obtain the DNN setting information by combining some values selected from values in the lookup table, based on the down-scaling target, and perform AI down-scaling on the original image 105 by using the obtained DNN setting information.

According to an embodiment, the AI down-scaler 612 may determine a structure of DNN corresponding to the down-scaling target, and obtain DNN setting information corresponding to the determined structure of DNN, for example, obtain parameters of a filter kernel.

The plurality of pieces of DNN setting information for performing the AI down-scaling on the original image 105 may have an optimized value as the first DNN and the second DNN are jointly trained. Here, each piece of DNN setting information includes at least one of the number of convolution layers included in the first DNN, the number of filter kernels for each convolution layer, and a parameter of each filter kernel.

The AI down-scaler 612 may set the first DNN with the DNN setting information determined for performing the AI down-scaling on the original image 105 to obtain the first image 115 of a certain resolution and/or certain quality through the first DNN. When the DNN setting information for performing the AI down-scaling on the original image 105 is obtained from the plurality of pieces of DNN setting information, each layer in the first DNN may process data input based on information included in the DNN setting information.

Hereinafter, a method, performed by the AI down-scaler 612, of determining the down-scaling target will be described. The down-scaling target may indicate, for example, by how much resolution needs to be decreased from the original image 105 to obtain the first image 115.

According to an embodiment, the AI down-scaler 612 may determine the down-scaling target, based on at least one of a compression ratio (for example, a target bitrate and a resolution difference between the original image 105 and the first image 115), compression quality (for example, a bitrate type), compression history information, and a type of the original image 105.

For example, the AI down-scaler 612 may determine the down-scaling target based on the compression ratio, the compression quality, or the like, which is pre-set or input from a user.

As another example, the AI down-scaler 612 may determine the down-scaling target by using the compression history information stored in the AI encoding apparatus 600. For example, according to the compression history information usable by the AI encoding apparatus 600, encoding quality, a compression ratio, or the like preferred by the user may be determined, and the down-scaling target may be determined according to the encoding quality determined based on the compression history information. For example, the resolution, quality, or the like of the first image 115 may be determined according to the encoding quality that has been used most often according to the compression history information.

As another example, the AI down-scaler 612 may determine the down-scaling target based on the encoding quality that has been used more frequently than a certain threshold value (for example, average quality of the encoding quality that has been used more frequently than the certain threshold value), according to the compression history information.

As another example, the AI down-scaler 612 may determine the down-scaling target, based on the resolution, type (for example, a file format), or the like of the original image 105.

According to an embodiment, when the original image 105 includes a plurality of frames, the AI down-scaler 612 may independently determine the down-scaling target for a certain number of frames or determine the down-scaling target common to all frames.

For example, the AI down-scaler 612 may divide the frames included in the original image 105 into a certain number of groups, and independently determine the down-scaling target for each group. Same or different down-scaling targets may be determined for each group. The numbers of frames included in the groups may be the same or different for each group.

As another example, the AI down-scaler 612 may independently determine the down-scaling target for each frame included in the original image 105. Same or different down-scaling targets may be determined for each frame.

Hereinafter, an example of a structure of a first DNN 700 on which AI down-scaling is based will be described.

Figure 8:
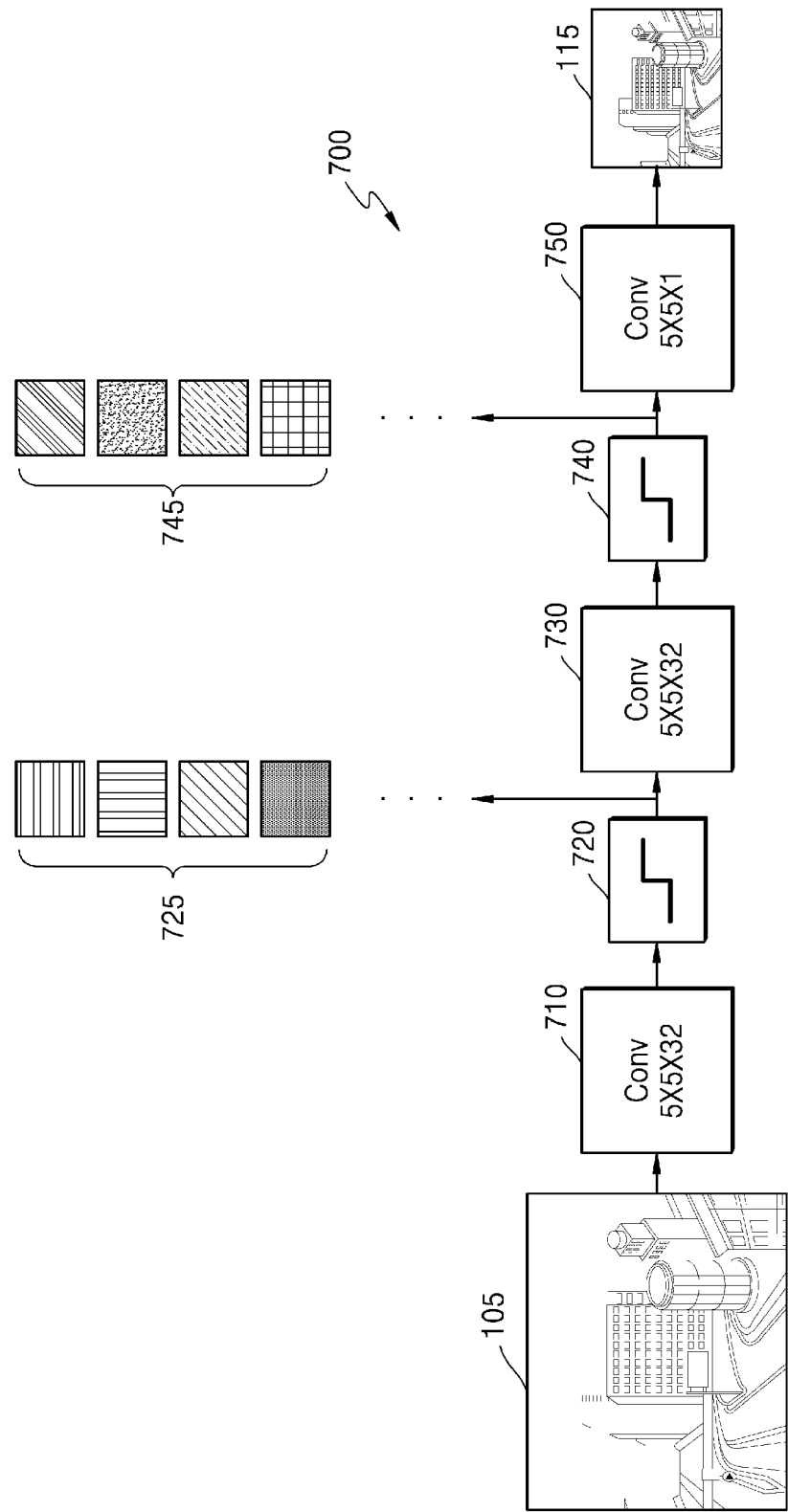
FIG. 8 is a diagram showing a first DNN for AI down-scaling of an original image, according to an embodiment.

FIG. 8 is a diagram showing a first DNN for AI down-scaling of an original image, according to an embodiment.

As shown in FIG. 8, the original image 105 is input to a first convolution layer 710. The first convolution layer 710 performs a convolution process on the original image 105 by using 32 filter kernels having a size of 5×5. 32 feature maps generated as a result of the convolution process are input to a first activation layer 720. The first activation layer 720 may assign a non-linear feature to the 32 feature maps.

The first activation layer 720 determines whether to transmit sample values of the feature maps output from the first convolution layer 710 to a second convolution layer 730. For example, some of the sample values of the feature maps are activated by the first activation layer 720 and transmitted to the second convolution layer 730, and some sample values are deactivated by the first activation layer 720 and not transmitted to the second convolution layer 730. Information indicated by the feature maps output from the first convolution layer 710 are emphasized by the first activation layer 720.

An output 725 of the first activation layer 720 is input to the second convolution layer 730. The second convolution layer 730 performs a convolution process on input data by using 32 filter kernels having a size of 5×5. 32 feature maps output as a result of the convolution process are input to a second activation layer 740, and the second activation layer 740 may assign a non-linear feature to the 32 feature maps.

An output 745 of the second activation layer 740 is input to a third convolution layer 750. The third convolution layer 750 performs a convolution process on input data by using one filter kernel having a size of 5×5. As a result of the convolution process, one image may be output from the third convolution layer 750. The third convolution layer 750 is a layer for outputting a final image, and obtains one output by using one filter kernel. According to an embodiment of the disclosure, the third convolution layer 750 may output the first image 115 as a result of a convolution operation.

There may be a plurality of pieces of DNN setting information indicating the numbers of filter kernels of the first, second, and third convolution layers 710, 730, and 750 of the first DNN 700, a parameter of each filter kernel, and the like, and the plurality of pieces of DNN setting information may be linked to a plurality of pieces of DNN setting information of a second DNN. The link between the plurality of pieces of DNN setting information of the first DNN and the plurality of pieces of DNN setting information of the second DNN may be realized via joint training of the first DNN and the second DNN.

FIG. 8 illustrates an example where the first DNN 700 includes three convolution layers (the first, second, and third convolution layers 710, 730, and 750) and two activation layers (the first and second activation layers 720 and 740), but this is only an example, and the numbers of convolution layers and activation layers may vary according to an embodiment. Also, according to an embodiment, the first DNN 700 may be implemented as an RNN. In this case, a CNN structure of the first DNN 700 according to an embodiment of the disclosure is changed to an RNN structure.

According to an embodiment, the AI down-scaler 612 may include at least one ALU for the convolution operation and an operation of an activation layer. The ALU may be embodied as a processor. For the convolution operation, the ALU may include a multiplier for performing multiplication between sample values of a feature map output from the original image 105 or previous layer, and sample values of a filter kernel, and an adder for adding result values of the multiplication. Also, for the operation of the activation layer, the ALU may include a multiplier for multiplying an input sample value by a weight used in a pre-determined sigmoid function, Tan h function, or ReLU function, and a comparator for comparing a multiplication result with a certain value to determine whether to transmit the input sample value to a next layer.

Referring back to FIG. 7, upon receiving the first image 115 from the AI down-scaler 612, the first encoder 614 may reduce an information amount of the first image 115 by performing first encoding on the first image 115. The image data corresponding to the first image 115 may be obtained as a result of performing the first encoding by the first encoder 614.

The data processor 632 processes at least one of the AI data and the image data to be transmitted in a certain form. For example, when the AI data and the image data are to be transmitted in a form of a bitstream, the data processor 632 may process the AI data to be expressed in a form of a bitstream, and transmit the image data and the AI data in a form of one bitstream through the communicator 634. As another example, the data processor 632 may process the AI data to be expressed in a form of bitstream, and transmit each of a bitstream corresponding to the AI data and a bitstream corresponding to the image data through the communicator 634. As another example, the data processor 632 may process the AI data to be expressed in a form of a frame or packet, and transmit the image data in a form of a bitstream and the AI data in a form of a frame or packet through the communicator 634.

In particular, the communicator 634 transmits the AI encoding data obtained as a result of AI encoding through a network. The AI encoding data obtained as the result of AI encoding includes the image data and the AI data. The image data and the AI data may be transmitted through a same type of network or different types of networks.

According to an embodiment, the AI encoding data obtained as a result of processing by the data processor 632 may be stored in a data storage medium including a magnetic medium such as a hard disk, a floppy disk, or a magnetic tape, an optical recording medium such as CD-ROM or DVD, or a magneto-optical medium such as a floptical disk.

Hereinafter, a method of jointly training the first DNN 700 and the second DNN 300 will be described with reference to FIG. 9.

Figure 9:
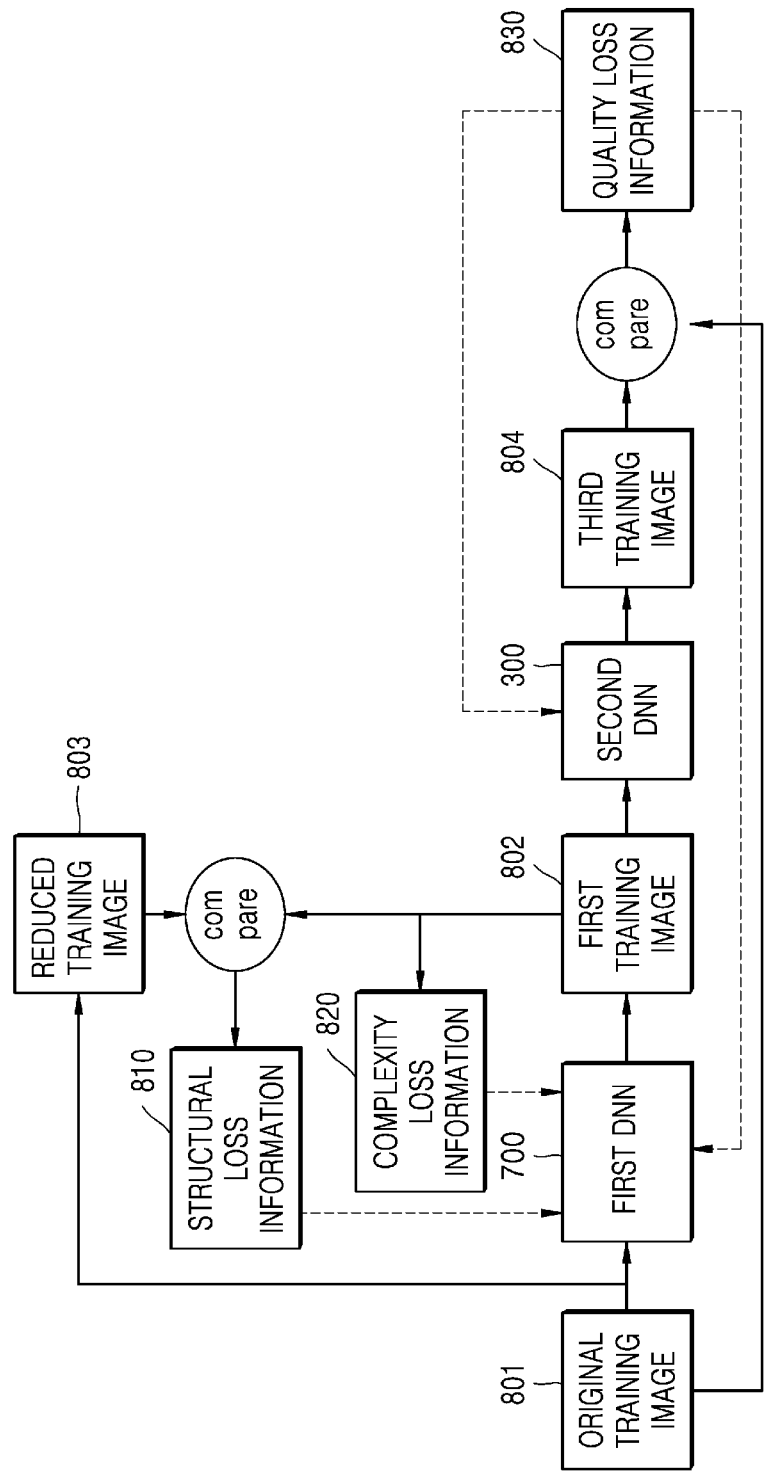
FIG. 9 is a diagram of a method of training a first DNN and a second DNN, according to an embodiment.

FIG. 9 is a diagram of a method of training a first DNN and a second DNN, according to an embodiment.

In an embodiment, the original image 105 on which AI encoding is performed through an AI encoding process is reconstructed to the third image 145 via an AI decoding process, and to maintain similarity between the original image 105 and the third image 145 obtained as a result of AI decoding, a correlation between the AI encoding process and the AI decoding process is required. In other words, information lost during the AI encoding process needs to be reconstructed during the AI decoding process, and in this regard, the first DNN 700 and the second DNN 300 need to be jointly trained.

For accurate AI decoding, quality loss information 830 corresponding to a result of comparing a third training image 804 and an original training image 801 shown in FIG. 9 needs to be reduced ultimately. Accordingly, the quality loss information 830 is used to train both the first DNN 700 and the second DNN 300.

First, a training process shown in FIG. 9 will be described.

In FIG. 9, the original training image 801 is an image on which AI down-scaling is to be performed and a first training image 802 is an image obtained by performing AI down-scaling on the original training image 801. Also, the third training image 804 is an image obtained by performing AI up-scaling on the first training image 802.

The original training image 801 includes a still image or a moving image including a plurality of frames. According to an embodiment, the original training image 801 may include a luminance image extracted from the still image or the moving image including the plurality of frames. Also, according to an embodiment, the original training image 801 may include a patch image extracted from the still image or the moving image including the plurality of frames. When the original training image 801 includes the plurality of frames, the first training image 802, a second training image, and the third training image 804 may also include pluralities of frames. When the plurality of frames of the original training image 801 are sequentially input to the first DNN 700, the pluralities of frames of the first training image 802, the second training image, and the third training image 804 may be sequentially obtained through the first DNN 700 and the second DNN 300.

For joint training of the first DNN 700 and the second DNN 300, the original training image 801 is input to the first DNN 700. The original training image 801 input to the first DNN 700 is output as the first training image 802 via the AI down-scaling, and the first training image 802 is input to the second DNN 300. The third training image 804 is output as a result of performing the AI up-scaling on the first training image 802.

Referring to FIG. 9, the first training image 802 is input to the second DNN 300, and according to an embodiment, the second training image obtained as first encoding and first decoding are performed on the first training image 802 may be input to the second DNN 300. To input the second training image to the second DNN, any one codec from among MPEG-2, H.264, MPEG-4, HEVC, VC-1, VP8, VP9, and AV1 may be used. In detail, any one codec from among MPEG-2, H.264, MPEG-4, HEVC, VC-1, VP8, VP9, and AV1 may be used to perform first encoding on the first training image 802 and first decoding on image data corresponding to the first training image 802.

Referring to FIG. 9, separately from the first training image 802 being output through the first DNN 700, a reduced training image 803 obtained by performing legacy down-scaling on the original training image 801 is obtained. Here, the legacy down-scaling may include at least one of bilinear scaling, bicubic scaling, Lanczos scaling, and stair step scaling.

To prevent a structural feature of the first image 115 from deviating greatly from a structural feature of the original image 105, the reduced training image 803 is obtained to preserve the structural feature of the original training image 801.

Before training is performed, the first DNN 700 and the second DNN 300 may be set to pre-determined DNN setting information. When the training is performed, structural loss information 810, complexity loss information 820, and the quality loss information 830 may be determined.

The structural loss information 810 may be determined based on a result of comparing the reduced training image 803 and the first training image 802. For example, the structural loss information 810 may correspond to a difference between structural information of the reduced training image 803 and structural information of the first training image 802. The structural information may include various features extractable from an image, such as luminance, contrast, histogram, or the like of the image. The structural loss information 810 indicates how much structural information of the original training image 801 is maintained in the first training image 802. When the structural loss information 810 is small, the structural information of the first training image 802 is similar to the structural information of the original training image 801.

The complexity loss information 820 may be determined based on spatial complexity of the first training image 802. For example, a total variance value of the first training image 802 may be used as the spatial complexity. The complexity loss information 820 is related to a bitrate of the image data obtained by performing the first encoding on the first training image 802. It is defined that the bitrate of the image data is low when the complexity loss information 820 is small.

The quality loss information 830 may be determined based on a result of comparing the original training image 801 and the third training image 804. The quality loss information 830 may include at least one of a L1-norm value, a L2-norm value, a structural similarity (SSIM) value, a peak signal-to-noise ratio-human vision system (PSNR-HVS) value, a multiscale SSIM (MS-SSIM) value, a variance inflation factor (VIF) value, and a video multimethod assessment fusion (VMAF) value regarding a difference between the original training image 801 and the third training image 804. The quality loss information 830 indicates how similar the third training image 804 is to the original training image 801. The third training image 804 is more similar to the original training image 801 when the quality loss information 830 is small.

Referring to FIG. 9, the structural loss information 810, the complexity loss information 820, and the quality loss information 830 are used to train the first DNN 700, and the quality loss information 830 is used to train the second DNN 300. In other words, the quality loss information 830 is used to train both the first and second DNNs 700 and 300.

The first DNN 700 may update a parameter such that final loss information determined based on the structural loss information 810, the complexity loss information 820, and the quality loss information 830 is reduced or minimized. Also, the second DNN 300 may update a parameter such that the quality loss information 830 is reduced or minimized.

The final loss information for training the first DNN 700 and the second DNN 300 may be determined as Equation (1) below.

$$LossDS = a \times \text{Structural Loss Information} + \\ b \times \text{Complexity Loss Information} + c \times \text{Quality Loss Information}$$

$$LossUS = d \times \text{Quality Loss Information}$$

(1)

In Equation (1), LossDS indicates final loss information to be reduced or minimized to train the first DNN 700, and LossUS indicates final loss information to be reduced or minimized to train the second DNN 300. Also, a, b, c, and d may correspond to pre-determined certain weights.

In other words, the first DNN 700 updates parameters in a direction LossDS of Equation (1) is reduced, and the second DNN 300 updates parameters in a direction LossUS is reduced. When the parameters of the first DNN 700 are updated according to LossDS derived during the training, the first training image 802 obtained based on the updated parameters becomes different from the first training image 802 of previous training, and accordingly, the third training image 804 also becomes different from the third training image 804 of the previous training. When the third training image 804 becomes different from the third training image 804 of the previous training, the quality loss information 830 is also newly determined, and the second DNN 300 updates the parameters accordingly. When the quality loss information 830 is newly determined, LossDS is also newly determined, and the first DNN 700 updates the parameters according to newly determined LossDS. In other words, updating of the parameters of the first DNN 700 leads to updating of the parameters of the second DNN 300, and updating of the parameters of the second DNN 300 leads to updating of the parameters of the first DNN 700. In other words, because the first DNN 700 and the second DNN 300 are jointly trained by sharing the quality loss information 830, the parameters of the first DNN 700 and the parameters of the second DNN 300 may be optimized with correlation.

Referring to Equation (1), LossUS is determined according to the quality loss information 830, but this is only an example and LossUS may be determined based on the quality loss information 830 and at least one of the structural loss information 810 and the complexity loss information 820.

Hereinabove, it has been described that the AI up-scaler 234 of the AI decoding apparatus 200 and the AI down-scaler 612 of the AI encoding apparatus 600 store the plurality of pieces of DNN setting information, and methods of training each of the plurality of pieces of DNN setting information stored in the AI up-scaler 234 and the AI down-scaler 612 will now be described.

As described with reference to Equation (1), the first DNN 700 updates the parameters considering the similarity (the structural loss information 810) between the structural information of the first training image 802 and the structural information of the original training image 801, the bitrate (the complexity loss information 820) of the image data obtained as the result of performing the first encoding on the first training image 802, and the difference (the quality loss information 830) between the third training image 804 and the original training image 801.

In particular, the parameters of the first DNN 700 may be updated such that the first training image 802 having similar structural information as the original training image 801 is obtainable, where a bitrate of the image data obtained when the first encoding is performed on the first training image 802 is small, and at the same time, the second DNN 300 performing AI up-scaling on the first training image 802 obtains the third training image 804 similar to the original training image 801.

A direction in which the parameters of the first DNN 700 are optimized may vary by adjusting the weights a, b, and c of Equation (1). For example, when the weight b is determined to be high, the parameters of the first DNN 700 may be updated by prioritizing a low bitrate over high quality of the third training image 804. Also, when the weight c is determined to be high, the parameters of the first DNN 700 may be updated by prioritizing high quality of the third training image 804 over a high bitrate or maintaining the structural information of the original training image 801.

Also, the direction in which the parameters of the first DNN 700 are optimized may vary according to a type of codec used to perform the first encoding on the first training image 802. This is because the second training image to be input to the second DNN 300 may vary according to the type of codec.

In other words, the parameters of the first DNN 700 and the parameters of the second DNN 300 may be jointly updated based on the weights a, b, and c, and the type of codec for performing the first encoding on the first training image 802. Accordingly, when the first DNN 700 and the second DNN 300 are trained after determining the weights a, b, and c each to a certain value and determining the type of codec to a certain type, the parameters of the first DNN 700 and the parameters of the second DNN 300 jointly optimized may be determined.

Also, when the first DNN 700 and the second DNN 300 are trained after changing the weights a, b, and c, and the type of codec, the parameters of the first DNN 700 and the parameters of the second DNN 300 jointly optimized may be determined. In other words, the plurality of pieces of DNN setting information jointly trained with each other may be determined in the first DNN 700 and the second DNN 300 when the first DNN 700 and the second DNN 300 are trained while changing values of the weights a, b, and c, and the type of codec.

As described above with reference to FIG. 5, the pluralities of pieces of DNN setting information of the first DNN 700 and second DNN 300 may be mapped to pieces of information related to a first image. To set such a mapping relationship, first encoding may be performed on the first training image 802 output from the first DNN 700, according to a certain bitrate and in a certain codec, and the second training image obtained by performing first decoding on a bitstream obtained as a result of the first encoding may be input to the second DNN 300. In other words, the first DNN 700 and the second DNN 300 are trained after setting a configuration such that first encoding is performed on the first training image 802 of a certain resolution, according to a certain bitrate by a certain codec, thereby determining a pair of pieces of DNN setting information mapped to the resolution of the first training image 802, the type of codec used to perform the first encoding on the first training image 802, and the bitrate of the bitstream obtained as the result of performing the first encoding on the first training image 802. The mapping relationship between the pluralities of pieces of DNN setting information of the first DNN 700 and second DNN 300, and the pieces of information related to the first image may be determined by variously changing the resolution of the first training image 802, the type of codec used to perform the first encoding on the first training image 802, and the bitrate of the bitstream obtained as the result of performing the first encoding on the first training image 802.

Figure 10:
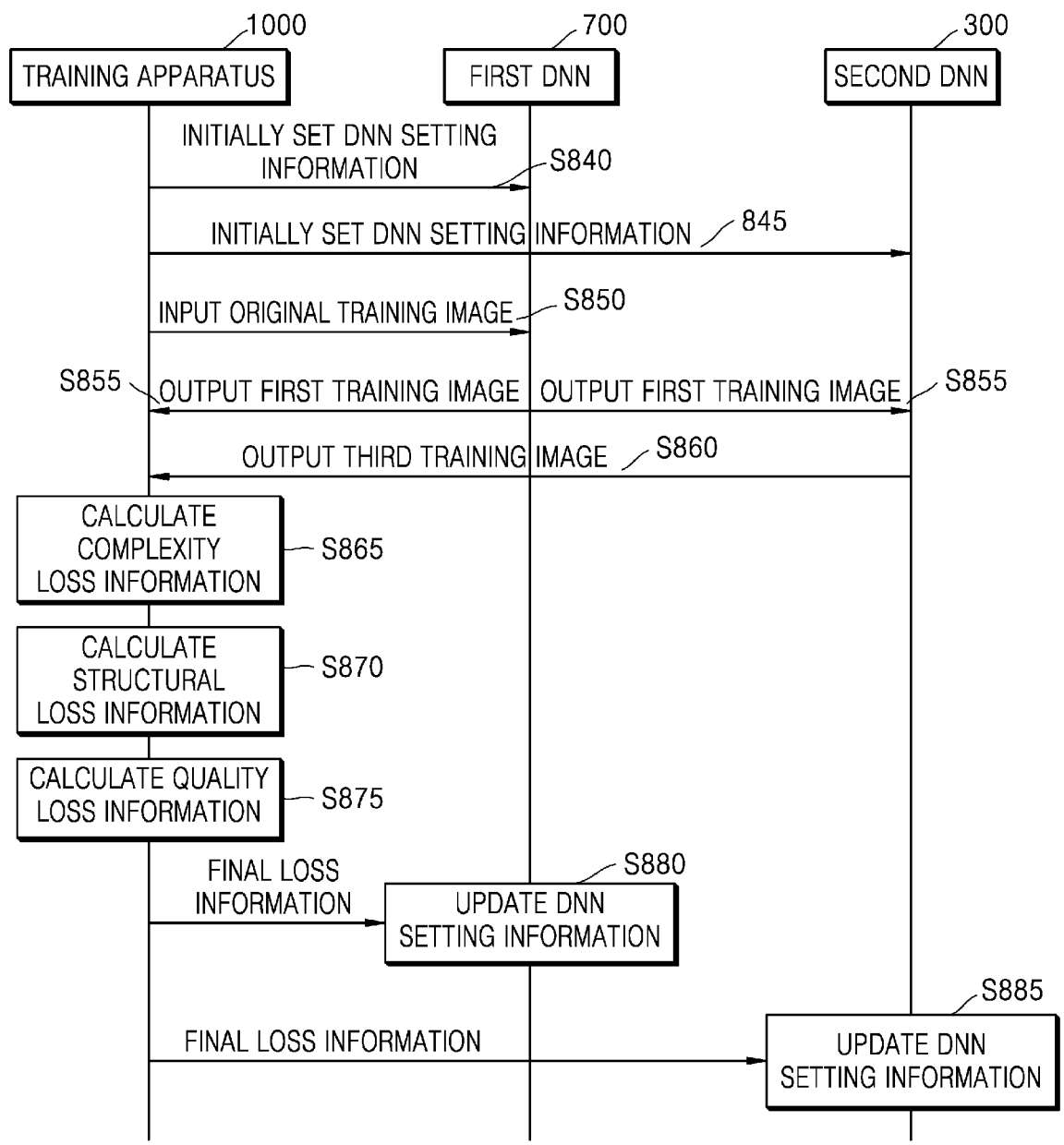
FIG. 10 is a diagram of processes by which a training apparatus trains a first DNN and a second DNN, according to an embodiment.

FIG. 10 is a diagram of processes by which a training apparatus trains a first DNN and a second DNN, according to an embodiment.

The training of the first DNN 700 and second DNN 300 described with reference to FIG. 9 may be performed by the training apparatus 1000. The training apparatus 1000 includes the first DNN 700 and the second DNN 300. The training apparatus 1000 may be, for example, the AI encoding apparatus 600 or a separate server. Pieces of DNN setting information of the second DNN 300, which are obtained as a result of training, are stored in the AI decoding apparatus 200.

Referring to FIG. 10, in operations S840 and S845, the training apparatus 1000 initially sets pieces of DNN setting information of the first DNN 700 and second DNN 300. Accordingly, the first DNN 700 and the second DNN 300 may perform according to pre-determined DNN setting information. The DNN setting information may include information about at least one of the numbers of convolution layers included in the first DNN 700 and second DNN 300, the number of filter kernels for each convolution layer, a size of a filter kernel for each convolution layer, and a parameter of each filter kernel.

In operation S850, the training apparatus 1000 inputs the original training image 801 to the first DNN 700. The original training image 801 may include a still image or at least one frame configuring a moving image.

In operation S855, the first DNN 700 processes the original training image 801 according to the initially set DNN setting information, and outputs the first training image 802 obtained by performing AI down-scaling on the original training image 801. FIG. 10 illustrates an example where the first training image 802 output from the first DNN 700 is directly input to the second DNN 300, but the first training image 802 output from the first DNN 700 may be input to the second DNN 300 via the training apparatus 1000. Also, the training apparatus 1000 may perform first encoding and first decoding on the first training image 802 by using a certain codec, and input the second training image to the second DNN 300.

In operation S860, the second DNN 300 processes the first training image 802 or second training image according to the initially set DNN setting information, and outputs the third training image 804 obtained by performing AI up-scaling on the first training image 802 or second training image.

In operation S865, the training apparatus 1000 calculates the complexity loss information 820, based on the first training image 802.

In operation S870, the training apparatus 1000 calculates the structural loss information 810 by comparing the reduced training image 803 and the first training image 802.

In operation S875, the training apparatus 1000 calculates the quality loss information 830 by comparing the original training image 801 and the third training image 804.

In operation S880, the first DNN 700 updates the initially set DNN setting information via a back propagation process based on final loss information. The training apparatus 1000 may calculate the final loss information for training the first DNN 700, based on the complexity loss information 820, the structural loss information 810, and the quality loss information 830.

In operation S885, the second DNN 300 updates the initially set DNN setting information via a back propagation process based on the quality loss information or the final loss information. The training apparatus 1000 may calculate the final loss information for training the second DNN 300, based on the quality loss information 830.

Then, the training apparatus 1000, the first DNN 700, and the second DNN 300 update the DNN setting information while repeating operations S850 and S885 until the pieces of final loss information are minimized. Here, during each repetition, the first DNN 700 and the second DNN operate according to the DNN setting information updated during a previous process.

Table 1 below shows effects when AI encoding and AI decoding are performed on the original image 105, according to an embodiment of the disclosure, and when encoding and decoding are performed on the original image 105 according to HEVC.

according to an embodiment of the disclosure, is higher than subjective image quality obtained when encoding and decoding are performed according to HEVC, a bitrate according to the embodiment of the disclosure is reduced by at least 50%.

Figure 11:
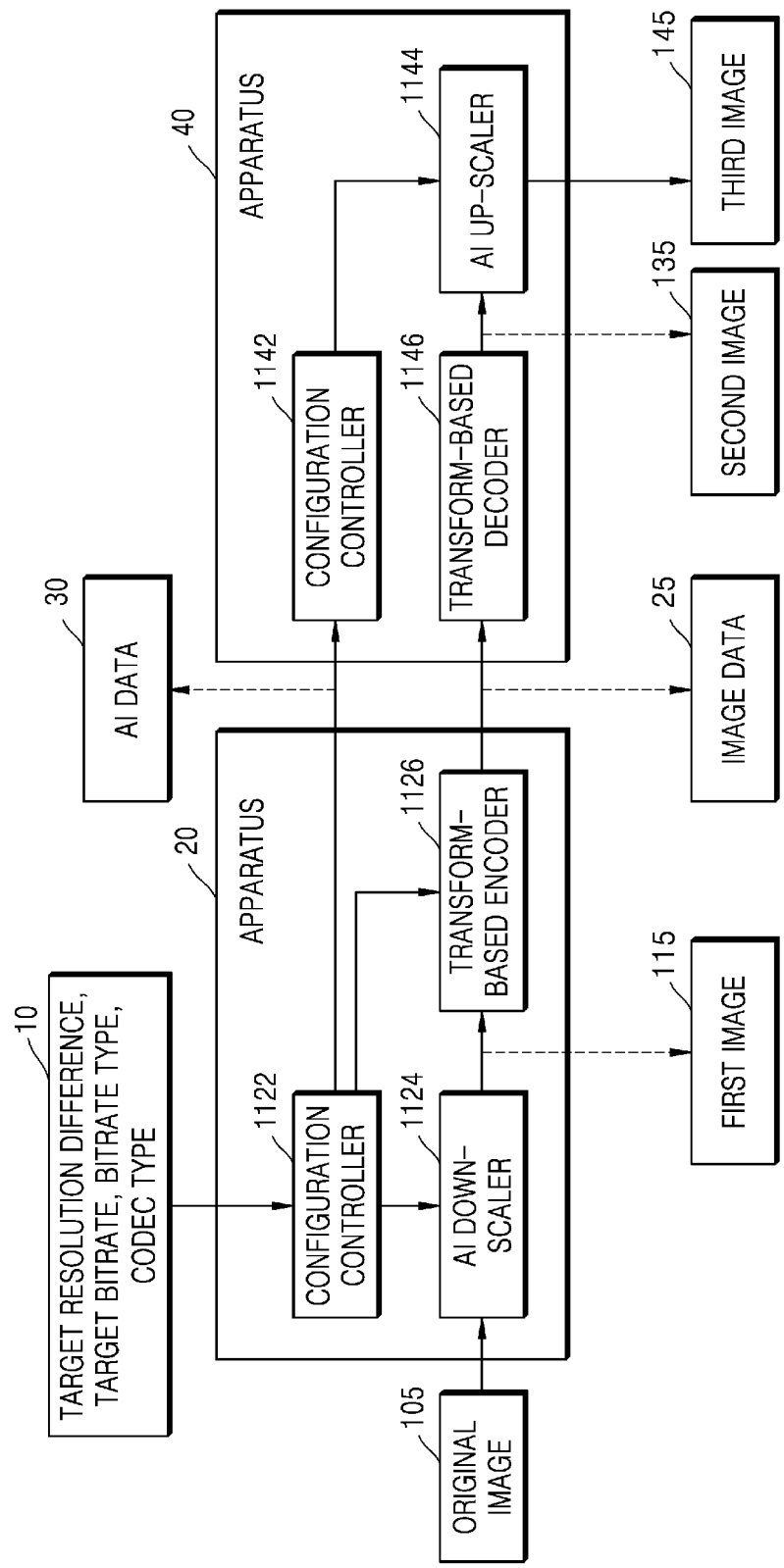
FIG. 11 is a diagram of an apparatus for AI down-scaling an original image and an apparatus for AI up-scaling a second image, according to an embodiment.

FIG. 11 is a diagram of an apparatus for AI down-scaling an original image and an apparatus for AI up-scaling a second image, according to an embodiment.

The apparatus 20 receives the original image 105 and provides, to the apparatus 40, image data 25 and AI data 30 by using an AI down-scaler 1124 and a transform-based encoder 1126. According to an embodiment, the image data 25 corresponds to the image data of FIG. 1 and the AI data 30 corresponds to the AI data of FIG. 1. Also, according to an embodiment, the transform-based encoder 1126 corresponds to the first encoder 614 of FIG. 7, and the AI down-scaler 1124 corresponds to the AI down-scaler 612 of FIG. 7.

The apparatus 40 receives the AI data 30 and image data 25, and obtains the third image 145 by using a transform-based decoder 1146 and an AI up-scaler 1144. According to an embodiment, the transform-based decoder 1146 corresponds to the first decoder 232 of FIG. 2, and the AI up-scaler 1144 corresponds to the AI up-scaler 234 of FIG. 2.

According to an embodiment, the apparatus 20 includes a CPU, a memory, and a computer program including instructions. The computer program is stored in the memory. According to an embodiment, the apparatus 20 performs functions to be described with reference to FIG. 11, according to execution of the computer program by the CPU. According to an embodiment, the functions to be described with reference to FIG. 11 are performed by a dedicated hardware chip and/or the CPU.

According to an embodiment, the apparatus 40 includes a CPU, a memory, and a computer program including instructions. The computer program is stored in the memory. According to an embodiment, the apparatus 40 performs functions to be described with reference to FIG. 11, according to execution of the computer program by the CPU. According to an embodiment, the functions to be described with reference to FIG. 11 are performed by a dedicated hardware chip and/or the CPU.

In FIG. 11, a configuration controller 1122 receives at least one input value 10. According to an embodiment, the at least one input value 10 may include at least one of a target resolution difference for the AI down-scaler 1124 and the AI up-scaler 1144, a bitrate of the image data 25, a bitrate

TABLE 1

| Content | Resolution | Number of Frames | Information Amount (Bitrate) (Mbps) | | Subjective Image Quality Score (VMAF) | |
|---|---|---|---|---|---|---|
| | | | HEVC | AI Encoding/ AI Decoding | HEVC | AI Encoding/ AI Decoding |
| Content_01 | 8K | 300 Frames | 46.3 | 21.4 | 94.80 | 93.54 |
| Content_02 | (7680 × 4320) | | 46.3 | 21.6 | 98.05 | 98.98 |
| Content_03 | | | 46.3 | 22.7 | 96.08 | 96.00 |
| Content_04 | | | 46.1 | 22.1 | 86.26 | 92.00 |
| Content_05 | | | 45.4 | 22.7 | 93.42 | 92.98 |
| Content_06 | | | 46.3 | 23.0 | 95.99 | 95.61 |
| | | Average | 46.11 | 22.25 | 94.10 | 94.85 |

As shown in Table 1, despite that subjective image quality obtained when AI encoding and AI decoding are performed on content including 300 frames of a resolution of 8 K, type of the image data 25 (for example, a variable bitrate type, a constant bitrate type, or an average bitrate type), and a codec type for the transform-based encoder 1126. The at least one input value 10 may be pre-stored in the apparatus 20 or may include a value input from a user.

The configuration controller 1122 controls operations of the AI down-scaler 1124 and the transform-based encoder 1126, based on the received input value 10. According to an embodiment, the configuration controller 1122 obtains DNN setting information for the AI down-scaler 1124, according to the received input value 10, and sets the AI down-scaler 1124 by using the obtained DNN setting information. According to an embodiment, the configuration controller 1122 transmits the received input value 10 to the AI down-scaler 1124, and the AI down-scaler 1124 may obtain the DNN setting information for performing AI down-scaling on the original image 105, based on the received input value 10. According to an embodiment, the configuration controller 1122 may provide, to the AI down-scaler 1124 together with the input value 10, additional information, for example, color format information (a luminance component, a chrominance component, a red component, a green component, a blue component, or the like) to which AI down-scaling is applied, tone mapping information of a high dynamic range (HDR), or the like, and the AI down-scaler 1124 may obtain the DNN setting information in consideration of the input value 10 and the additional information. According to an embodiment, the configuration controller 1122 transmits at least some of the received input values 10 to the transform-based encoder 1126 such that the transform-based encoder 1126 performs first encoding on the first image 115 by using a bitrate of a certain value, a bitrate of a certain type, and a certain codec.

The AI down-scaler 1124 receives the original image 105 and performs an operation described with reference to at least one of FIGS. 1, 7, 8, 9, and 10 so as to obtain the first image 115.

According to an embodiment, the AI data 30 is provided to the apparatus 40. The AI data 30 may include at least one of resolution difference information between the original image 105 and the first image 115, and information related to the first image 115. The resolution difference information may be determined based on the target resolution difference of the input value 10, and the information related to the first image 115 may be determined based on at least one of the target bitrate, the bitrate type, and the codec type. According to an embodiment, the AI data 30 may include parameters used during an AI up-scaling process. The AI data may be provided from the AI down-scaler 1124 to the apparatus 40.

The image data 25 is obtained as the first image 115 is processed by the transform-based encoder 1126, and the image data 25 is transmitted to the apparatus 40. The transform-based encoder 1126 may process the first image 115 according to MPEG-2, H.264 AVC, MPEG-4, HEVC, VC-1, VP8, VP9, or AV1.

A configuration controller 1142 controls operations of the AI up-scaler 1144, based on the AI data 30. According to an embodiment, the configuration controller 1142 obtains DNN setting information for the AI up-scaler 1144, according to the received AI data 30, and sets the AI up-scaler 1144 by using the obtained DNN setting information. According to an embodiment, the configuration controller 1142 transmits the received AI data 30 to the AI up-scaler 1144, and the AI up-scaler 1144 may obtain the DNN setting information for performing AI up-scaling on the second image 135, based on the AI data 30. According to an embodiment, the configuration controller 1142 may provide, to the AI up-scaler 1144 together with the AI data 30, additional information, for example, color format information (a luminance component, a chrominance component, a red component, a green component, a blue component, or the like) to which AI up-scaling is applied, tone mapping information of an HDR, or the like, and the AI up-scaler 1144 may obtain the DNN setting information in consideration of the AI data 30 and the additional information. According to an embodiment, the AI up-scaler 1144 may receive the AI data 30 from the configuration controller 1142, receive at least one of prediction mode information, motion information, and quantization parameter information from the transform-based decoder 1146, and obtain the DNN setting information based on the AI data 30 and at least one of the prediction mode information, the motion information, and the quantization parameter information.

The transform-based decoder 1146 reconstructs the second image 135 by processing the image data 25. The transform-based decoder 1146 may process the image data 25 according to MPEG-2, H.264 AVC, MPEG-4, HEVC, VC-1, VP8, VP9, or AV1.

The AI up-scaler 1144 obtains the third image 145 by performing AI up-scaling on the second image 135 provided from the transform-based decoder 1146, based on the set DNN setting information.

The AI down-scaler 1124 may include a first DNN and the AI up-scaler 1144 may include a second DNN, and according to an embodiment, pieces of DNN setting information for the first DNN and the second DNN are trained according to a training method described with reference to FIGS. 9 and 10.

A plurality of important components may be included in one of a horizontal direction (or a width direction) and a vertical direction (or a height direction) of the original image 105, according to an exterior of a subject in the original image 105. Here, the important components may include an edge showing features of the subject in the original image 105 or a text helping understanding of the original image 105. Accordingly, when AI down-scaling is performed on the original image 105 such that a resolution ratio in a horizontal direction and a resolution ratio in a vertical direction are the same between the original image 105 and the first image 115, it is highly likely that some important components in the original image 105 may not be present in the first image 115. For example, when a plurality of edges of high intensity are provided in the horizontal direction of the original image 105 and a resolution of the original image 105 in a horizontal direction and a resolution thereof in a vertical direction are reduced at a same ratio, some edges provided in the horizontal direction of the original image 105 may not be included in the first image 115.

Hereinafter, unless specifically stated, a resolution ratio of a certain image in a horizontal direction and a resolution ratio thereof in a vertical direction respectively denote a resolution ratio in a horizontal direction and a resolution ratio in a vertical direction between the original image 105 and the certain image. In other words, although not specifically stated, the resolution ratio of the certain image in the horizontal direction and the resolution ratio thereof in the vertical direction indicate a comparison result with the original image 105.

As described above, because the second DNN for AI up-scaling is jointly trained with the first DNN for AI down-scaling, AI up-scaling is performed on the second image 135 via the second DNN, according to resolution ratios of the first image 115 in a horizontal direction and a vertical direction. Accordingly, sameness between the third image 145 and the original image 105 may be reduced when AI up-scaling is performed on the second image 135 obtained via first encoding and first decoding processes of the first image 115 in which the important components in the original image 105 are removed.

Hereinafter, embodiments of performing AI encoding and AI decoding while varying the resolution ratios of the first image 115 in the horizontal direction and the vertical direction will be described with reference to FIGS. 12 through 36.

Figure 12:
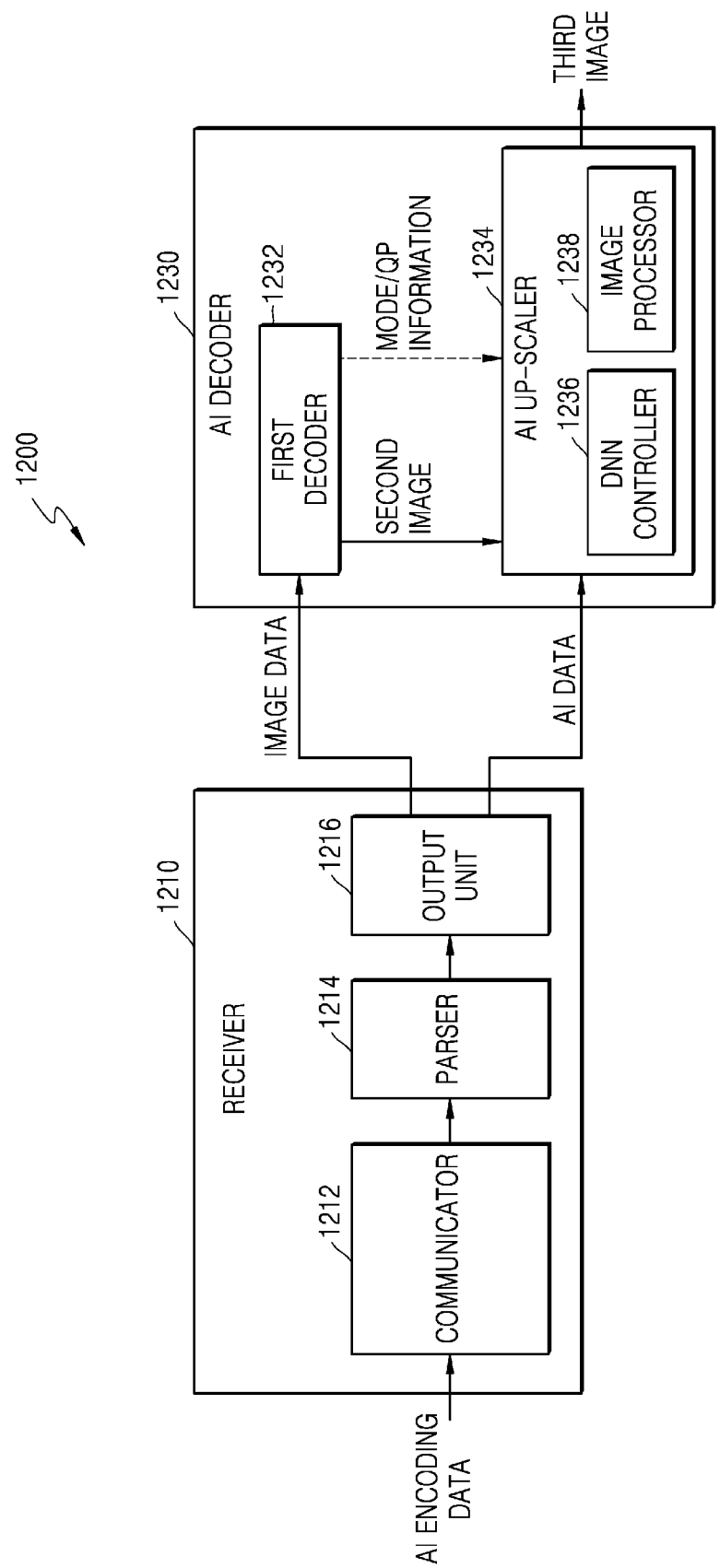
FIG. 12 is a block diagram of a configuration of an AI decoding apparatus, according to an embodiment.

FIG. 12 is a block diagram of a configuration of an AI decoding apparatus, according to an embodiment.

Referring to FIG. 12, the AI decoding apparatus 1200 includes a receiver 1210 and an AI decoder 1230. The receiver 1210 may include a communicator 1212, a parser 1214, and an output unit 1216. The AI decoder 1230 may include a first decoder 1232 and an AI up-scaler 1234.

FIG. 12 illustrates an example where the receiver 1210 and the AI decoder 1230 are separated from each other, but the receiver 1210 and the AI decoder 1230 may be realized by one processor. In this case, the receiver 1210 and the AI decoder 1230 may be realized by dedicated processors, or may be realized by a combination of S/W and an AP or a general-purpose processor, such as a CPU or a GPU. The exclusive processor may be realized by including a memory for implementing an embodiment of the disclosure or by including a memory processor for using an external memory.

Also, the receiver 1210 and the AI decoder 1230 may be realized by one or more processors. In this case, the receiver 1210 and the AI decoder 1230 may be realized by a combination of dedicated processors, or may be realized by a combination of S/W and an AP or a plurality of general-purpose processors, such as CPUs or GPUs. Similarly, the AI up-scaler 1234 and the first decoder 1232 may also be realized by different processors.

The receiver 1210 may perform same functions as the receiver 210 of FIG. 2.

The communicator 1212 receives AI encoding data generated as a result of performing AI encoding through a network. The AI encoding data generated as the result of performing AI encoding includes the image data and the AI data.

The parser 1214 receives the AI encoding data received through the communicator 1212 and parses the AI encoding data to distinguish the image data and the AI data. The parser 1214 distinguishably transmits the image data and the AI data to the output unit 1216 via a header of data received through the communicator 1212, and the output unit 1216 transmits the image data to the first decoder 1232 and the AI data to the AI up-scaler 1234.

According to an embodiment, the AI encoding data parsed by the parser 1214 may be obtained from a data storage medium including a magnetic medium such as a hard disk, a floppy disk, or a magnetic tape, an optical recording medium such as CD-ROM or DVD, or a magneto-optical medium such as a floptical disk.

The AI decoder 1230 obtains the third image 145 by performing AI decoding on the image data and the AI data.

The first decoder 1232 may perform same functions as the first decoder 232 of FIG. 2.

The first decoder 1232 reconstructs the second image 135 corresponding to the first image 115, based on the image data. The second image 135 obtained by the first decoder 1232 is provided to the AI up-scaler 1234. According to an embodiment, first decoding-related information, such as prediction mode information, motion information, quantization parameter information, or the like included in the image data may be further provided to the AI up-scaler 1234.

Upon receiving the AI data, the AI up-scaler 1234 performs AI up-scaling on the second image 135, based on the AI data. According to an embodiment, the AI up-scaler 1234 may perform the AI up-scaling on the second image 135 by further using the first decoding-related information, such as the prediction mode information, the quantization parameter information, or the like included in the image data.

According to an embodiment of the disclosure, AI down-scaling may be performed on the original image 105 at resolution ratios of different values in the horizontal direction and the vertical direction. Accordingly, the AI data may include information indicating the resolution ratio of the first image 115 in the horizontal direction and the resolution ratio thereof in the vertical direction. The AI up-scaler 1234 performs the AI up-scaling on the second image 135 according to the resolution ratios of the first image 115 in the horizontal direction and vertical direction such that the third image 145 has a same resolution as the original image 105.

Figure 13:
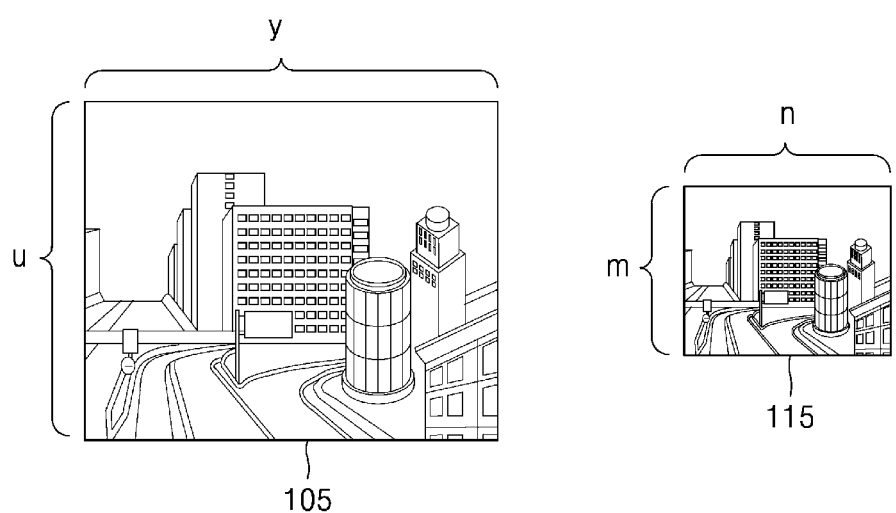
FIG. 13 is a diagram of resolution ratios in a horizontal direction and a vertical direction between an original image and a first image, according to an embodiment.

FIG. 13 is a diagram of resolution ratios in a horizontal direction and a vertical direction between an original image and a first image, according to an embodiment.

When resolutions of the original image 105 in a horizontal direction and a vertical direction are respectively y and u, where y and u are each a natural number, and resolutions of the first image 115 in a horizontal direction and a vertical direction are respectively n and m, where n and m are each a natural number, resolution ratios of the first image 115 in a horizontal direction and a vertical direction may be respectively n/y and m/u.

The disclosure is described under an assumption that the resolution ratios of the first image 115 in the horizontal direction and the vertical direction are respectively calculated as n/y and m/u, but according to an embodiment, it is obvious that the resolution ratios of the first image 115 in the horizontal direction and the vertical direction may be calculated as y/n and u/m, or the like.

The AI up-scaler 1234 determines the resolution ratios of the first image 115 in the horizontal direction and the vertical direction, based on information included in the AI data, and in this case, the AI data may include indexes indicating the resolution ratios of the first image 115 in the horizontal direction and the vertical direction.

FIG. 14 is a diagram of a resolution ratio of a first image in a horizontal direction and a resolution ratio of the first image in a vertical direction, which are indicated by an index, according to an embodiment.

Certain values of the resolution ratios of the first image 115 in the horizontal direction and vertical direction may be selected according to the index. In FIG. 14, when an index included in AI data indicates 0, the resolution ratio of the first image 115 in the horizontal direction is ½ and the resolution ratio thereof in the vertical direction is 1. In other words, resolutions of the original image 105 and first image 115 in the vertical direction are the same, but a resolution of the first image 115 in the horizontal direction is ½ of a resolution of the original image 105 in the horizontal direction. Also, when the index included in the AI data indicates 2, the resolution ratio of the first image 115 in the horizontal direction is ¼ and the resolution ratio thereof in the vertical direction is 1.

While the resolution ratios of the first image 115 in the horizontal direction and vertical direction indicated by each index are pre-determined with respect to an AI encoding apparatus 2700 and the AI decoding apparatus 1200, the AI decoding apparatus 1200 may verify the resolution ratios of the first image 115 in the horizontal direction and vertical direction according to an index transmitted by the AI encoding apparatus 2700.

According to an embodiment, the AI up-scaler 1234 may verify the resolution ratios of the first image 115 in the horizontal direction and vertical direction, based on information indicating the resolutions of the original image 105 in the horizontal direction and vertical direction, the information being included in the AI data. Because resolutions of the first image 115 in the horizontal direction and vertical direction are determined via the second image 135, the resolution ratio of the first image 115 in the horizontal direction and vertical direction may be verified according to the information indicating the resolutions of the original image 105 in the horizontal direction and vertical direction. The resolutions of the original image 105 in the horizontal direction and vertical direction may be expressed by a ratio (16:9, 4:3, or the like) between the resolutions in the horizontal direction and vertical direction and a resolution in one direction, or by an index indicating the resolutions of the original image 105 in the horizontal direction and vertical direction.

The AI data may include information related to the first image 115. The information related to the first image 115 may include information about at least one of a resolution of the first image 115, a bitrate of image data obtained as a result of first encoding performed on the first image 115, and a codec type used during the first encoding of the first image 115. The information related to the first image 115 may be used to obtain DNN setting information for setting a second DNN. Here, the DNN setting information may include information about at least one of the number of convolution layers included in the second DNN, the number of filter kernels for each convolution layer, or a parameter of each filter kernel.

Referring back to the AI up-scaler 1234 of FIG. 12 in detail, the AI up-scaler 1234 may include a DNN controller 1236 and an image processor 1238.

The DNN controller 1236 determines an operation method of the second DNN, based on the AI data. Here, because the second DNN operates according to the DNN setting information, the DNN controller 1236 obtains the DNN setting information to be set in the second DNN, based on the AI data. The second DNN may have different structures based on the DNN setting information. For example, the second DNN may include three convolution layers based on any piece of DNN setting information, and may include four convolution layers based on another piece of DNN setting information. Alternatively, a convolution layer of the second DNN may use three filter kernels based on any piece of DNN setting information, or may use four filter kernels based on another piece of DNN setting information.

The DNN controller 1236 verifies the resolution ratios of the first image 115 in the horizontal direction and vertical direction, based on the AI data, and obtains the DNN setting information for performing AI up-scaling on the second image 135 by the verified resolution ratios.

The AI decoding apparatus 1200 stores a plurality of pieces of DNN setting information settable in the second DNN, and the DNN controller 1236 may obtain, from among the plurality of pieces of DNN setting information, DNN setting information for performing AI up-scaling on the second image 135 by the resolution ratios of the first image 115 in the horizontal direction and vertical direction.

According to an embodiment, the plurality of pieces of DNN setting information may be mapped to the resolution ratios of the first image 115 in the horizontal direction and vertical direction. For example, DNN setting information mapped when the resolution ratio of the first image 115 in the horizontal direction is ½ and the resolution ratio thereof in the vertical direction is 1 may be different from DNN setting information mapped when the resolution ratio of the first image 115 in the horizontal direction is ¼ and the resolution ratio thereof in the vertical direction is 1. According to an embodiment, the plurality of pieces of DNN setting information may be mapped to the resolution ratios of the first image 115 in the horizontal direction and vertical direction, and image-related information.

Pieces of DNN setting information mapped to the resolution ratio of the first image 115 in the horizontal direction, the resolution ratio thereof in the vertical direction, and the image-related information will be described with reference to FIG. 15.

FIG. 15 is a diagram of DNN setting information mapped to image-related information and resolution ratios of a first image in a horizontal direction and vertical direction, according to an embodiment.

As described above with reference to FIG. 5, each of the plurality of pieces of DNN setting information may be mapped to the resolution of the first image 115, the bitrate of the bitstream generated as a result of performing first encoding on the first image 115, and the codec type used to perform the first encoding on the first image 115.

According to another embodiment of the disclosure, the resolution ratios of the first image 115 in the horizontal direction and vertical direction may be further considered to obtain the DNN setting information. In other words, when the resolution of the first image 115 is SD, the bitrate of the bitstream is 10 Mbps, and the first encoding is performed on the first image 115 by using an AV1 codec, any one of A DNN setting information, B DNN setting information, C DNN setting information, and D DNN setting information may be used to set the second DNN, depending on the resolution ratios of the first image 115 in the horizontal direction and vertical direction. In FIG. 15, the A DNN setting information when the resolution ratio of the first image 115 in the horizontal direction is ½ and the resolution ratio thereof in the vertical direction is 1, the B DNN setting information when the resolution ratio of the first image 115 in the horizontal direction is 1 and the resolution ratio thereof in the vertical direction is ½, the C DNN setting information when the resolution ratio of the first image 115 in the horizontal direction is ¼ and the resolution ratio thereof in the vertical direction is 1, and the D DNN setting information when the resolution ratio of the first image 115 in the horizontal direction is 1 and the resolution ratio thereof in the vertical direction is ¼, may be obtained to set the second DNN.

According to another embodiment, the AI data may include an identifier of mutually agreed DNN setting information. The identifier of DNN setting information is information for distinguishing a pair of pieces of DNN setting information jointly trained between the first DNN and the second DNN, such that AI up-scaling is performed on the second image 135 to a target corresponding to resolution ratios in a horizontal direction and vertical direction targeted in AI down-scaling. The DNN controller 1236 may obtain the identifier of the DNN setting information included in the AI data, and then perform AI up-scaling on the second image 135 by using the DNN setting information indicated by the identifier of the DNN setting information. In this regard, an identifier indicating each of the plurality of pieces of DNN setting information settable in the first DNN and an identifier indicating each of the plurality of pieces of DNN setting information settable in the second DNN may be pre-assigned, and a same identifier may be assigned for a pair of pieces of DNN setting information jointly trained to be settable in each of the first DNN and the second DNN. The AI data may include the identifier of DNN setting information set in the first DNN to perform AI down-scaling on the original image 105. Upon obtaining the AI data, the DNN controller 1236 may perform AI up-scaling on the second image 135 at the certain resolution ratios of the first image 115 in the horizontal direction and vertical direction, by using the DNN setting information indicated by the identifier included in the AI data, from among the plurality of pieces of DNN setting information.

The DNN controller 1236 controls operations of the image processor 1238 according to the resolution ratios of the first image 115 in the horizontal direction and vertical direction. As will be described below, the image processor 1238 obtains a plurality of first intermediate images to be input to the second DNN via an image division process regarding the second image 135, and obtains the third image 145 via an image combination process regarding a plurality of second intermediate images output from the second DNN.

The DNN controller 1236 may determine the number of first intermediate images and the number of second intermediate images, according to the resolution ratios of the first image 115 in the horizontal direction and vertical direction. When the resolution ratio of the first image 115 in one of the horizontal direction and vertical direction is 1/n (n is a natural number) and the resolution ratio thereof in the other direction is 1/m (m is a natural number smaller than n), the DNN controller 1236 determines the number of first intermediate images to be n/m and determines the number of second intermediate images to be n×n. Here, resolution ratios of the first intermediate image and second intermediate image in a horizontal direction and vertical direction compared to the original image 105 are all 1/n. The number of first intermediate images and the number of second intermediate images corresponding to the resolution ratios of the first image 115 in the horizontal direction and vertical direction are shown in FIG. 16.

FIG. 16 is a diagram of the numbers of first intermediate images and second intermediate images related to a second DNN vary according to resolution ratios of a first image in a horizontal direction and vertical direction, according to an embodiment.

As shown in FIG. 16, when the resolution ratio in the horizontal direction is ½ and the resolution ratio in the vertical direction is 1, the numbers of first intermediate images and second intermediate images may be respectively 2 and 4. Also, when the resolution ratio in the horizontal direction is ¼ and the resolution ratio in the vertical direction is 1, the numbers of first intermediate images and second intermediate images may be respectively 4 and 16.

Figure 17:
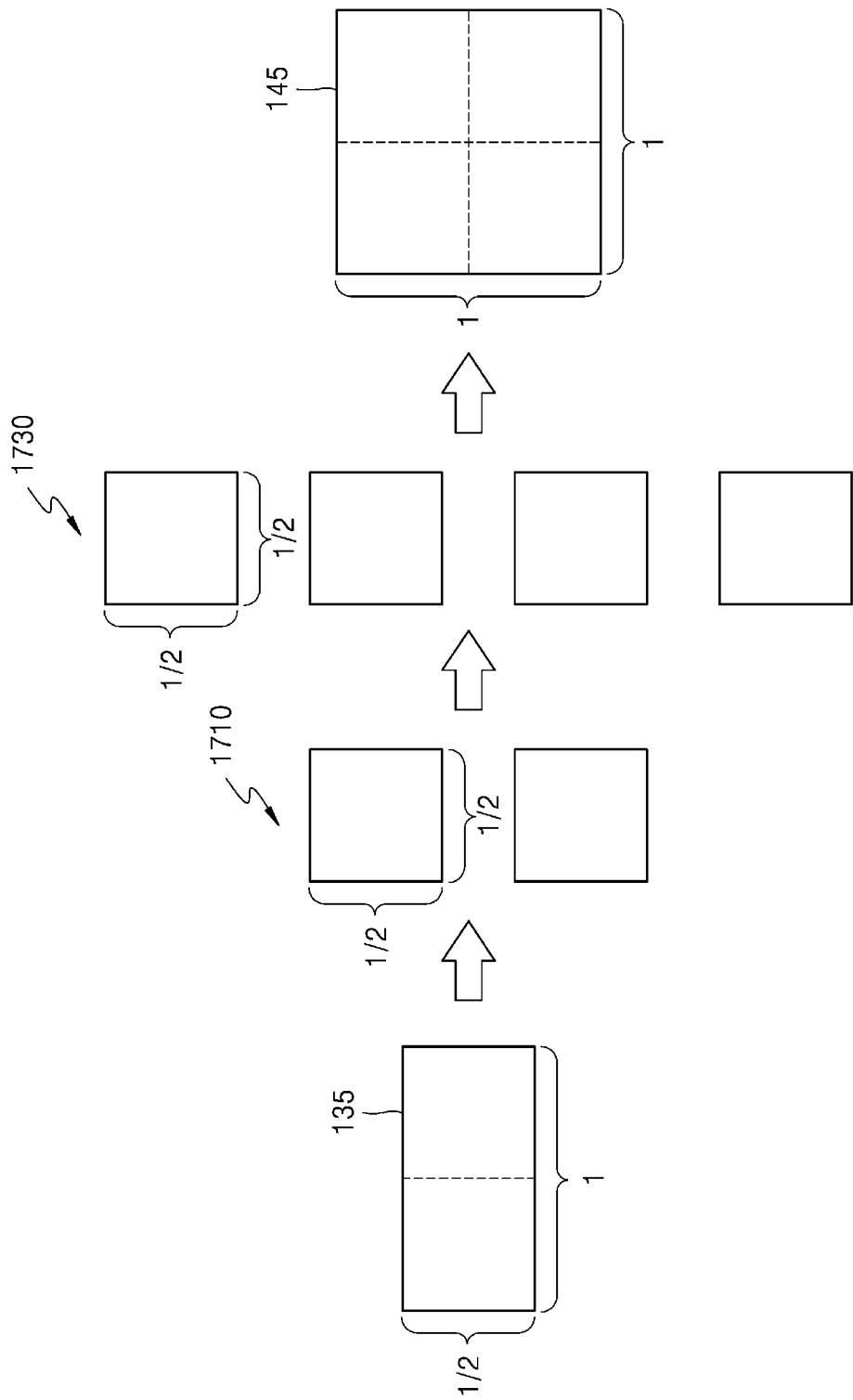
FIG. 17 is a diagram of a second image, a first intermediate image, a second intermediate image, and a third image when a resolution ratio of a first image in a vertical direction is ½ and a resolution ratio of the first image in a horizontal direction is 1, according to an embodiment.

FIG. 17 is a diagram of a second image, a first intermediate image, a second intermediate image, and a third image when a resolution ratio of a first image in a vertical direction is ½ and a resolution ratio of the first image in a horizontal direction is 1, according to an embodiment.

For example, when the resolution ratio of the first image 115 in the vertical direction is ½ and the resolution ratio thereof in the horizontal direction is 1, the resolution of the second image 135 is the same as the resolution of the first image 115, and thus the resolution ratio of the second image 135 in the vertical direction is ½ and the resolution ratio thereof in the horizontal direction is 1. Resolution ratios of first intermediate images 1710 obtained by dividing the second image 135 and second intermediate image 1730 output through the second DNN described below in a vertical direction and horizontal direction are ½. By combining the four second intermediate image 1730 in which the resolution ratios in the horizontal direction and vertical direction are ½, the third image 145 in which resolution ratios in a horizontal direction and vertical direction are both 1, i.e., a resolution in the vertical direction is increased by two times compared to the second image 135 and a resolution is the same as that of the original image 105, may be obtained.

Also, for example, when the resolution ratio of the first image 115 in the vertical direction is ¼ and the resolution ratio thereof in the horizontal direction is 1, the resolution of the second image 135 is the same as the resolution of the first image 115, and thus the resolution ratio of the second image 135 in the vertical direction is ¼ and the resolution ratio thereof in the horizontal direction is 1. The resolution ratios of the first intermediate images 1710 divided from the second image 135, and the second intermediate image 1730 in the vertical direction and horizontal direction are ¼. By combining the 16 second intermediate image 1730 in which the resolution ratios in the horizontal direction and vertical direction are ¼, the third image 145 in which the resolution ratios in the horizontal direction and vertical direction are both 1 may be obtained.

As described above, the DNN controller 1236 obtains the DNN setting information mapped to the resolution ratios of the first image 115 in the horizontal direction and vertical direction, from among the plurality of pieces of DNN setting information. When the resolution ratio of the first image 115 in one of the horizontal direction and vertical direction is 1/n (n is a natural number) and the resolution ratio thereof in the other direction is 1/m (m is a natural number smaller than n), the DNN setting information mapped to the resolution ratios in the horizontal direction and vertical direction may include n×n pieces of information about the number of filter kernels of a last convolution layer from among a plurality of convolution layers constituting the second DNN. The number of filter kernels being n×n denotes that n×n second intermediate images are output from the last convolution layer. In other words, when the DNN setting information mapped to the resolution ratios of the first image 115 in the horizontal direction and vertical direction is set to the second DNN, n/m first intermediate images may be processed by the second DNN, and as a result, n×n second intermediate images may be output from the second DNN.

The image processor 1238 obtains, from the second image 135, the first intermediate images in the number determined by the DNN controller 1236, and obtains the third image 145 by combining the second intermediate images in the number determined by the DNN controller 1236.

Figure 18:
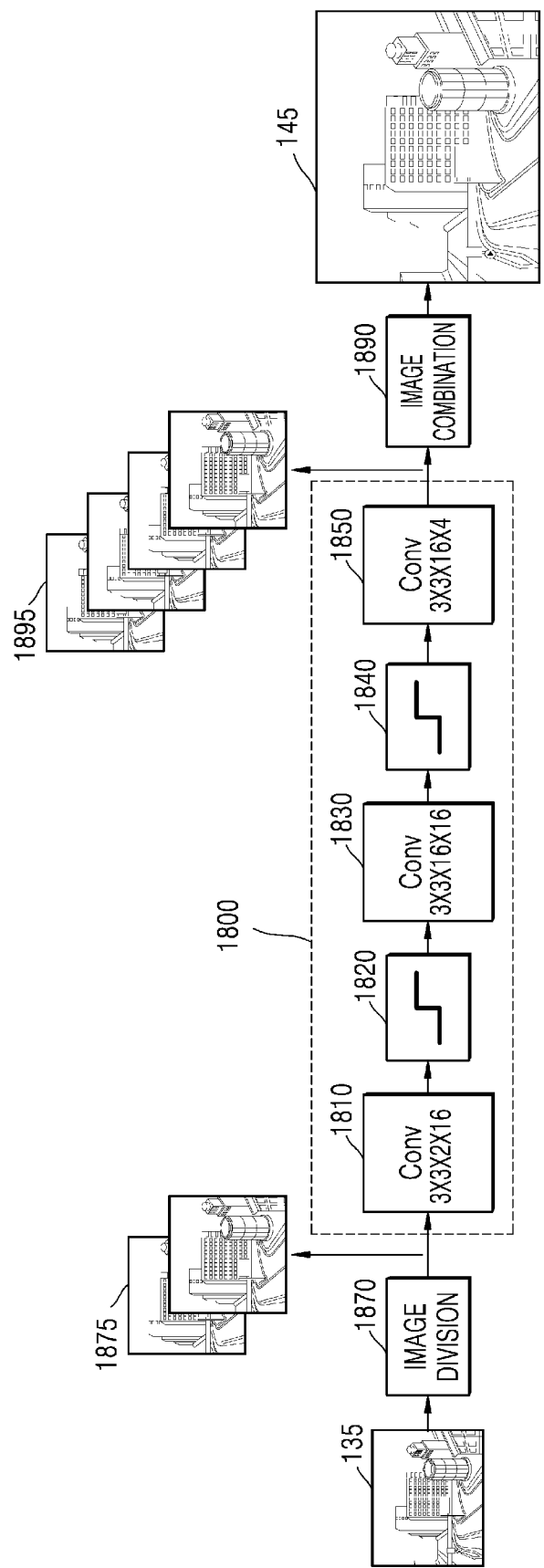
FIG. 18 is a diagram of a second DNN for AI up-scaling of a second image, according to an embodiment.

FIG. 18 is a diagram of a second DNN for AI up-scaling of a second image, according to an embodiment. Hereinafter, a second DNN 1800 according to another embodiment will be described with reference to FIG. 18.

As shown in FIG. 18, the second DNN 1800 may include a first convolution layer 1810, a first activation layer 1820, a second convolution layer 1830, a second activation layer 1840, and a third convolution layer 1850. First intermediate images 1875 obtained via an image division process 1870 of the second image 135 are input to the second DNN 1800, and the third image 145 is obtained via an image combination process 1890 of second intermediate images 1895 output from the second DNN 1800. The image division process 1870 and the image combination process 1890 are performed by the image processor 1238.

The number of first intermediate images 1875 and the number of second intermediate images 1895 are determined according to the resolution ratios of the first image 115 in the horizontal direction and vertical direction, and thus the image division process 1870 and the image combination process 1890 of the image processor 1238 also need to be performed according to the resolution ratios of the first image 115 in the horizontal direction and vertical direction. In other words, the image processor 1238 obtains the first intermediate images 1875 in the number determined according to the resolution ratios of the first image 115 in the horizontal direction and vertical direction, via the image division process 1870, and obtains the third image 145 by combining the second intermediate images 1895 in the number determined according to the resolution ratios of the first image 115 in the horizontal direction and vertical direction.

The plurality of first intermediate images 1875 are obtained via the image division process 1870 regarding the second image 135, and the plurality of first intermediate images 1875 are input to the first convolution layer 1810.

First, an image division method by the image processor 1238 will be described with reference to FIGS. 19 through 21.

Figure 19:
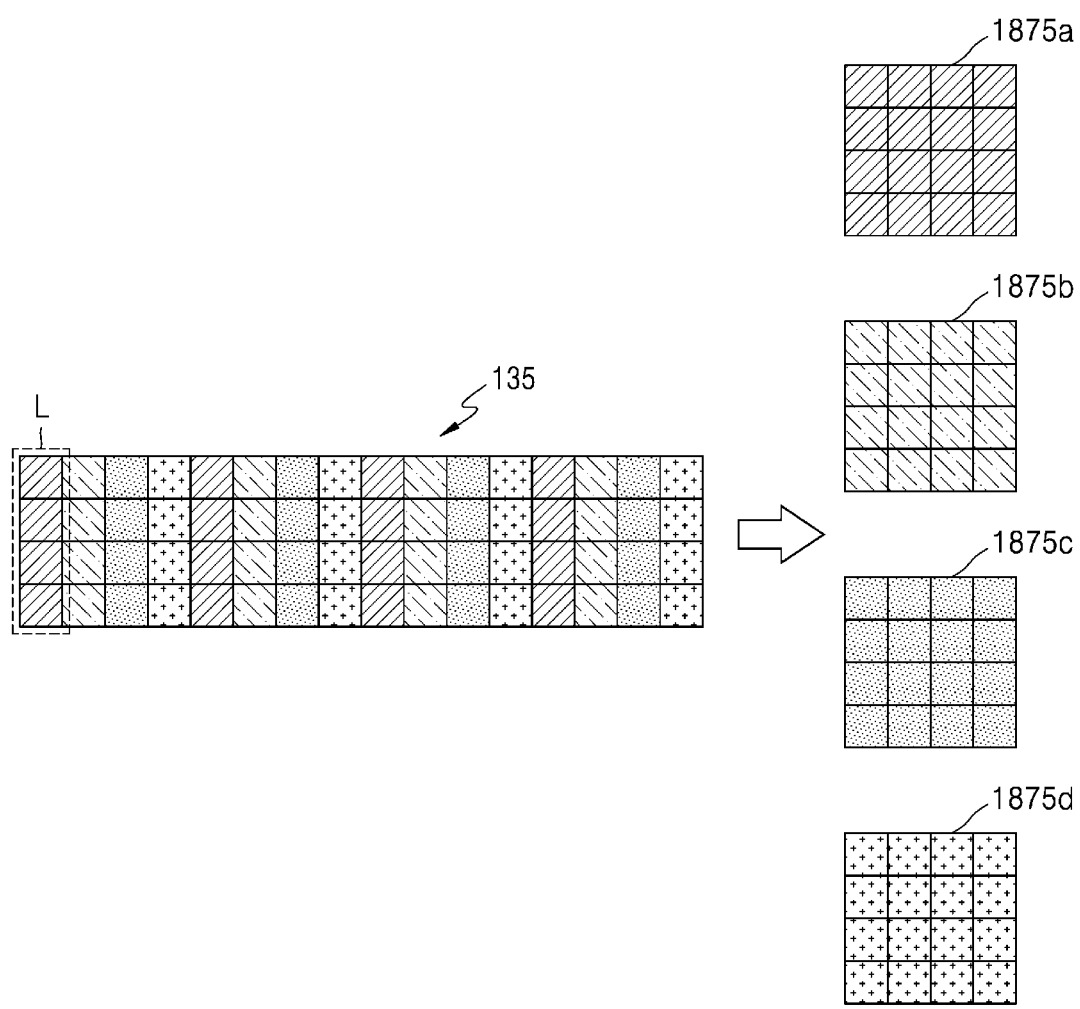
FIG. 19 is a diagram of a method of obtaining a first intermediate image, according to an embodiment.

FIG. 19 is a diagram of a method of obtaining a first intermediate image, according to an embodiment.

The image processor 1238 may obtain a plurality of first intermediate images 1875a through 1875d by connecting some pixel lines from among pixel lines L in the second image 135. Here, the pixel lines L of the second image 135 may be alternately included in the plurality of first intermediate images 1875a through 1875d. For example, when the required number of first intermediate images is 4, a first pixel line, a fifth pixel line, a ninth pixel line, and the like of the second image 135 are included in any one first intermediate image (for example, the first intermediate image 1875a), a second pixel line, a sixth pixel line, tenth pixel line, and the like of the second image 135 are included in another first intermediate image (for example, the first intermediate image 1875b), and a third pixel line, a seventh pixel line, an eleventh pixel line, and the like of the second image 135 are included in another first intermediate image (for example, the first intermediate image 1875c). A fourth pixel line, an eighth pixel line, a twelfth pixel line, and the like of the second image 135 are included in another first intermediate image (for example, the first intermediate image 1875d). FIG. 19 illustrates an example where the pixel lines L of the second image 135 correspond to a column of pixels in the second image 135, but this is an example when the resolution ratio of the second image 135 in the horizontal direction is greater than the resolution ratio thereof in the vertical direction, and when the resolution ratio of the second image 135 in the vertical direction is greater than the resolution ratio thereof in the horizontal direction, the pixel lines of the second image 135 may correspond to a row of pixels in the second image 135.

Figure 20:
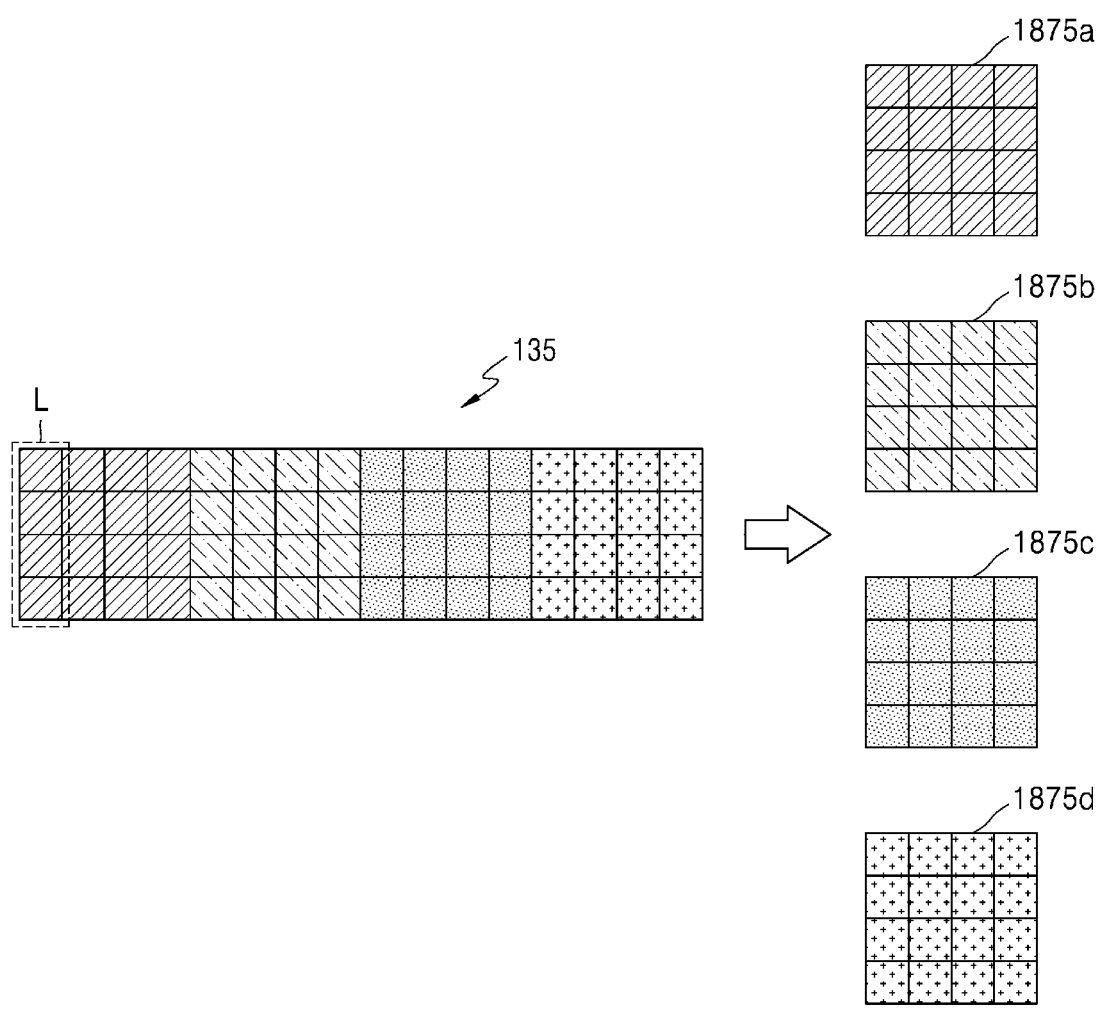
FIG. 20 is a diagram of a method of obtaining a first intermediate image, according to an embodiment.

FIG. 20 is a diagram of a method of obtaining a first intermediate image, according to an embodiment.

The image processor 1238 may obtain the plurality of first intermediate images 1875a through 1875d by using some adjacent pixel lines from among the pixel lines L in the second image 135. In other words, when four first intermediate images are required, first pixel line through $n^{th}$ pixel line from among the pixel lines of the second image 135 configure one first intermediate image (for example, the first intermediate image 1875a), and $n+1^{th}$ pixel line to $m^{th}$ pixel line configure another first intermediate image (for example, the first intermediate image 1875b). Also, $m+1^{th}$ pixel line to kth pixel line configure another first intermediate image (for example, the first intermediate image 1875c), and $k+1^{th}$ pixel line to $p^{th}$ pixel line configure another first intermediate image (for example, the first intermediate image 1875d). FIG. 20 illustrates an example where the pixel lines L of the second image 135 correspond to a column of pixels in the second image 135, but this is an example when the resolution ratio of the second image 135 in the horizontal direction is greater than the resolution ratio thereof in the vertical direction, and when the resolution ratio of the second image 135 in the vertical direction is greater than the resolution ratio thereof in the horizontal direction, the pixel lines of the second image 135 may correspond to a row of pixels in the second image 135.

Figure 21:
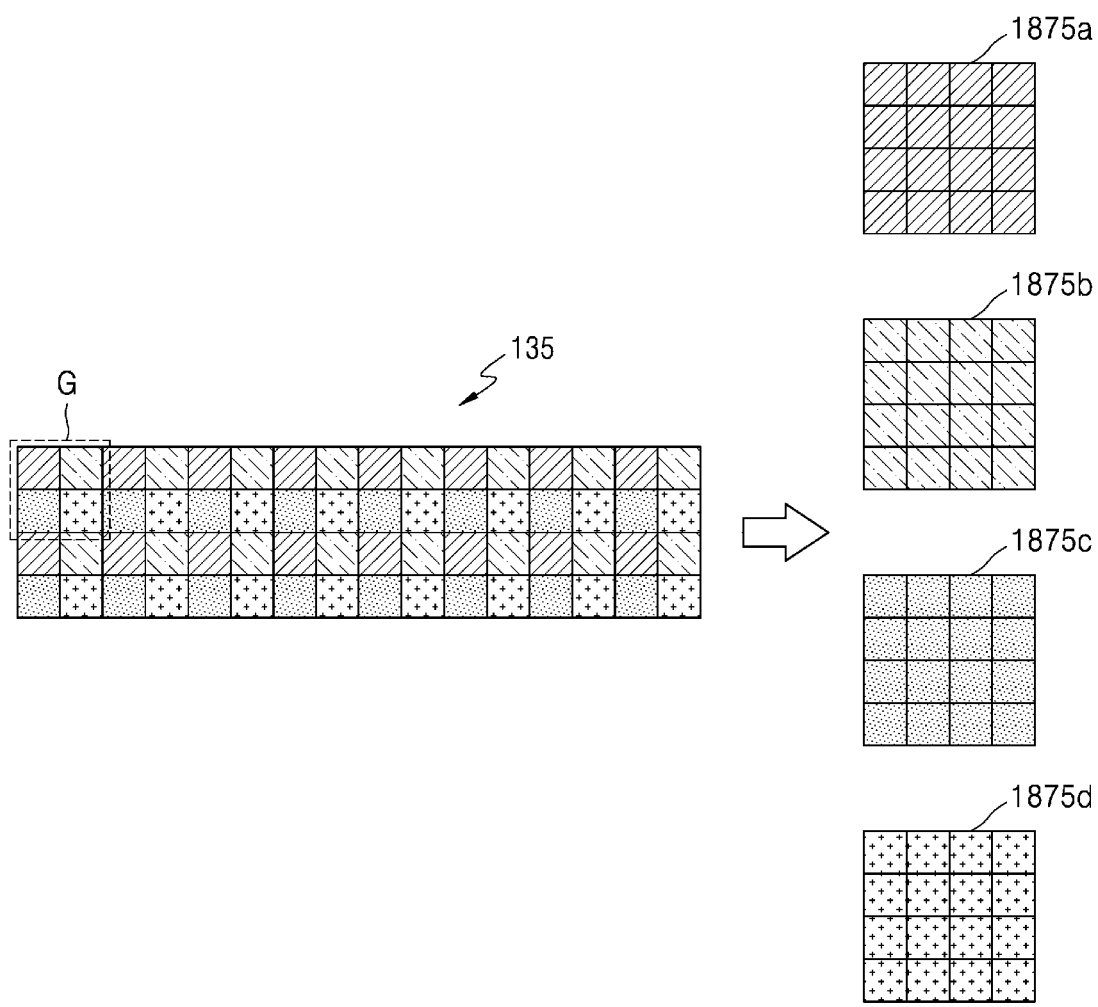
FIG. 21 is a diagram of a method of obtaining a first intermediate image, according to an embodiment.

FIG. 21 is a diagram of a method of obtaining a first intermediate image, according to an embodiment.

The image processor 1238 may obtain the plurality of first intermediate images 1875a through 1875d including some pixels from among pixels configuring the second image 135. For example, a pixel group G including pixels in the same number as the required number of first intermediate images is determined in the second image 135, and the plurality of first intermediate images 1875a through 1875d may be obtained by combining the pixels included in each pixel group. As shown in FIG. 21, when the four first intermediate images 1875a through 1875d are required, pixels located at the top left from among the pixels included in each pixel group G configure one first intermediate image (for example, the first intermediate image 1875a), and pixels located at the top right configure another first intermediate image (for example, the first intermediate image 1875b), and pixels located at the bottom left configure another first intermediate image (for example, the first intermediate image 1875c). Pixels located at the bottom right configure another first intermediate image (for example, the first intermediate image 1875d). The image division method shown in FIG. 21 may correspond to sub-sampling.

Referring to the division methods shown in FIGS. 19 through 21, it is identified that image division is performed such that a greater resolution ratio from among the resolution ratios of the second image 135 in the horizontal direction and vertical direction is reduced. In other words, when the resolution ratio of the second image 135 shown in FIGS. 19 through 21 in the horizontal direction is a and the resolution ratio thereof in the vertical direction is b that is smaller than a, resolution ratios of the first intermediate images 1875a through 1875d in one direction may be b and resolution ratios thereof in another direction may have a value smaller than a, as the image division is performed such that the resolution ratio in the horizontal direction is reduced.

The image processor 1238 may obtain the plurality of first intermediate images 1875 according to any one of the division methods shown in FIGS. 19 through 21, but this is only an example, and various methods may be used to obtain the first intermediate images 1875 in a pre-determined number by dividing the second image 135. As will be described below, the first image 115 may be obtained by combining the second intermediate images output from the first DNN for AI down-scaling, and the image processor 1238 may obtain the first intermediate images 1875 according to a division method corresponding to a combination method of the second intermediate images used by the AI encoding apparatus 2700. For example, when the AI encoding apparatus 2700 obtains the first image 115 by alternately combining pixel lines included in the second intermediate images, the image processor 1238 may obtain the plurality of first intermediate images 1875 by alternately separating the pixel lines of the second image 135.

Referring back to FIG. 18, upon receiving the plurality of first intermediate images 1875, the first convolution layer 1810 outputs feature maps by performing convolution on the plurality of first intermediate images 1875 by using a filter kernel. 3×3×2×16 indicated in the first convolution layer 1810 shown in FIG. 18 indicates that the convolution is performed on the two first intermediate images 1875 by using 16 filter kernels having a size of 3×3. DNN setting information set in the second DNN 1800 is determined according to the resolution ratios of the first image 115 in the horizontal direction and vertical direction, and in this case, the DNN setting information enables the first convolution layer 1810 to process the first intermediate images 1875 in the number determined according to the resolution ratios of the first image 115 in the horizontal direction and vertical direction. In other words, in the example of FIG. 18, when the DNN setting information is set in the second DNN 1800, the first convolution layer 1810 is able to process the two first intermediate images 1875.

The 16 feature maps are generated as a result of performing the convolution by the first convolution layer 1810. Each feature map indicates unique features of the first intermediate images 1875. For example, each feature map may indicate a vertical direction feature, a horizontal direction feature, or an edge feature of the first intermediate images 1875.

The feature maps output from the first convolution layer 1810 are input to the first activation layer 1820. The first activation layer 1820 may assign a non-linear feature to each feature map. The first activation layer 1820 may include a sigmoid function, a Tan h function, a ReLU function, or the like, but is not limited thereto.

The first activation layer 1820 assigning the non-linear feature indicates that some sample values of the feature map, which is an output through the first convolution layer 1810, are changed. Here, the change is performed by applying the non-linear feature.

The first activation layer 1820 determines whether to transmit the sample values of the feature maps output from the first convolution layer 1810 to the second convolution layer 1830. For example, some of the sample values of the feature maps are activated by the first activation layer 1820 and transmitted to the second convolution layer 1830, and some sample values are deactivated by the first activation layer 1820 and not transmitted to the second convolution layer 1830. The unique features of the first intermediate image 1875 indicated by the feature maps are emphasized by the first activation layer 1820.

Feature maps output from the first activation layer 1820 are input to the second convolution layer 1830. 3×3×16×16 indicated in the second convolution layer 1830 indicates that a convolution process is performed on the 16 feature maps by using 16 filter kernels having a size of 3×3.

The 16 feature maps output from the second convolution layer 1830 are input to the second activation layer 1840. The second activation layer 1840 may assign a non-linear feature to the input feature maps.

The feature maps output from the second activation layer 1840 are input to the third convolution layer 1850. 3×3×16×4 indicated in the third convolution layer 1850 indicates that a convolution process is performed on the 16 feature maps by using 4 filter kernels having a size of 3×3 so as to generate the four second intermediate images 1895. As described above, the DNN setting information set in the second DNN 1800 is determined according to the resolution ratios of the first image 115 in the horizontal direction and vertical direction, and in this case, the DNN setting information enables a last convolution layer, i.e., the third convolution layer 1850, to output the second intermediate images 1895 in the number determined according to the resolution ratios of the first image 115 in the horizontal direction and vertical direction. In other words, in the example of FIG. 18, when the DNN setting information is set in the second DNN 1800, the third convolution layer 1850 is able to output the four second intermediate images 1895.

The third image 145 is obtained via the image combination process 1890 of the second intermediate images 1895 output from the third convolution layer 1850.

Hereinafter, an image combination method will be described with reference to FIGS. 22 through 24.

Figure 22:
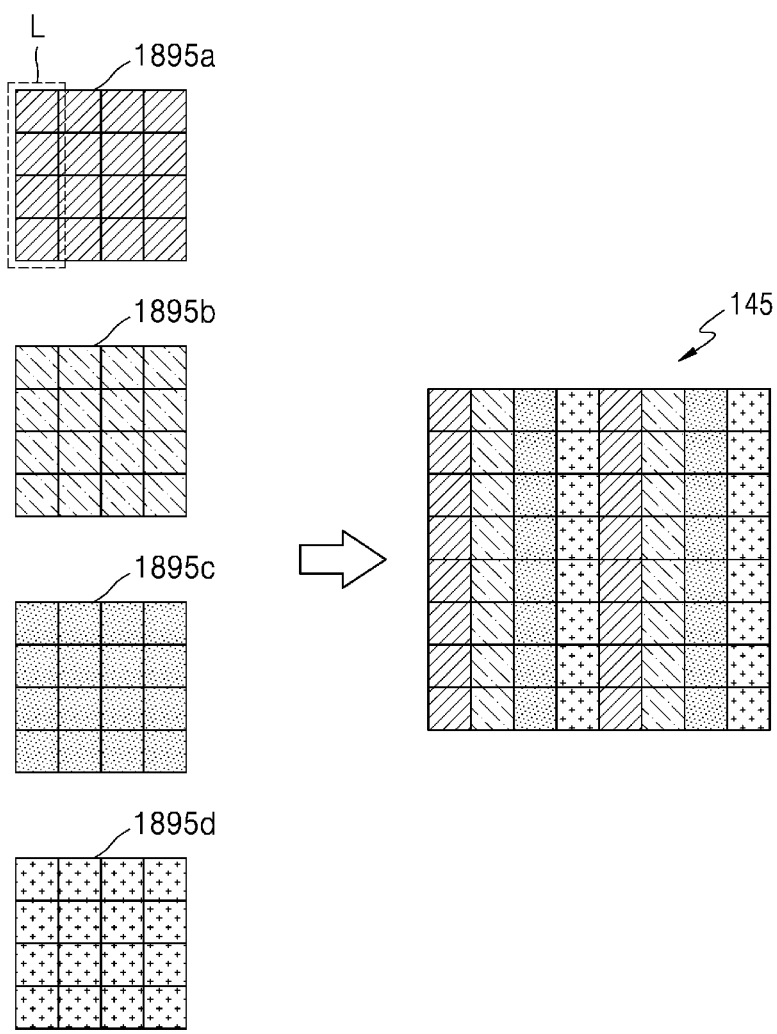
FIG. 22 is a diagram of a method of obtaining a third image from a second intermediate image, according to an embodiment.
Figure 23:
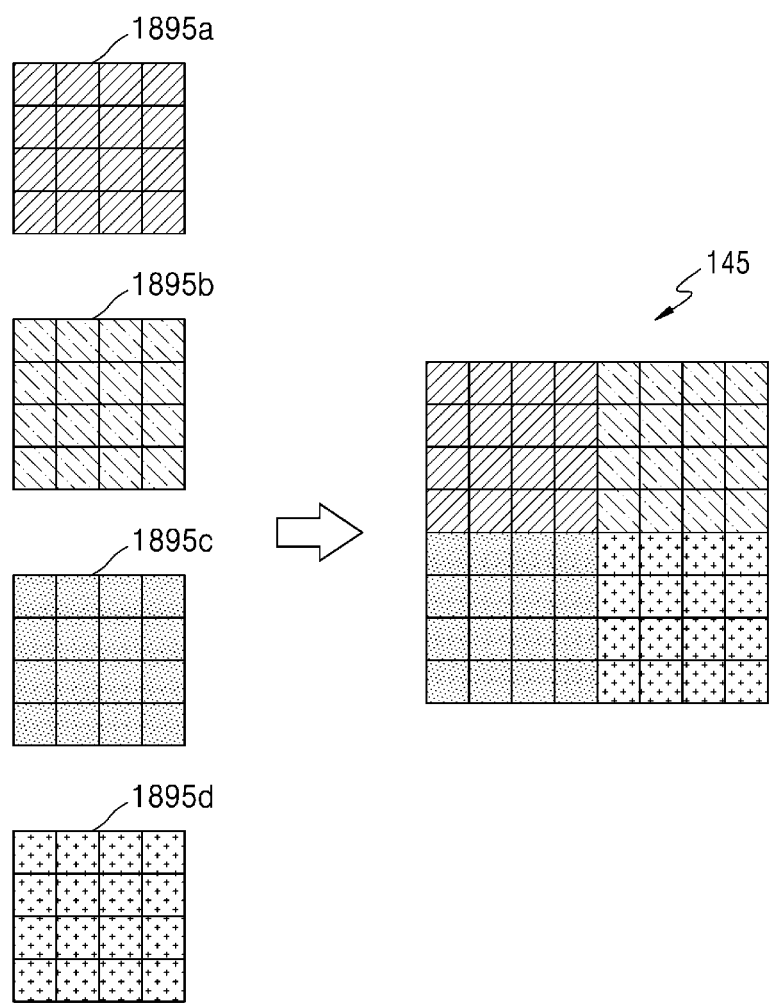
FIG. 23 is a diagram of a method of obtaining a third image from a second intermediate image, according to an embodiment.
Figure 24:
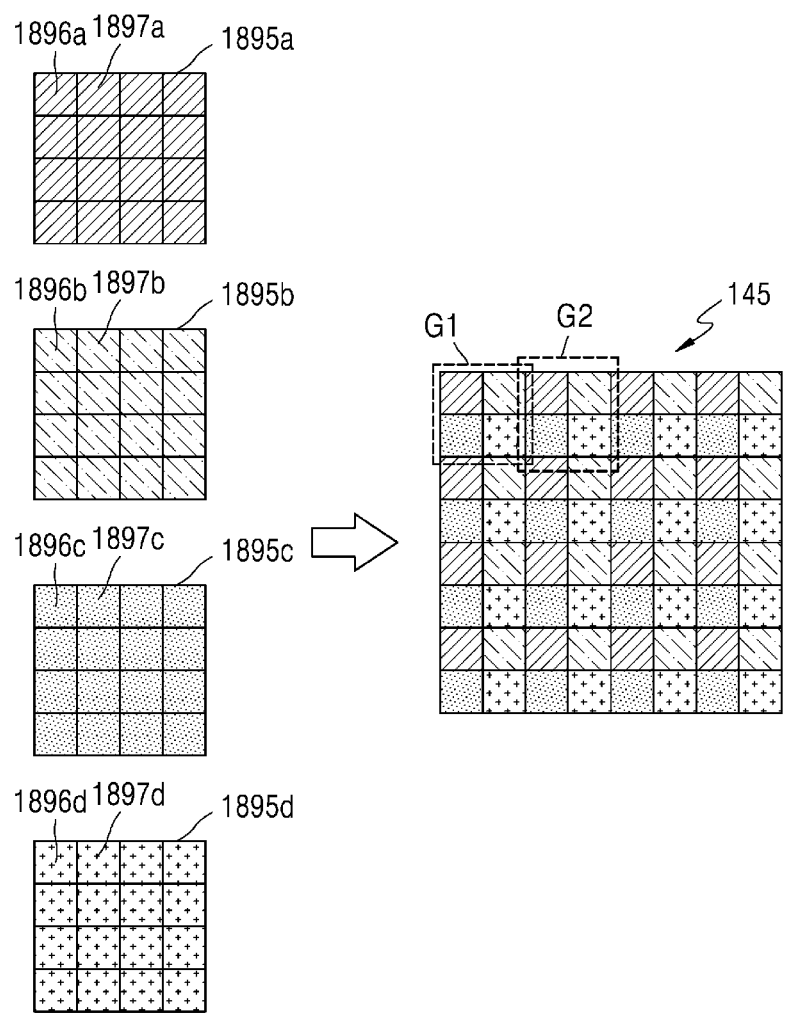
FIG. 24 is a diagram of a method of obtaining a third image from a second intermediate image, according to an embodiment.

FIGS. 22-24 are diagrams of a method of obtaining a third image from a second intermediate image, according to an embodiment.

As shown in FIG. 22, the image processor 1238 may obtain the third image 145 by alternately connecting the pixel lines L of second intermediate images 1895*a* through 1895*d*. Because the resolution of the third image 145 is the same as that of the original image 105, when resolution ratios of the second intermediate images 1895*a* through 1895*d* in a horizontal direction and vertical direction are 1/n, the third image 145 having the same resolution as the original image 105 may be obtained by combining n×n second intermediate images 1895*a* through 1895*d*. In FIG. 22, the number of second intermediate images 1895*a* through 1895*d* is 4, and thus it is identified that the resolution ratios of the second intermediate images 1895*a* through 1895*d* in the horizontal direction and vertical direction are ½.

Also, as shown in FIG. 23, the image processor 1238 may obtain the third image 145 may connecting the second intermediate images 1895*a* through 1895*d* to each other.

Also, as shown in FIG. 24, the image processor 1238 may obtain the third image 145 by arranging each of pixels of the second intermediate images 1895*a* through 1895*d* at a pre-assigned location. In detail, the third image 145 may be obtained by connecting a pixel group G1 including first pixels 1896*a* through 1896*d* of the second intermediate images 1895*a* through 1895*d*, a pixel group G2 including second pixels 1897*a* through 1897*d* of the second intermediate images 1895*a* through 1895*d*, and the like to each other.

Referring to the combination method shown in FIGS. 22 through 24, when a resolution of the n×n second intermediate images 1895*a* through 1895*d* in the horizontal direction is a and a resolution thereof in the vertical direction is b, a resolution of the third image 145 in the horizontal direction may be a×n and a resolution thereof in the vertical direction may be b×n.

The image processor 1238 may combine the plurality of second intermediate images 1895 according to any one of the combination methods shown in FIGS. 22 through 24. The combination methods shown in FIGS. 22 through 24 are only examples, and various methods of obtaining the third image 145 having the same resolution as the original image 105 by combining the n×n second intermediate images 1895 may be used. As will be described below, the first intermediate images obtained via image division regarding the original image 105 may be input to the first DNN for AI down-scaling of the original image 105, and the image processor 1238 may combine the second intermediate images 1895 according to a combination method corresponding to a division method of the original image 105 used by the AI encoding apparatus 2700. For example, when the AI encoding apparatus 2700 obtains the first intermediate images by alternately separating the pixels of the original image 105, the image processor 1238 may obtain the third image 145 by alternately connecting the pixels of the second intermediate images 1895 (see FIG. 24).

FIG. 18 illustrates an example where the second DNN 1800 includes three convolution layers and two activation layers, but this is only an example, and according to an embodiment, the numbers of convolution layers and activation layers may variously change. Also, according to an embodiment, the second DNN 1800 may be implemented as an RNN. In this case, a CNN structure of the second DNN 1800 according to an embodiment of the disclosure is changed to an RNN structure.

According to an embodiment, the AI up-scaler 1234 may include at least one ALU for a convolution operation and an operation of an activation layer. The ALU may be embodied as a processor. For the convolution operation, the ALU may include a multiplier for performing multiplication between sample values of a feature map output from the first intermediate image 1875 or previous layer, and sample values of a filter kernel, and an adder for adding result values of the multiplication. Also, for the operation of the activation layer, the ALU may include a multiplier for multiplying an input sample value by a weight used in a pre-determined sigmoid function, Tan h function, or ReLU function, and a comparator for comparing a multiplication result with a certain value to determine whether to transmit the input sample value to a next layer.

Figure 25:
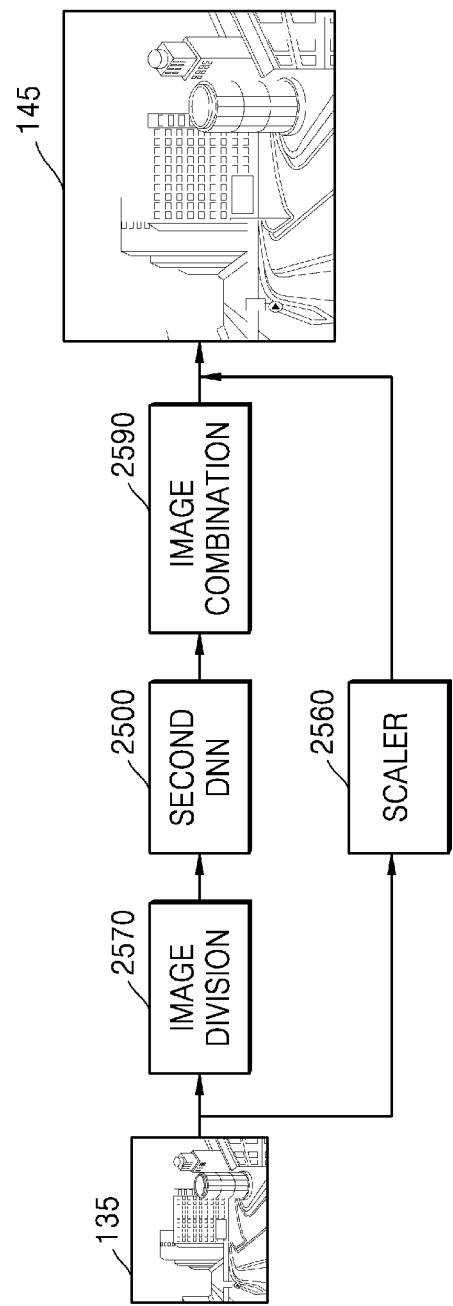
FIG. 25 is a diagram of an AI up-scaling method using a second DNN, according to an embodiment.

FIG. 25 is a diagram of an AI up-scaling method using a second DNN, according to an embodiment.

According to an embodiment, the second DNN 2500 shown in FIG. 25 may have a same structure as the second DNN 1800 shown in FIG. 18. In other words, the second DNN 2500 may include, like the second DNN 1800 shown in FIG. 18, a first convolution layer, a first activation layer, a second convolution layer, a second activation layer, and a third convolution layer. However, unlike the second DNN 1800 of FIG. 18, the second DNN 2500 is used for a skip connection structure, and thus parameters of filter kernels of the second DNN 2500 may be different from parameters of filter kernels of the second DNN 1800 of FIG. 18. It is obvious that the second DNN 2500 may have a different structure from the second DNN 1800 of FIG. 18, according to an embodiment.

First intermediate images obtained via an image division process 2570 of the second image 135 are input to the second DNN 2500, and the third image 145 is obtained via an image combination process 2590 of second intermediate image output from the second DNN 2500.

The skip connection structure is used during an AI up-scaling process shown in FIG. 25. Separately from the first intermediate images obtained as a result of image division regarding the second image 135 being processed in the second DNN 2500, the third image 145 may be obtained as the second image 135 is scaled by a scaler 2560 and then added to an image generated as a result of the image combination process 2590.

The scaler 2560 increases the resolution of the second image 135 according to the resolution ratios of the first image 115 in the horizontal direction and vertical direction. As a result of the scaling, the resolution of the second image 135 becomes the same as the resolution of the original image 105. The scaler 2560 may include, for example, at least one of a bilinear scaler, a bicubic scaler, a Lanczos scaler, and a stair step scaler. According to an embodiment, the scaler 2560 may be replaced by a convolution layer for increasing the resolution of the second image 135.

During the AI up-scaling process shown in FIG. 25, a third image of a prediction version is obtained via the scaler 2560, and a third image of a residual version is obtained via the second DNN 2500. The third image 145 may be obtained by adding the third image of the prediction version and the third image of the residual version.

The second DNN 1800 operates according to the DNN setting information obtained by the DNN controller 1236 described above, and the DNN setting information enables the second DNN 1800 to process the first intermediate images 1875 in the number corresponding to the resolution ratios of the first image 115 in the horizontal direction and vertical direction, and output the second intermediate images 1895 in the number corresponding to the resolution ratios of the first image 115 in the horizontal direction and vertical direction.

According to an embodiment, a structure of the second DNN, i.e., the number of convolution layers and the number of filter kernels, may be fixed, and only parameters of the filter kernels may be changed according to the plurality of pieces of DNN setting information. In other words, because the structure of the second DNN is fixed, the second DNN may process the first intermediate images in the pre-determined number (for example, 2), and output the second intermediate images in the pre-determined number (for example, 4). The DNN controller 1236 may obtain the DNN setting information mapped to the information related to the first image 115, which is included in the AI data, from among the plurality of pieces of DNN setting information, and set the DNN setting information in the second DNN.

The number of first intermediate images that are able to be processed by the second DNN and the number of second intermediate images output by the second DNN being fixed to specific numbers may indicate that the image processor 1238 obtains the pre-determined number of first intermediate images from the second image 135 and combines the pre-determined number of second intermediate images, and at the same time, the second DNN operates to increase the resolution of the second image 135 in the horizontal direction or vertical direction to a fixed magnification. In other words, when the second DNN outputs four second intermediate images by processing two first intermediate images obtained by dividing the second image 135, the resolution of the third image 145 in the horizontal direction or vertical direction, the third image 145 being obtained by combining the four second intermediate images, is two times the resolution of the second image 135 in the horizontal direction or vertical direction.

A method of performing AI up-scaling on the second image 135 according to the resolution ratios of the first image 115 in the horizontal direction and vertical direction, when the structure of the second DNN is fixed, will be described.

Figure 26:
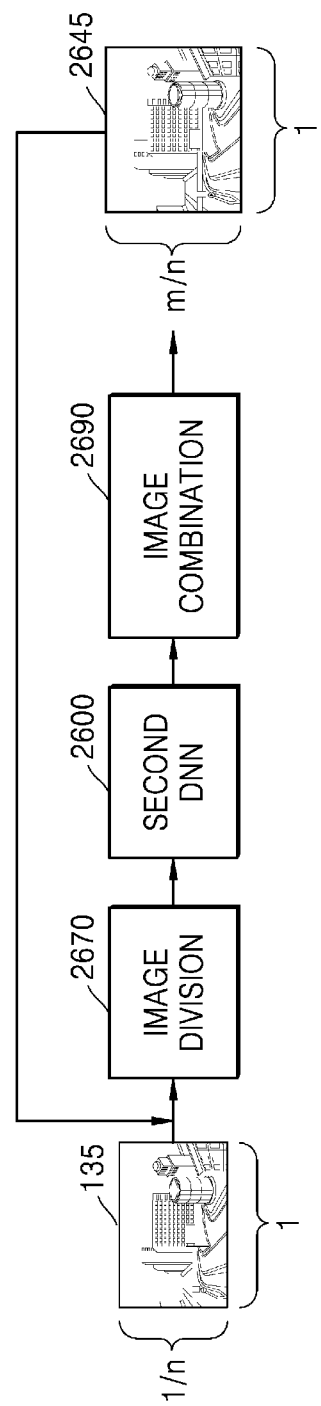
FIG. 26 is a diagram of an AI up-scaling method using a second DNN, according to an embodiment.

FIG. 26 is a diagram of an AI up-scaling method using a second DNN, according to an embodiment.

The second DNN 2600 includes a plurality of convolution layers, and the number of first intermediate images processed by a first convolution layer and the number of second intermediate images output by a last convolution layer are pre-determined.

The second image 135, in which the resolution ratio in the horizontal direction is 1 and the resolution ratio in the vertical direction is $1/n$ (n is a natural number), is input to the second DNN 2600 via an image division process 2670. An image 2645, in which a resolution ratio in a horizontal direction is 1 and a resolution ratio in a vertical direction is $m/n$ (m is a natural number), is obtained from combination 2690 of the second intermediate images output from the second DNN 2600. In other words, it is verified that a resolution of the second image 135 in the vertical direction is increased by m times, via the image division 2670, the second DNN 2600, and the image combination 2690.

FIG. 26 illustrates an example where the resolution of the second image 135 in the vertical direction is increased by m times via the image division 2670, the second DNN 2600, and the image combination 2690, but when the second image 135, in which the resolution ratio in the horizontal direction is 1/n and the resolution ratio in the vertical direction is 1, passes through the image division process 2670, the second DNN 2600, and the image combination process 2690, the image 2645, in which the resolution ratio in the horizontal direction is m/n and the resolution ratio in the vertical direction is 1, is obtained. This is because, as described above, the image division 2670 is performed such that a greater resolution ratio of an image to be divided from among a resolution ratio in a horizontal direction and a resolution ratio in a vertical direction is reduced (see FIGS. 19 through 21), and second intermediate images are combined with each other in a horizontal direction and a vertical direction (see FIGS. 22 through 24). As will be described below, when the number of operations of the second DNN is determined to be a plurality of times and resolution ratios of an image (for example, the image 2645) in a horizontal direction and vertical direction, the image being a target of the image division 2670 during an operation process, are the same, the image division 2670 may be performed such that the resolution ratio in any direction is reduced.

As shown in FIG. 26, when a resolution in any one direction is increased by m times via the image division process 2670, the second DNN 2600, and the image combination process 2690, the DNN controller 1236 may determine the number of operations of the second DNN 2600 according to the resolution ratios of the first image 115 in the horizontal direction and vertical direction. In detail, when the resolution ratio of the first image 115 in the horizontal direction is $1/m^a$ (a is an integer equal to or greater than 0), and the resolution ratio thereof in the vertical direction is $1/m^b$ (b is an integer equal to or greater than 0), the DNN controller 1236 may determine the number of operations of the second DNN 2600 to be a+b. Accordingly, the third image 145 may be obtained via the image division process 2670, a process by the second DNN 2600, and the image combination process 2690 performed a+b times.

For example, a case in which resolution in any one direction is increased by two times via the image division process 2670, the second DNN 2600, and the image combination process 2690, the resolution ratio of the first image 115 in the horizontal direction is $\frac{1}{2}^0$, and the resolution ratio thereof in the vertical direction is $\frac{1}{2}^2$ is assumed. During a first operation, the two first intermediate images obtained by dividing the second image 135 are processed by the second DNN 2600, and the image 2645 in which the resolution ratio in the horizontal direction is $\frac{1}{2}^0$ and the resolution ratio in the vertical direction is $\frac{1}{2}^1$ is obtained as the four second intermediate image obtained as a result of the processing are combined. During a second operation, the image division 2670 is applied to the image 2645 obtained via the image combination process 2690, and the two first intermediate images obtained as a result of the application are processed by the second DNN 2600. Also, when the four second intermediate images output from the second DNN 2600 are combined, the third image 145 in which the resolution ratios in the horizontal direction and vertical direction are both $\frac{1}{2}^0$ may be obtained.

According to an embodiment, the second DNN may include a DNN for increasing a resolution in a horizontal direction by a fixed magnification, and a DNN for increasing a resolution in a vertical direction by a fixed magnification. When the resolution ratio of the first image 115 in the horizontal direction is $1/m^a$ (m is a natural number and a is an integer equal to or greater than 0), the resolution ratio thereof in the vertical direction is $1/m^b$ (b is an integer equal to or greater than 0), and the fixed magnification is m, the DNN controller 1236 may determine the number of operations of the DNN for increasing the resolution in the horizontal direction by the fixed magnification to a times, and the number of operations of the DNN for increasing the resolution in the vertical direction by the fixed magnification to b times. The image processor 1238 may obtain first intermediate images in a fixed number for the DNN for increasing the resolution in the horizontal direction by the fixed magnification and the DNN for increasing the resolution in the vertical direction by the fixed magnification, and combine second intermediate image in a fixed number. Here, the image processor 1238 divides an image on which the image division 2670 is performed such that a resolution ratio in a vertical direction is reduced when it is a turn of the DNN for increasing the resolution in the horizontal direction by the fixed magnification to operate, and divide the image on which the image division 2670 is performed such that a resolution ratio in a horizontal direction is reduced when it is a turn of the DNN for increasing the resolution in the vertical direction by the fixed magnification to operate.

According to an embodiment, the AI decoding apparatus 1200 may perform AI up-scaling on the second image 135 by a same magnification in a horizontal direction and a vertical direction, according to details described with reference to FIG. 2, or perform AI up-scaling on the second image 135 by different magnifications in the horizontal direction and the vertical direction, according to details described with reference to FIG. 12. When the second image 135 includes a plurality of frames, which one of a method of performing AI up-scaling on the second image 135 by the same magnification in the horizontal direction and the vertical direction and a method of performing AI up-scaling on the second image 135 by the different magnifications in the horizontal direction and the vertical direction is to be used may be determined for each frame of the second image 135, or determined for each frame where a scene change occurs. Alternatively, how to perform AI up-scaling may be determined for each group of pictures (GOP) including a plurality of frames. When it is possible to identify, from the AI data, the resolution ratios of the first image 115 in the horizontal direction and vertical direction, the AI decoding apparatus 1200 may perform AI up-scaling on the second image 135 by the different magnifications in the horizontal direction and the vertical direction, and when it is impossible to identify, from the AI data, the resolution ratios of the first image 115 in the horizontal direction and vertical direction, the AI decoding apparatus 1200 may perform AI up-scaling on the second image 135 by the same magnification in the horizontal direction and the vertical direction.

Figure 27:
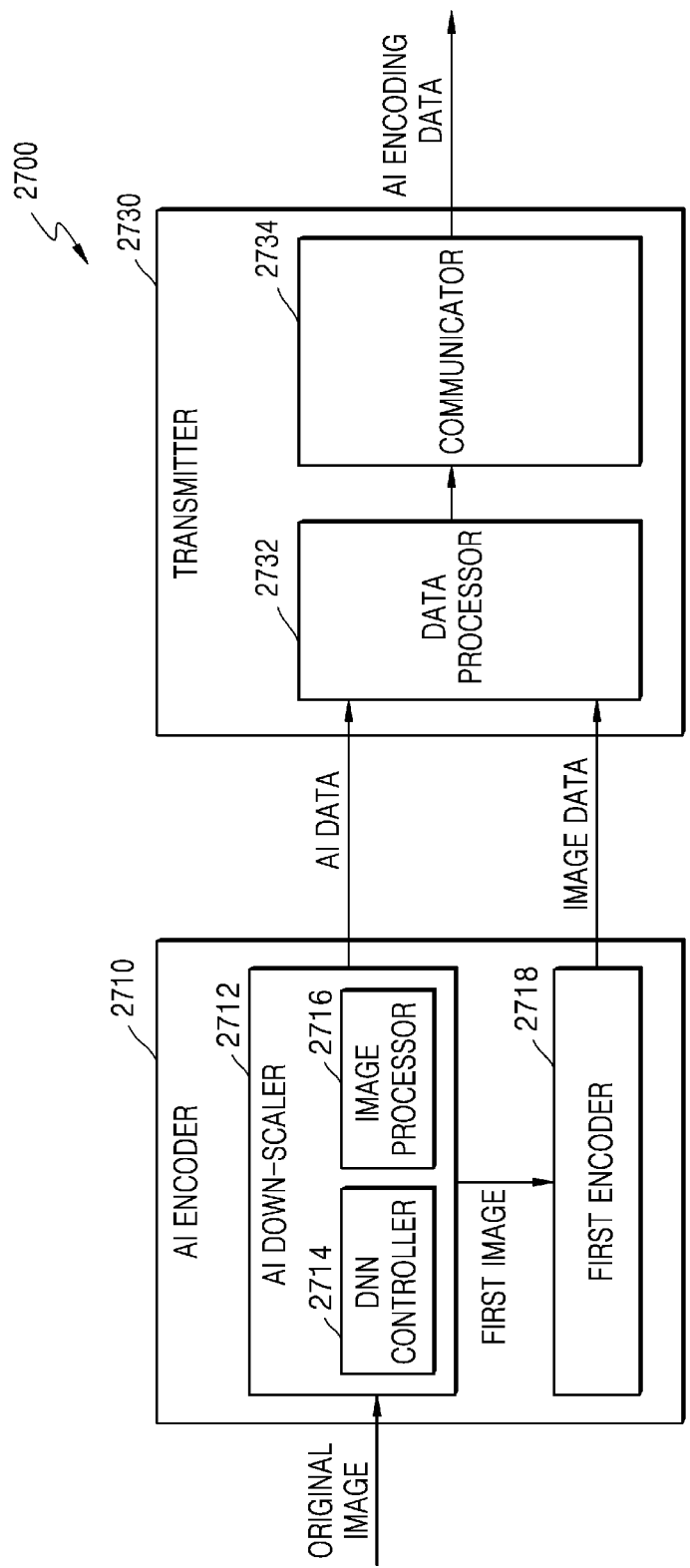
FIG. 27 is a block diagram of a configuration of an AI encoding apparatus, according to an embodiment.

FIG. 27 is a block diagram of a configuration of an AI encoding apparatus, according to an embodiment.

Referring to FIG. 27, the AI encoding apparatus 2700 may include an AI encoder 2710 and a transmitter 2730. The AI encoder 2710 may include an AI down-scaler 2712 and a first encoder 2718. The transmitter 2730 may include a data processor 2732 and a communicator 2734.

In FIG. 27, the AI encoder 2710 and the transmitter 2730 are separately illustrated, but the AI encoder 2710 and the transmitter 2730 may be realized through one processor. In this case, the AI encoder 2710 and the transmitter 2730 may be realized by dedicated processors, or may be realized by a combination of S/W and an AP or a general-purpose processor, such as a CPU or a GPU. When the AI encoder 2710 and the transmitter 2730 are realized by dedicated processors, the AI encoder 2710 and the transmitter 2730 may be embodied by including memories for realizing an embodiment of the disclosure or by including memory processors for using external memories.

Also, the AI encoder 2710 and the transmitter 2730 may be configured by a plurality of processors. In this case, the AI encoder 2710 and the transmitter 2730 may be realized by a combination of dedicated processors, or may be realized by a combination of S/W and an AP or a plurality of general-purpose processors, such as CPUs or GPUs. The AI down-scaler 2712 and the first encoder 2718 may also be realized by different processors.

The AI encoder 2710 performs AI down-scaling on the original image 105 and first encoding on the first image 115, and transmits AI data and image data to the transmitter 2730.

In detail, the AI down-scaler 2712 obtains the first image 115 by performing the AI down-scaling on the original image 105, and transmits the first image 115 to the first encoder 2718. The AI down-scaler 2712 performs the AI down-scaling on the original image 105 at resolution ratios of different values in a horizontal direction and a vertical direction. The AI data related to the AI down-scaling is provided to the data processor 2732. The AI down-scaler 2712 may include a DNN controller 2714 and an image processor 2716, and operations of the AI down-scaler 2712 will be described in detail below.

Upon receiving the first image 115 from the AI down-scaler 2712, the first encoder 2718 may reduce an information amount of the first image 115 by performing first encoding on the first image 115. The image data corresponding to the first image 115 may be obtained as a result of performing the first encoding by the first encoder 2718. The image data is provided to the data processor 2732.

The image data includes data obtained as a result of performing the first encoding on the first image 115. The image data may include data obtained based on pixel values in the first image 115, for example, residual data that is a difference between the first image 115 and prediction data of the first image 115. Also, the image data includes information used during a first encoding process of the first image 115. For example, the image data may include prediction mode information used to perform the first encoding on the first image 115, motion information, and information related to a quantization parameter used to perform the first encoding on the first image 115.

The data processor 2732 processes at least one of the AI data and the image data to be transmitted in a certain form. For example, when the AI data and the image data are to be transmitted in a form of a bitstream, the data processor 2732 processes the AI data to be expressed in a form of a bitstream, and transmit the image data and the AI data in a form of one bitstream through the communicator 2734. As another example, the data processor 2732 may process the AI data to be expressed in a form of bitstream, and transmit each of a bitstream corresponding to the AI data and a bitstream corresponding to the image data through the communicator 2734. As another example, the data processor 2732 may process the AI data to be expressed in a form of a frame or packet, and transmit the image data in a form of a bitstream and the AI data in a form of a frame or packet through the communicator 2734.

The communicator 2734 transmits AI encoding data obtained as a result of AI encoding through a network. The AI encoding data obtained as the result of AI encoding includes the image data and the AI data. The image data and the AI data may be transmitted through a same type of network or different types of networks.

According to an embodiment, the AI encoding data obtained as a result of processing by the data processor 2732 may be stored in a data storage medium including a magnetic medium such as a hard disk, a floppy disk, or a magnetic tape, an optical recording medium such as CD-ROM or DVD, or a magneto-optical medium such as a floptical disk.

Hereinafter, operations of the AI down-scaler 2712 will be described in detail.

The DNN controller 2714 analyzes the original image 105 to determine the resolution ratios of the first image 115 in the horizontal direction and vertical direction. As described above, a plurality of important components may be provided in one of the horizontal direction and the vertical direction of the original image 105, according to a subject included in the original image 105. Accordingly, the DNN controller 2714 may determine a resolution ratio in a direction in which the plurality of important components are arranged to have a large value, and a resolution ratio in a direction in which relatively less important components are arranged to have a small value.

A method of determining a direction in which a lot of important components are arranged will be described with reference to FIGS. 28 and 29.

Figure 28:
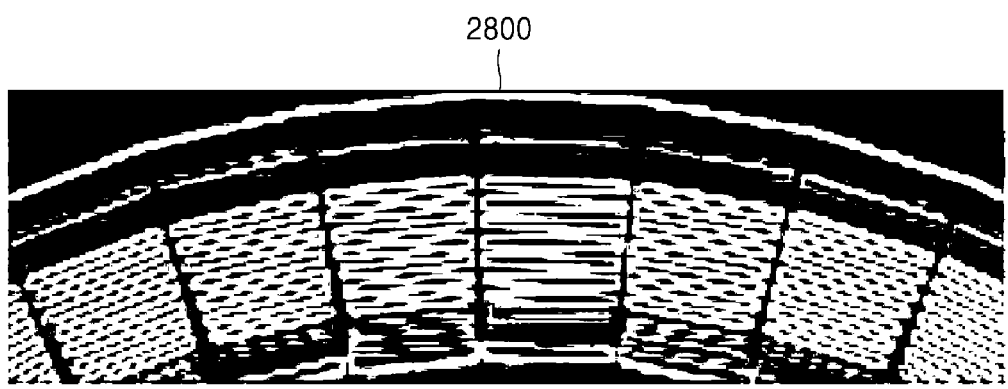
FIG. 28 is a diagram of an edge map corresponding to an original image, according to an embodiment.

FIG. 28 is a diagram of an edge map corresponding to an original image, according to an embodiment.

A plurality of edges of high intensity may be included in a certain direction from among a horizontal direction and a vertical direction, according to an image. The plurality of edges of the high intensity being arranged may denote that a change amount of pixel values may be high in a corresponding direction and an exterior of a subject is complicated in the corresponding direction. Accordingly, when a resolution is largely reduced in the direction in which the plurality of edges of the high intensity are arranged, it is highly likely that the exterior of the subject may be distorted.

In the edge map 2800 shown in FIG. 28, it is intuitively identified that edge intensity in a horizontal direction is greater than edge intensity in a vertical direction. Accordingly, when the resolution of the original image 105 corresponding to the edge map 2800 is largely reduced in the horizontal direction, such edge components may be omitted from the first image 115.

The DNN controller 2714 may measure an edge direction and edge intensity, based on pixel values of pixels included in the original image 105, and determine a direction in which the edge intensity is greater to be an important direction and a direction in which the edge intensity is smaller to be an unimportant direction, from among the horizontal direction and the vertical direction. Also, the DNN controller 2714 may determine a resolution ratio in the important direction to be greater than a resolution ratio in the unimportant direction. A well-known method may be used as a method of measuring an edge direction and edge intensity in an image via image analysis.

The DNN controller 2714 may determine the resolution ratios in the important direction and the unimportant direction, in consideration of a difference between the edge intensity in the important direction and the edge intensity in the unimportant direction. For example, when the difference between the edge intensity in the important direction and the edge intensity in the unimportant direction is equal to or less than a first predetermined value, the resolution ratio in the important direction may be determined to be 1 and the resolution ratio in the unimportant direction may be determined to be ½. Also, when the difference between the edge intensity in the important direction and the edge intensity in the unimportant direction exceeds the first predetermined value and is equal to or less than a second predetermined value, the resolution ratio in the important direction may be determined to be 1 and the resolution ratio in the unimportant direction may be determined to be ¼. Also, when the edge intensity of the important direction is not large, for example, when the edge intensity in the important direction is equal to or less than a minimum value, the DNN controller 2714 may determine the resolution ratio in the important direction to be greater than the resolution ratio in the unimportant direction while determining the resolution ratio in the important direction to be less than 1.

Figure 29:
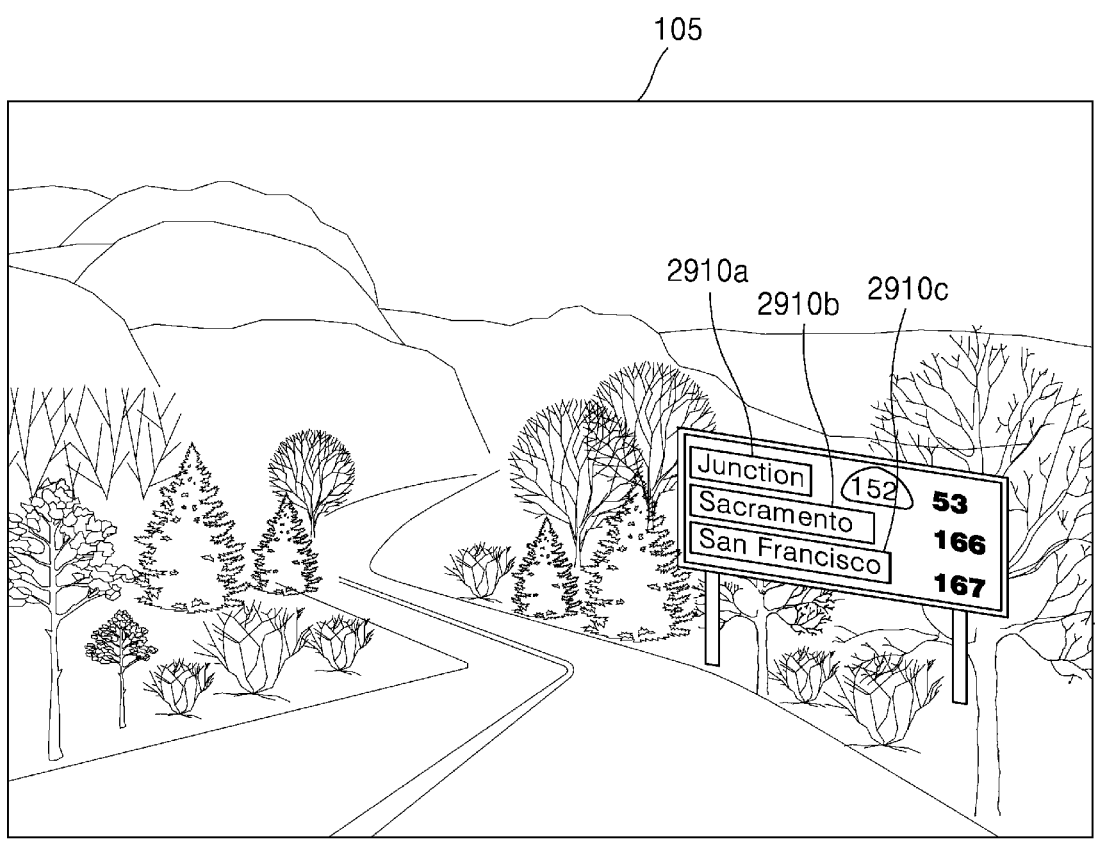
FIG. 29 is a diagram of an original image including text regions, according to an embodiment.

FIG. 29 is a diagram of an original image including text regions, according to an embodiment.

Texts included in an image may provide important information to users viewing the image. In other words, the texts may be a key factor for understanding the image. Accordingly, the DNN controller 2714 may identify the text regions 2910a through 2910c in the original image 105 and determine the resolution ratios of the first image 115 in the horizontal direction and vertical direction, considering arrangement directions of the text regions 2910a through 2910c. The DNN controller 2714 may identify the text regions 2910a through 2910c in the image via a well-known text identification algorithm.

The DNN controller 2714 may determine whether the arrangement direction of the text regions 2910a through 2910c in the original image 105 is close to a horizontal direction or close to a vertical direction, and determine, from among the horizontal direction and the vertical direction, a direction close to the arrangement direction of the text regions 2910a through 2910c to be an important direction and a direction far from the arrangement direction of the text regions 2910a through 2910c to be an unimportant direction. Here, the arrangement direction of the text regions 2910a through 2910c being close to one direction may denote that an angle between the corresponding direction and the arrangement direction of the text regions 2910a through 2910c is small, and the arrangement direction of the text regions 2910a through 2910c being far from one direction may denote that an angle between the corresponding direction and the arrangement direction of the text regions 2910a through 2910c is large.

The DNN controller 2714 may determine a resolution ratio in the important direction to be greater than a resolution ratio in the unimportant direction. The DNN controller 2714 may determine the resolution ratios in the important direction and unimportant direction, considering a difference between an angle between the important direction and the arrangement direction of the text regions 2910a through 2910c, and an angle between the unimportant direction and the arrangement direction of the text regions 2910a through 2910c. For example, when the difference between the angle in the important direction and the angle in the unimportant direction is equal to or less than a first predetermined value, the resolution ratio in the important direction may be determined to be 1 and the resolution ratio in the unimportant direction may be determined to be ½. Also, when the difference between the angle in the important direction and the angle in the unimportant direction exceeds the first predetermined value and is equal to or less than a second predetermined value, the resolution ratio in the important direction may be determined to be 1 and the resolution ratio in the unimportant direction may be determined to be ¼. When the angle in the important direction and the angle in the unimportant direction are almost similar, for example, when the difference between the angle in the important direction and the angle in the unimportant direction is equal to or less than a minimum value that is smaller than the first predetermined value, the DNN controller 2714 may determine the resolution ratio in the important direction to be greater than the resolution ratio in the unimportant direction while determining the resolution ratio in the important direction to be a value less than 1.

According to an embodiment, when the plurality of text regions 2910a through 2910c are present in the original image 105 as shown in FIG. 29, the DNN controller 2714 may compare an average of angles between the horizontal direction and the arrangement directions of the text regions with an average of angles between the vertical direction and the arrangement directions of the text regions to determine which one of the horizontal direction and the vertical direction is the important direction and determine the resolution ratios of the first image 115 in the horizontal direction and vertical direction.

The method of determining a resolution ratio described with reference to FIGS. 28 and 29 is only an example, and various methods may be used to determine the resolution ratios of the first image 115 in the horizontal direction and vertical direction. For example, when the original image 105 includes a plurality of frames, the DNN controller 2714 may determine resolution ratios of a current frame in a horizontal direction and vertical direction, considering a previous frame and/or a next frame of the current frame on which AI down-scaling is to be performed. In detail, when movement of a subject is greater in a horizontal direction than in a vertical direction, based on a comparison between the current frame and the previous frame and/or the next frame, the resolution ratio of the current frame in the horizontal direction may be determined to be greater than the resolution ratio thereof in the vertical direction.

Referring back to FIG. 27, the AI data generated by the AI down-scaler 2712 is transmitted to the data processor 2732, and the AI data includes information enabling the AI decoding apparatus 1200 to perform AI up-scaling on the second image 135 according to the resolution ratios of the first image 115 in the horizontal direction and vertical direction. In other words, the AI data includes information indicating DNN setting information to be set in the second DNN by the AI decoding apparatus 1200.

To enable the AI decoding apparatus 1200 to obtain the DNN setting information, the AI data may include information indicating the resolution ratios of the first image 115 in the horizontal direction and vertical direction.

The information indicating the resolution ratios of the first image 115 in the horizontal direction and vertical direction may be an index.

Also, the information indicating the resolution ratios of the first image 115 in the horizontal direction and vertical direction may be information indicating the resolutions of the original image 105 in the horizontal direction and vertical direction. Because the AI decoding apparatus 1200 identifies the resolutions of the first image 115 in the horizontal direction and vertical direction via the second image 135, when the resolutions of the original image 105 in the horizontal direction and vertical direction are identified via the AI data, the resolution ratios of the first image 115 in the horizontal direction and vertical direction may be identified.

Also, the AI data may further include information related to the first image 115. The information related to the first image 115 may include information indicating at least one of the resolution of the first image 115, a bitrate of a bitstream obtained as a result of first encoding performed on the first image 115, and a codec type used during the first encoding of the first image 115.

Also, the AI data may include an identifier of the mutually agreed DNN setting information such that AI up-scaling is performed on the second image 135 according to the resolution ratios of the first image 115 in the horizontal direction and vertical direction.

According to an embodiment, the DNN controller 2714 may transmit, to the first encoder 2718, information indicating the resolutions of the original image 105 in the horizontal direction and vertical direction. The first encoder 2718 may add, to the image data, the information indicating the resolutions of the original image 105 in the horizontal direction and vertical direction. This considers a case where an apparatus receiving AI encoding data is a legacy apparatus. Because the AI data is used by the AI decoding apparatus 1200 capable of performing AI up-scaling on the second image 135, the first encoder 2718 adds, to the image data, the information indicating the resolutions of the original image 105 in the horizontal direction and vertical direction for the legacy apparatus incapable of performing AI up-scaling on the second image 135 based on the AI data.

According to a codec, such as HEVC or the like, resolution information of an image on which first encoding is to be performed is included in a bitstream according to syntax, but the first encoder 2718 according to the disclosure additionally includes, to the bitstream, resolution information of the original image 105 in the horizontal direction and resolution information thereof in the vertical direction. The legacy apparatus may reconstruct the second image 135 of a same resolution as the first image 115, according to the image data, and then increase the resolution of the second image 135 up to the resolution of the original image 105, according to legacy scaling.

The DNN controller 2714 obtains DNN setting information to be set in the first DNN, from among a plurality of pieces of DNN setting information, considering the resolution ratios of the first image 115 in the horizontal direction and vertical direction. Each of the plurality of pieces of DNN setting information may be mapped to the resolution ratios of the first image 115 in the horizontal direction and vertical direction. For example, as shown in FIG. 15, the A DNN setting information when the resolution ratio of the first image 115 in the horizontal direction is ½ and the resolution ratio thereof in the vertical direction is 1, the B DNN setting information when the resolution ratio of the first image 115 in the horizontal direction is 1 and the resolution ratio thereof in the vertical direction is ½, the C DNN setting information when the resolution ratio of the first image 115 in the horizontal direction is ¼ and the resolution ratio thereof in the vertical direction is 1, and the D DNN setting information when the resolution ratio of the first image 115 in the horizontal direction is 1 and the resolution ratio thereof in the vertical direction is ¼, may be obtained to set the first DNN. In FIG. 15, the DNN setting information is obtained by further considering the information related to the first image 115, but the DNN controller 2714 may obtain the DNN setting information according to the resolution ratios of the first image 115 in the horizontal direction and vertical direction, without considering the information related to the first image 115. As described above, the DNN controller 2714 may obtain the DNN setting information by further considering at least one of a compression ratio (for example, a target bitrate), compression quality (for example, a bitrate type), compression history information, and a type of the original image 105.

The DNN controller 2714 controls operations of the image processor 2716 according to the resolution ratios of the first image 115 in the horizontal direction and vertical direction. The image processor 2716 obtains a plurality of first intermediate images to be input to the first DNN via an image division process regarding the original image 105, and obtains the first image 115 via an image combination process regarding a plurality of second intermediate images output from the first DNN.

The DNN controller 2714 may determine the number of first intermediate images obtained by the image processor 2716, according to the resolution ratios of the first image 115 in the horizontal direction and vertical direction. When the resolution ratio of the first image 115 in the horizontal direction is 1/n (n is a natural number), the resolution ratio thereof in the vertical direction is 1/m (m is a natural number), and n>m, the DNN controller 2714 may determine the number of first intermediate images to be n×n, and the number of second intermediate images to be n/m.

The DNN controller 2714 obtains the DNN setting information mapped to the resolution ratios of the first image 115 in the horizontal direction and vertical direction, where the DNN setting information mapped to the resolution ratios of the first image 115 in the horizontal direction and vertical direction may include information indicating that the number of filter kernels of a last convolution layer from among a plurality of convolution layers included in the first DNN is n/m. In other words, according to an embodiment of the disclosure, the number of first intermediate images and the number of filter kernels of the last convolution layer may be determined according to the resolution ratios of the first image 115 in the horizontal direction and vertical direction. Also, because the second intermediate images in the same number as the filter kernels of the last convolution layer are output from the last convolution layer, the number of first intermediate images and the number of second intermediate images may be determined according to the resolution ratios of the first image 115 in the horizontal direction and vertical direction. Such a mapping relationship is illustrated in FIG. 30.

FIG. 30 is a diagram of the numbers of first intermediate images and second intermediate images related to a first DNN vary according to resolution ratios of a first image in a horizontal direction and vertical direction, according to an embodiment.

As shown in FIG. 30, when the resolution ratio of the first image 115 in the horizontal direction is ½ and the resolution ratio thereof in the vertical direction is 1, the numbers of first intermediate images and second intermediate images may be respectively 4 and 2. Also, when the resolution ratio of the first image 115 in the horizontal direction is ¼ and the resolution ratio thereof in the vertical direction is 1, the numbers of first intermediate images and second intermediate images may be respectively 16 and 4. For example, when the resolution ratio of the first image 115 in the horizontal direction is ½ and the resolution ratio thereof in the vertical direction is 1, four first intermediate images of which resolution ratios in a horizontal direction and vertical direction are each ½ are obtained from the original image 105, and the first image 115 of which the resolution ratio in the horizontal direction is ½ and the resolution ratio in the vertical direction is 1 is obtained by combining two second intermediate images of which resolution ratios in a horizontal direction and vertical direction are each ½.

Figure 31:
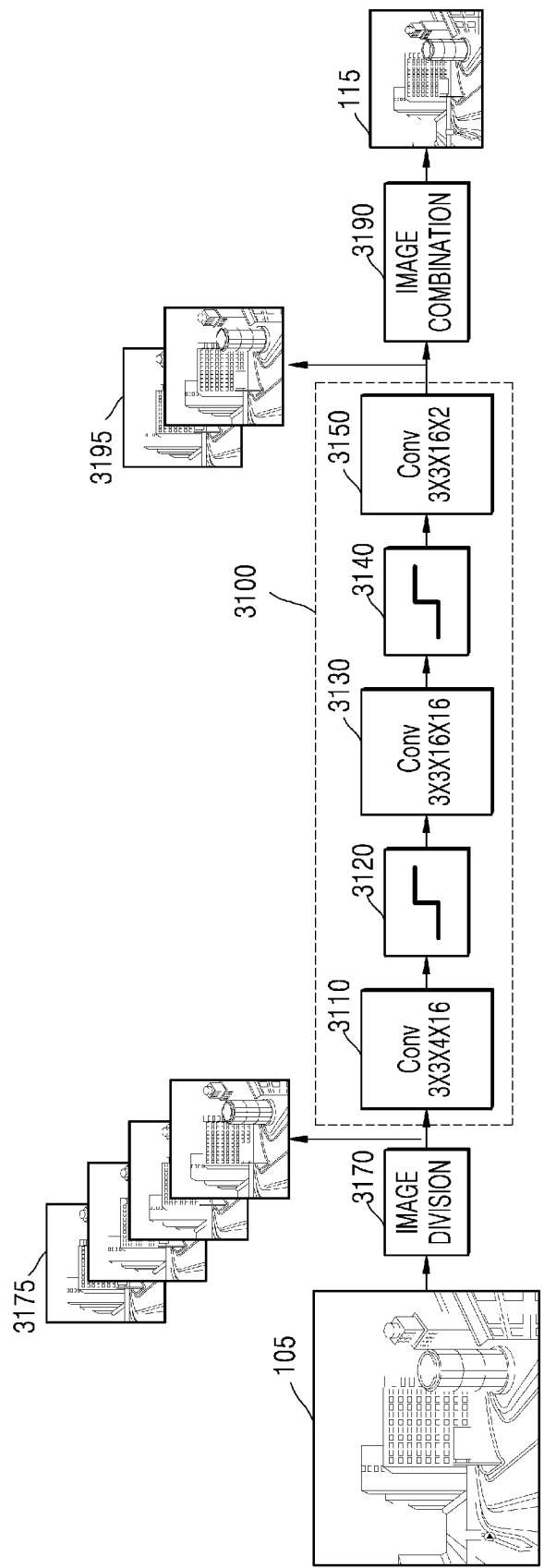
FIG. 31 is a diagram showing a first DNN for AI down-scaling of an original image, according to an embodiment.

FIG. 31 is a diagram showing a first DNN for AI downscaling of an original image, according to an embodiment. Hereinafter, a first DNN 3100 according to another embodiment will be described with reference to FIG. 31.

As shown in FIG. 31, the first DNN 3100 may include a first convolution layer 3110, a first activation layer 3120, a second convolution layer 3130, a second activation layer 3140, and a third convolution layer 3150. First intermediate images 3175 obtained via an image division process 3170 of the original image 105 are input to the first DNN 3100, and the first image 115 is obtained via an image combination process 3190 of second intermediate images 3195 output from the first DNN 3100. The image division process 3170 and the image combination process 3190 are performed by the image processor 2716.

The number of first intermediate images 3175 and the number of second intermediate image 3195 are determined according to the resolution ratios of the first image 115 in the horizontal direction and vertical direction, and thus the image division process 3170 and the image combination process 3190 of the image processor 2716 need to be performed according to the resolution ratios of the first image 115 in the horizontal direction and vertical direction. In other words, the image processor 2716 obtains the first intermediate images 3175 in the number determined according to the resolution ratios of the first image 115 in the horizontal direction and vertical direction, via the image division process 3170, and obtains the first image 115 by combining the second intermediate images 3195 in the number determined according to the resolution ratios of the first image 115 in the horizontal direction and vertical direction.

The image processor 2716 may obtain the first intermediate images 3175 via a reverse process of any one of the image combination methods shown in FIGS. 22 through 24. For example, the image processor 2716 may obtain the first intermediate images 3175 including, as a pixel line, some pixels arranged along a row or a column in the original image 105, via a reverse process of FIG. 22. Also, when the required number of first intermediate images 3175 is n, the image processor 2716 may obtain the first intermediate images 3175 including some pixels by dividing the original image 105 by n (see FIG. 23) or dividing pixels included in the original image 105 (see FIG. 24).

The plurality of first intermediate images 3175 are obtained via the image division 3170 regarding the original image 105, and the plurality of first intermediate images 3175 are input to the first convolution layer 3110.

Upon receiving the plurality of first intermediate images 3175, the first convolution layer 3110 outputs feature maps by performing convolution on the plurality of first intermediate images 3175 by using a filter kernel. 3×3×4×16 indicated in the first convolution layer 3110 shown in FIG. 31 indicates that the convolution is performed on the four first intermediate images 3175 by using 16 filter kernels having a size of 3×3. DNN setting information set in the first DNN 3100 is determined according to the resolution ratios of the first image 115 in the horizontal direction and vertical direction, and in this case, the DNN setting information enables the first convolution layer 3110 to process the first intermediate images 3175 in the number determined according to the resolution ratios of the first image 115 in the horizontal direction and vertical direction. In other words, in the example of FIG. 31, when the DNN setting information is set in the first DNN 3100, the first convolution layer 3110 is able to process the four first intermediate images 3175.

The 16 feature maps are generated as a result of performing the convolution by the first convolution layer 3110. Each feature map indicates unique features of the first intermediate images 3175.

The feature maps output from the first convolution layer 3110 are input to the first activation layer 3120. The first activation layer 3120 may assign a non-linear feature to each feature map. The first activation layer 3120 may include a sigmoid function, a Tan h function, a ReLU function, or the like, but is not limited thereto.

The first activation layer 3120 assigning the non-linear feature indicates that some sample values of the feature map, which is an output through the first convolution layer 3110, are changed. Here, the change is performed by applying the non-linear feature.

The first activation layer 3120 determines whether to transmit the sample values of the feature maps output from the first convolution layer 3110 to the second convolution layer 3130. For example, some of the sample values of the feature maps are activated by the first activation layer 3120 and transmitted to the second convolution layer 3130, and some sample values are deactivated by the first activation layer 3120 and not transmitted to the second convolution layer 3130. The unique features of the first intermediate image 3175 indicated by the feature maps are emphasized by the first activation layer 3120.

Feature maps output from the first activation layer 3120 are input to the second convolution layer 3130. 3×3×16×16 indicated in the second convolution layer 3130 indicates that a convolution process is performed on the 16 feature maps by using 16 filter kernels having a size of 3×3.

The 16 feature maps output from the second convolution layer 3130 are input to the second activation layer 3140. The second activation layer 3140 may assign a non-linear feature to the input feature maps.

The feature maps output from the second activation layer 3140 are input to the third convolution layer 3150. 3×3×16×2 indicated in the third convolution layer 3150 indicates that a convolution process is performed on the 16 feature maps by using two filter kernels having a size of 3×3 so as to generate the two second intermediate images 3195. As described above, the DNN setting information set in the first DNN 3100 is determined according to the resolution ratios of the first image 115 in the horizontal direction and vertical direction. Here, as the DNN setting information is set, a last convolution layer, i.e., the third convolution layer 3150, of the first DNN 3100 may output the second intermediate images 3195 in the number determined according to the resolution ratios of the first image 115 in the horizontal direction and vertical direction. In other words, in the example of FIG. 31, when the DNN setting information is set in the first DNN 3100, the third convolution layer 3150 is able to process the two second intermediate images 3195.

The first image 115 is obtained via image combination of the second intermediate images 3195 output from the third convolution layer 3150.

The image processor 2716 may combine the second intermediate image via a reverse process of any one of the image division methods shown in FIGS. 19 through 21. For example, the image processor 2716 may obtain the first image 115 by alternately connecting the pixel lines of the second intermediate images 3195 via the reverse process of FIG. 19. Also, the image processor 2716 may obtain the first image 115 by connecting the second intermediate images 3195 in a horizontal or vertical direction (see FIG. 20) or by connecting pixels included in the second intermediate image 3195 (see FIG. 21).

FIG. 31 illustrates an example where the first DNN 3100 includes three convolution layers and two activation layers, but this is only an example, and according to an embodiment, the numbers of convolution layers and activation layers may variously change. Also, according to an embodiment, the first DNN 3100 may be implemented as an RNN. In this case, a CNN structure of the first DNN 3100 according to an embodiment of the disclosure is changed to an RNN structure.

According to an embodiment, the AI down-scaler 2712 may include at least one ALU for a convolution operation and an operation of an activation layer. The ALU may be embodied as a processor. For the convolution operation, the ALU may include a multiplier for performing multiplication between sample values of a feature map output from a first intermediate image or previous layer, and sample values of a filter kernel, and an adder for adding result values of the multiplication. Also, for the operation of the activation layer, the ALU may include a multiplier for multiplying an input sample value by a weight used in a pre-determined sigmoid function, Tan h function, or ReLU function, and a comparator for comparing a multiplication result with a certain value to determine whether to transmit the input sample value to a next layer.

Figure 32:
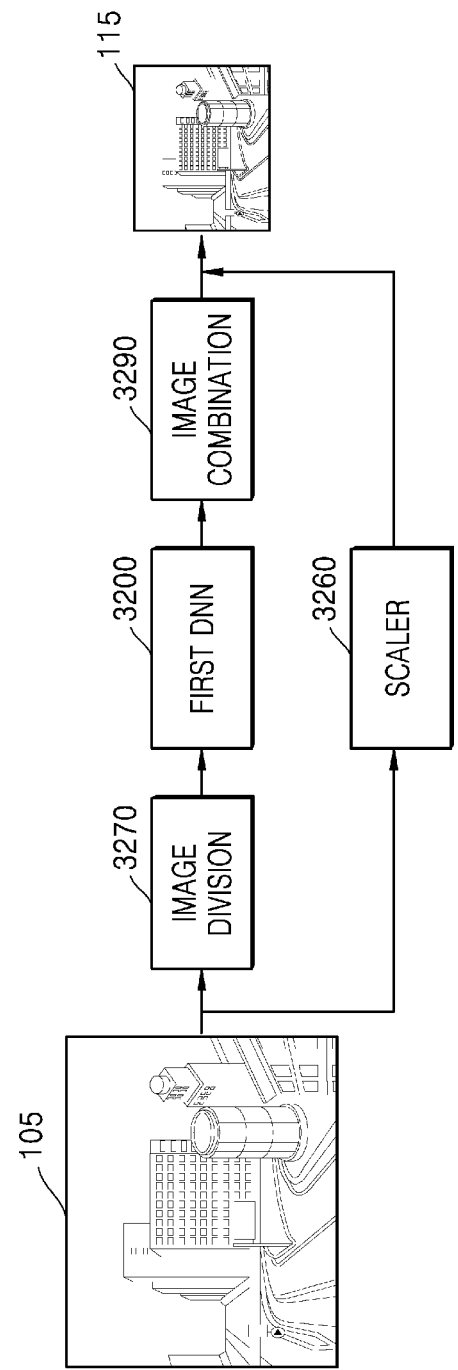
FIG. 32 is a diagram of an AI down-scaling method using a first DNN, according to an embodiment.

FIG. 32 is a diagram of an AI down-scaling method using a first DNN, according to an embodiment.

According to an embodiment, a structure of the first DNN 3200 shown in FIG. 32 may be the same as the structure of the first DNN 3100 shown in FIG. 31. In other words, the first DNN 3200 may include, like the first DNN 3100 shown in FIG. 31, a first convolution layer, a first activation layer, a second convolution layer, a second activation layer, and a third convolution layer. However, unlike the first DNN 3100 of FIG. 31, the first DNN 3200 is used for a skip connection structure, and thus parameters of filter kernels of the first DNN 3200 may be different from parameters of filter kernels of the first DNN 3100 of FIG. 31. It is obvious that the first DNN 3200 may have a different structure from the first DNN 3100 of FIG. 31, according to an embodiment.

First intermediate images obtained via an image division process 3270 of the original image 105 are input to the first DNN 3200, and the first image 115 is obtained via an image combination process 3290 of second intermediate images output from the first DNN 3200.

A skip connection structure is used during an AI down-scaling process shown in FIG. 32. Separately from the first intermediate images obtained as the image division 3270 regarding the original image 105 is applied being processed in the first DNN 3200, the first image 115 may be obtained as the original image 105 is scaled by a scaler 3260 and then added to an image generated as a result of the image combination 3290.

The scaler 3260 decreases the resolution of the original image 105 according to the resolution ratios of the first image 115 in the horizontal direction and vertical direction. As a result of the scaling, the resolution of the original image 105 becomes the same as the resolution of the first image 115. The scaler 3260 may include, for example, at least one of a bilinear scaler, a bicubic scaler, a Lanczos scaler, and a stair step scaler. According to an embodiment, the scaler 3260 may be replaced by a convolution layer for decreasing the resolution of the original image 105.

During the AI up-scaling process shown in FIG. 32, a first image of a prediction version is obtained via the scaler 3260, and a first image of a residual version is obtained via the first DNN 3200. The first image 115 may be obtained by adding the first image of the prediction version and the first image of the residual version.

The first DNN 3100 operates according to the DNN setting information obtained by the DNN controller 2714 described above, and the DNN setting information enables the first DNN 3100 to process the first intermediate images in the number corresponding to the resolution ratios of the first image 115 in the horizontal direction and vertical direction, and output the second intermediate images in the number corresponding to the resolution ratios of the first image 115 in the horizontal direction and vertical direction.

According to an embodiment, a structure of the first DNN, i.e., the number of convolution layers and the number of filter kernels, may be fixed, and parameters of the filter kernels may be changed according to the plurality of pieces of DNN setting information. In other words, because the structure of the first DNN is fixed, the second DNN may process the first intermediate images in the pre-determined number (for example, 2), and output the second intermediate images in the pre-determined number (for example, 4).

The number of first intermediate images that are able to be processed by the first DNN and the number of second intermediate images output by the first DNN being determined to specific numbers may indicate that the image processor 2716 obtains the pre-determined number of first intermediate images from the original image 105 and combines the pre-determined number of second intermediate images, and at the same time, the first DNN operates to decrease the resolution of the original image 105 in the horizontal direction or vertical direction to a certain magnification. In other words, when the first DNN outputs two second intermediate images by processing four first intermediate images obtained by dividing the original image 105, the resolution of the first image 115 in the horizontal direction or vertical direction, the first image 115 being obtained by combining the two second intermediate images, is ½ times the resolution of the original image 105 in the horizontal direction or vertical direction.

When a resolution in one direction is decreased by 1/m times (m is a natural number) via the image division process, the first DNN, and the image combination process, the DNN controller 2714 may determine the number of operations of the first DNN according to the resolution ratios of the first image 115 in the horizontal direction and vertical direction. In detail, when the resolution ratio of the first image 115 in the horizontal direction is $1/m^a$ (a is an integer equal to or greater than 0), and the resolution ratio thereof in the vertical direction is $1/m^b$ (b is an integer equal to or greater than 0), the DNN controller 2714 may determine the number of operations of the first DNN to be a+b. Accordingly, the first image 115 may be obtained by performing the image division process, the operations of the first DNN, and the image combination process a+b times.

For example, when a resolution in one direction is decreased by ½ times via the image division process, the first DNN, and the image combination process, the resolution ratio of the first image 115 in the horizontal direction is $½^2$, and the resolution ratio thereof in the vertical direction is $½^0$, the four first intermediate images obtained by dividing the original image 105 are processed by the first DNN and the two second intermediate images obtained as a result of the processing are combined, and thus an image in which a resolution ratio in a horizontal direction is $½^1$ and a resolution ratio in a vertical direction is $½^0$ compared to the original image 105 may be obtained. Because the number of operations of the first DNN is two times, the image division is applied on an image obtained via the image combination process, and the first intermediate images obtained as a result of the application are processed by the first DNN. Then, the plurality of second intermediate images output from the first DNN are combined, and thus the first image 115 in which the resolution ratio in the horizontal direction is $½^2$ and the resolution ratio in the vertical direction is $½^0$ may be obtained.

The image processor 2716 may combine the second intermediate images, considering the resolution ratios of the first image 115 in the horizontal direction and vertical direction. For example, when the first DNN is present to reduce a resolution in a horizontal direction or vertical direction by ½ times, the resolution ratio of the first image 115 in the horizontal direction is ½, and the resolution ratio thereof in the vertical direction is 1, the image processor 2716 may connect, for example, the two second intermediate images in the vertical direction such that a resolution ratio of an image, obtained as a result of image combination, in a horizontal direction is ½. On the other hand, when the resolution ratio of the first image 115 in the horizontal direction is 1 and the resolution ratio thereof in the vertical direction is ½, the image processor 2716 may connect, for example, the two second intermediate images in the horizontal direction such that the image, obtained as the result of image combination, in a vertical direction is ½.

According to an embodiment, the first DNN may include a DNN for decreasing a resolution in a horizontal direction by a fixed magnification, and a DNN for decreasing a resolution in a vertical direction by a fixed magnification. When the resolution ratio of the first image 115 in the horizontal direction is $1/m^a$ (m is a natural number and a is an integer equal to or greater than 0), the resolution ratio thereof in the vertical direction is $1/m^b$ (b is an integer equal to or greater than 0), and the fixed magnification is m, the DNN controller 2714 may determine the number of operations of the DNN for decreasing the resolution in the horizontal direction by the fixed magnification to a times, and the number of operations of the DNN for decreasing the resolution in the vertical direction by the fixed magnification to b times. The image processor 2716 may obtain first intermediate images in a fixed number for the DNN for decreasing the resolution in the horizontal direction by the fixed magnification and the DNN for decreasing the resolution in the vertical direction by the fixed magnification, and combine second intermediate image in a fixed number. Here, the image processor 2716 may combine the second intermediate images output from the DNN for decreasing the resolution in the horizontal direction by the fixed magnification and the second intermediate images output from the DNN for decreasing the resolution in the vertical direction by the fixed magnification, in different manners.

According to an embodiment, the AI encoding apparatus 2700 may perform AI down-scaling on the original image 105 by a same magnification in a horizontal direction and a vertical direction, according to details described with reference to FIG. 7, or perform AI down-scaling on the original image 105 by different magnifications in the horizontal direction and the vertical direction, according to details described with reference to FIG. 27. When the original image 105 includes a plurality of frames, which one of a method of performing AI down-scaling on the original image 105 by the same magnification in the horizontal direction and the vertical direction and a method of performing AI down-scaling on the original image 105 by the different magnifications in the horizontal direction and the vertical direction is to be used may be determined for each frame of the original image 105, or determined for each frame where a scene change occurs. Alternatively, how to perform AI down-scaling may be determined for each GOP including a plurality of frames. The AI encoding apparatus 2700 may perform AI down-scaling on the original image 105 in different magnifications in the horizontal direction and the vertical direction or in a same magnification in the horizontal direction and the vertical direction, based on intensities of edges and/or an arrangement direction of texts included in the original image 105.

Figure 33:
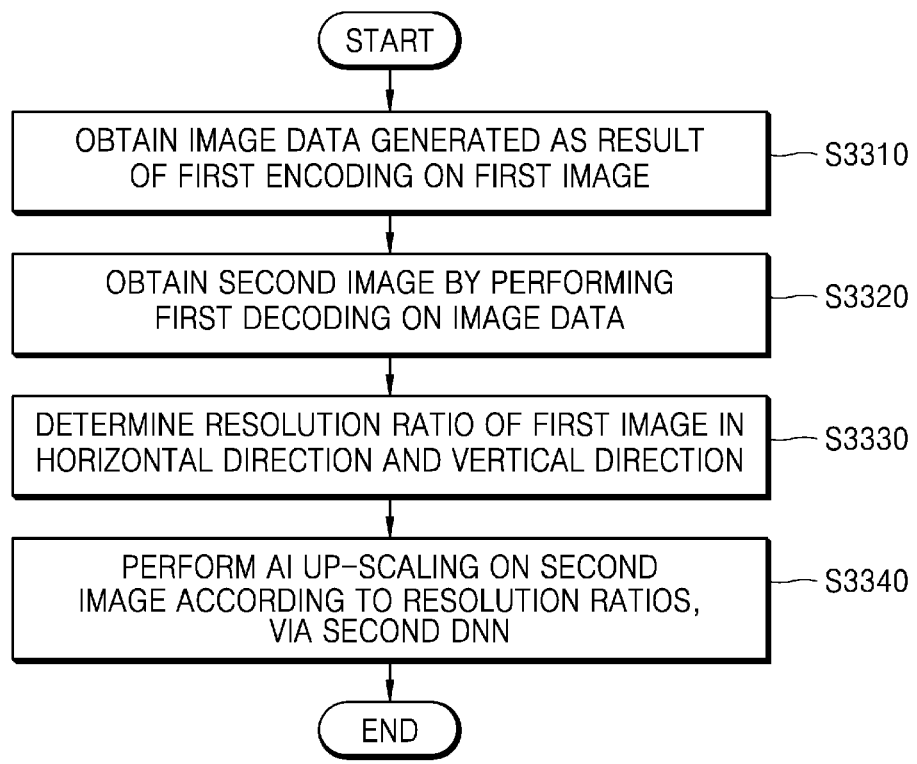
FIG. 33 is a flowchart of an AI decoding method according to an embodiment.

FIG. 33 is a flowchart of an AI decoding method according to an embodiment.

In operation S3310, the AI decoding apparatus 1200 obtains image data generated as a result of encoding the first image 115, and AI data related to AI down-scaling. The AI decoding apparatus 1200 may receive the image data and the AI data from the AI encoding apparatus 2700 through a network. The AI decoding apparatus 1200 may obtain the image data and AI data stored in a data storage medium.

In operation S3320, the AI decoding apparatus 1200 obtains the second image 135 by performing first decoding on the image data. In detail, the AI decoding apparatus 1200 reconstructs the second image 135 corresponding to the first image 115 by performing first decoding the image data, based on an image reconstruction method using frequency transform.

In operation S3330, the AI decoding apparatus 1200 determines the resolution ratios of the first image 115 in the horizontal direction and vertical direction, based on the AI data. The AI decoding apparatus 1200 obtains DNN setting information for performing AI up-scaling on the second image 135, according to the resolution ratios of the first image 115 in the horizontal direction and vertical direction, from among a plurality of pieces of pre-stored DNN setting information.

In operation S3340, the AI decoding apparatus 1200 performs AI up-scaling on the second image 135 by the resolution ratios of the first image 115 in the horizontal direction and vertical direction, via a second DNN operating according to the DNN setting information. As a result of the AI up-scaling, the third image 145 of a same resolution as the original image 105 may be obtained. The third image 145 may be output from the AI decoding apparatus 1200 and displayed through a display device or may be displayed after being post-processed.

Figure 34:
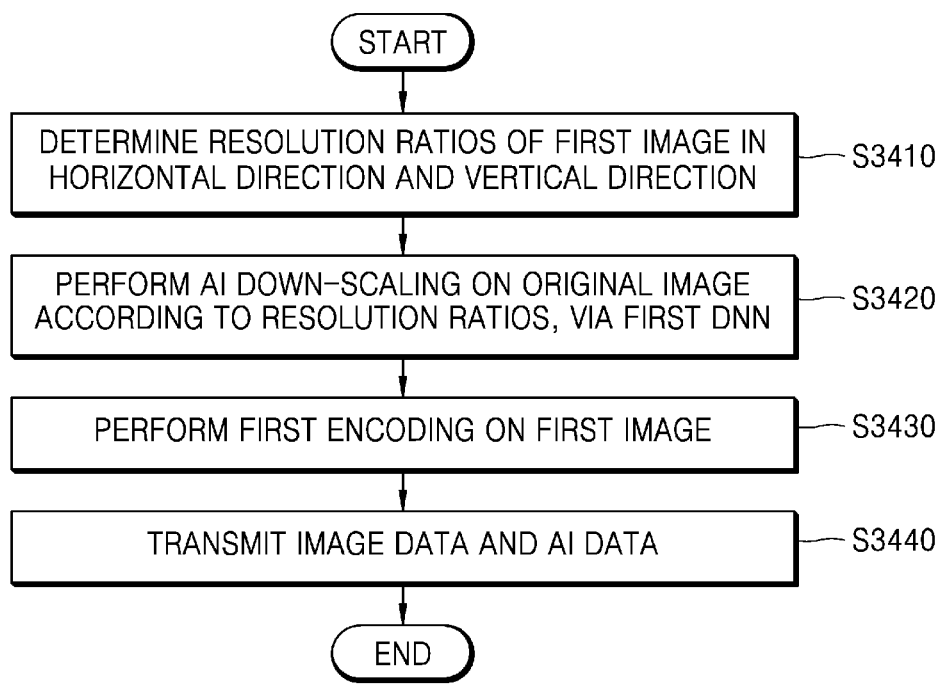
FIG. 34 is a flowchart of an AI encoding method according to an embodiment.

FIG. 34 is a flowchart of an AI encoding method according to an embodiment.

In operation S3410, the AI encoding apparatus 2700 determines the resolution ratios of the first image 115 in the horizontal direction and vertical direction, by analyzing the original image 105. An edge intensity and/or an arrangement direction of text may be used to analyze the original image 105.

In operation S3420, the AI encoding apparatus 2700 obtains the first image 115, on which AI down-scaling is performed according to the resolution ratios of the first image 115 in the horizontal direction and vertical direction, from the original image 105, via a first DNN.

In operation S3430, the AI encoding apparatus 2700 generates image data by performing first encoding on the first image 115. In detail, the AI encoding apparatus 2700 generates the image data corresponding to the first image 115 by encoding the first image 115, based on an image compression method using frequency transform.

In operation S3440, the AI encoding apparatus 2700 transmits AI encoding data including the image data and AI data including information related to AI down-scaling. The AI data includes information for selecting DNN setting information of a second DNN for AI up-scaling. The AI data may include information indicating the resolution ratio of the first image 115 in the horizontal direction and the resolution ratio thereof in the vertical direction. According to an embodiment, the AI encoding data may be stored in a data storage medium.

As described above, the first DNN and the second DNN are jointly trained, and thus when the AI encoding apparatus 2700 performed AI down-scaling on the original image 105 according to specific resolution ratios of the first image 115 in the horizontal direction and vertical direction, the AI decoding apparatus 1200 also needs to perform AI up-scaling on the second image 135 according to the corresponding resolution ratios. Thus, the AI data includes information enabling the AI decoding apparatus 1200 to perform AI up-scaling on the second image 135 according to the resolution ratios of the first image 115 in the horizontal direction and vertical direction, the resolution ratios being a target of AI down-scaling. The AI data includes information used to obtain DNN setting information corresponding to an up-scaling target.

Upon receiving the AI data, the AI decoding apparatus 1200 is able to infer or verify which DNN setting information is used by the AI encoding apparatus 2700 to perform AI down-scaling on the original image 105, and accordingly, may obtain DNN setting information corresponding to the DNN setting information used to perform AI down-scaling, and perform AI up-scaling by using the obtained DNN setting information.

Figure 35A:
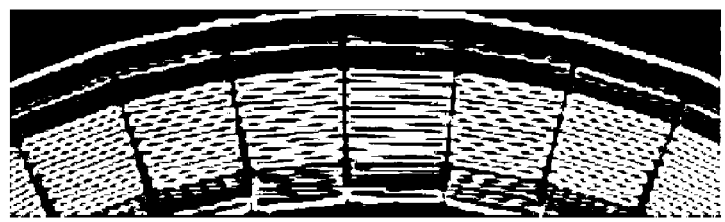
FIGS. 35A, 35B, and 35C are diagrams respectively of an edge map of an original image, an edge map of a third image obtained via an AI decoding process when a resolution ratio of a first image in a vertical direction and a resolution ratio of the first image in a horizontal direction are the same, and an edge map of a third image obtained via an AI decoding process when a resolution ratio of a first image in a vertical direction and a resolution ratio of the first image in a horizontal direction are different from each other, according to an embodiment.
Figure 35B:
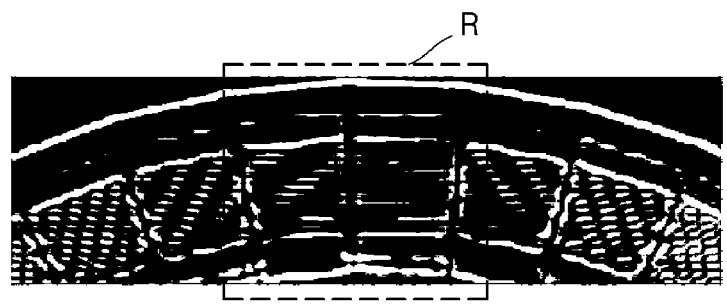
Figure 35C:
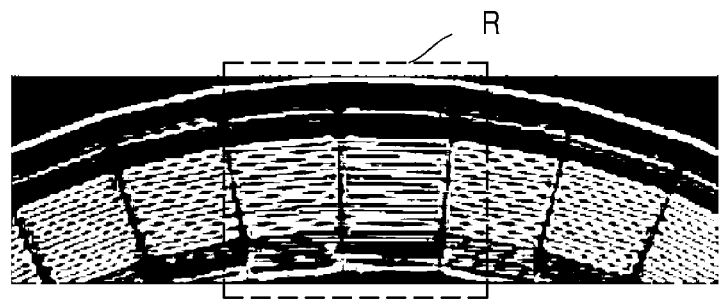

FIGS. 35A, 35B, and 35C are diagrams respectively of an edge map of an original image, an edge map of a third image obtained via an AI decoding process when a resolution ratio of a first image in a vertical direction and a resolution ratio of the first image in a horizontal direction are the same, and an edge map of a third image obtained via an AI decoding process when a resolution ratio of a first image in a vertical direction and a resolution ratio of the first image in a horizontal direction are different from each other, according to an embodiment.

Based on the edge map of the original image 105 shown in FIG. 35A, it is identified that a plurality of edges of high intensities are included in a horizontal direction compared to a vertical direction. In this case, when the resolution of the original image 105 is reduced by a same ratio in the horizontal direction and vertical direction, severe distortion occurs at a center portion R of the third image 145 as shown in FIG. 35B. FIG. 35C illustrates the third image 145 when the resolution ratio (for example, 1) of the first image 115 in the horizontal direction is determined to be greater than the resolution ratio (for example, ½) thereof in the vertical direction, and compared to FIG. 35B, distortion barely occurred in the center portion R.

Figure 36:
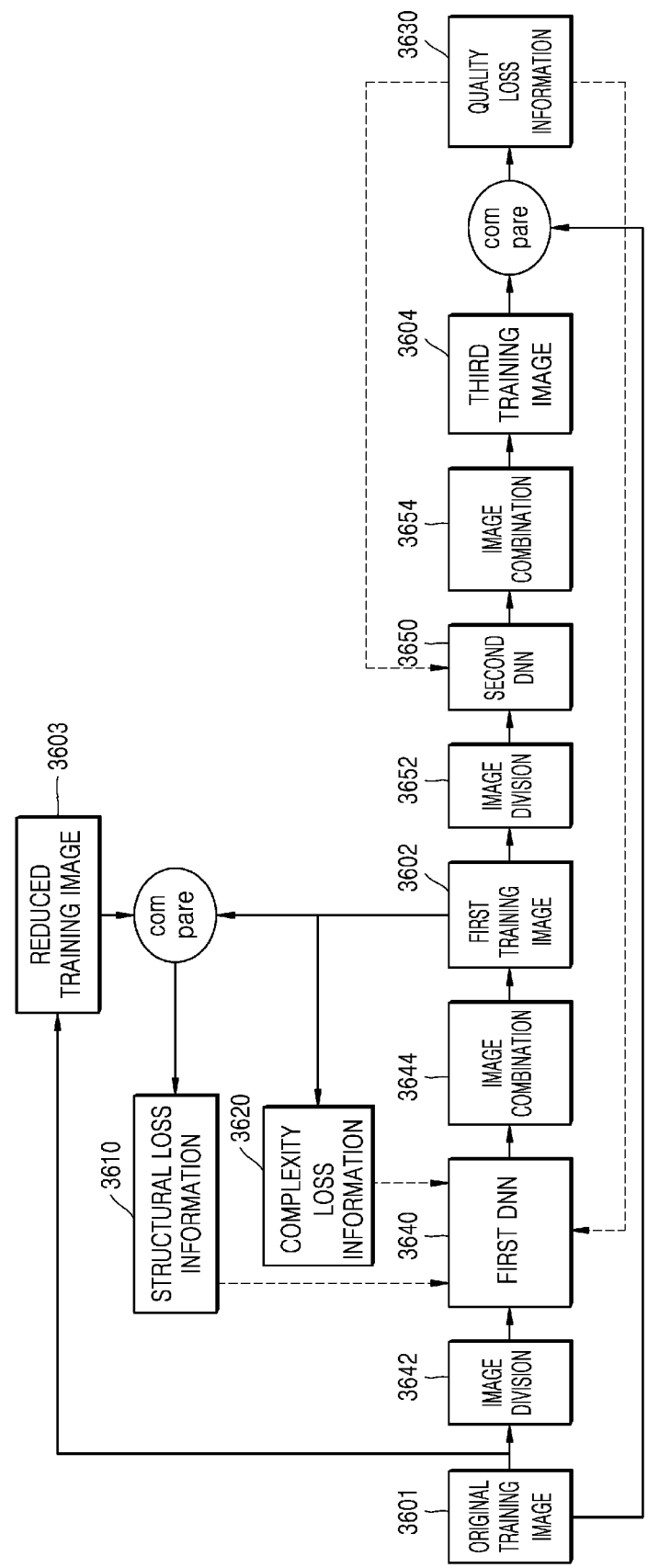
FIG. 36 is a diagram of a method of jointly training a first DNN and a second DNN, according to an embodiment.

FIG. 36 is a diagram of a method of jointly training a first DNN and a second DNN, according to an embodiment. Hereinafter, a method of jointly training a first DNN 3640 and a second DNN 3650 will be described with reference to FIG. 36.

Training processes shown in FIG. 36 are almost the same as those shown in FIG. 9, but are different from those of FIG. 9 in that: i) an original training image 3601 passes through an image division process 3642 before being input to the first DNN 3640; ii) a first training image 3602 is obtained via image combination 3644 regarding second intermediate images output from the first DNN 3640; iii) the first training image 3602 (or a second training image) passes through an image division process 3652 before being input to the second DNN 3650; and iv) a third training image 3604 is obtained via image combination 3654 regarding the second intermediate images output from the second DNN 3650.

As described above with reference to FIG. 9, structural loss information 3610, complexity loss information 3620, and quality loss information 3630 may be used to train the first DNN 3640, and the quality loss information 3630 may be used to train the second DNN 3650.

The first DNN 3640 may update a parameter such that final loss information (see Equation (1)) determined based on the structural loss information 3610, the complexity loss information 3620, and the quality loss information 3630 is reduced or minimized. Also, the second DNN 3650 may update a parameter such that the final loss information (see Equation (1)) determined based on the quality loss information 3630 is reduced or minimized.

As described above, a plurality of pieces of DNN setting information stored in the AI decoding apparatus 1200 and AI encoding apparatus 2700 may be mapped to the resolution ratios of the first image 115 in the horizontal direction and vertical direction. Because resolution ratios in a horizontal direction and vertical direction are determined according to the numbers of first intermediate images input to the first DNN 3640 and second DNN 3650, and the numbers of second intermediate images output from the first DNN 3640 and second DNN 3650, the first DNN 3640 and the second DNN 3650 are jointly trained while the numbers of first intermediate images to be obtained via the image division 3642 and 3652, and the numbers of second intermediate images to be used during the image combination 3644 and 3654 are fixed, thereby obtaining the DNN setting information mapped to certain resolution ratios of the first image 115 in the horizontal direction and vertical direction.

Although not illustrated, as described with reference to FIG. 10, the first DNN 3640 and the second DNN 3650 may be trained by a training apparatus.

The embodiments of the disclosure described above may be written as computer-executable programs or instructions that may be stored in a medium.

The medium may continuously store the computer-executable programs or instructions, or temporarily store the computer-executable programs or instructions for execution or downloading. Also, the medium may be any one of various recording media or storage media in which a single piece or plurality of pieces of hardware are combined, and the medium is not limited to a medium directly connected to a computer system, but may be distributed on a network. Examples of the medium include magnetic media, such as a hard disk, a floppy disk, and a magnetic tape, optical recording media, such as CD-ROM and DVD, magneto-optical media such as a floptical disk, and ROM, RAM, and a flash memory, which are configured to store program instructions. Other examples of the medium include recording media and storage media managed by application stores distributing applications or by websites, servers, and the like supplying or distributing other various types of software.

A DNN model related to the DNN described above may be implemented by a software module. When the DNN model is implemented by a software module (for example, a program module including instructions), the DNN model may be stored in a computer-readable recording medium.

Also, the DNN model may be a part of the AI decoding apparatus 200 or 1200 or AI encoding apparatus 600 or 2700 described above by being integrated in a form of a hardware chip. For example, the DNN model may be manufactured in a form of an exclusive hardware chip for AI, or may be manufactured as a part of an existing general-purpose processor (for example, CPU or application processor) or a graphic-exclusive processor (for example, GPU).

Also, the DNN model may be provided in a form of downloadable software. A computer program product may include a product (for example, a downloadable application) in a form of a software program electronically distributed through a manufacturer or an electronic market. For electronic distribution, at least a part of the software program may be stored in a storage medium or temporarily generated. In this case, the storage medium may be a server of the manufacturer or electronic market, or a storage medium of a relay server.

While one or more embodiments of the disclosure have been described with reference to the figures, it will be understood by those of ordinary skill in the art that various changes in form and details may be made therein without departing from the spirit and scope as defined by the following claims.

What is claimed is:

1. An artificial intelligence (AI) decoding apparatus comprising:
    a memory storing instructions; and
    a processor configured to execute the instructions to:
        obtain AI data related to AI down-scaling of an original image and image data generated as a result of encoding a first image,
        obtain a second image corresponding to the first image by decoding the image data,
        determine a resolution ratio in a horizontal direction and a resolution ratio in a vertical direction between the original image and the first image, based on the AI data, and
        obtain, by an up-scaling deep neural network (DNN), a third image in which a resolution in at least one of a horizontal direction and a vertical direction is increased from the second image based on the resolution ratio in the horizontal direction and the resolution ratio in the vertical direction,
    wherein the resolution ratio in the horizontal direction and the resolution ratio in the vertical direction are determined as different values.

2. The AI decoding apparatus of claim 1, wherein the processor is further configured to execute the instructions to:
    obtain, from the second image, a plurality of first intermediate images having a resolution lower than a resolution of the second image,
    obtain a plurality of second intermediate images output from the up-scaling DNN, based on the plurality of first intermediate images, and
    obtain the third image having a resolution greater than a resolution of the plurality of second intermediate images by combining the plurality of second intermediate images.

3. The AI decoding apparatus of claim 2, wherein the processor is further configured to execute the instructions to obtain the plurality of first intermediate images including a number of pixel lines from among a plurality of pixel lines included in the second image.

4. The AI decoding apparatus of claim 2, wherein the processor is further configured to execute the instructions to obtain the third image by alternately connecting pixels included in the plurality of second intermediate images.

5. The AI decoding apparatus of claim 2, wherein the processor is further configured to execute the instructions to:
    determine a number of the plurality of first intermediate images and a number of the plurality of second intermediate images, based on the resolution ratio in the horizontal direction and the resolution ratio in the vertical direction, and
    obtain DNN setting information that allow the up-scaling DNN to output the determined number of the plurality of second intermediate images by processing the determined number of the plurality of first intermediate images.

6. The AI decoding apparatus of claim 5, wherein the up-scaling DNN comprises a plurality of convolution layers, and
    based on the obtained DNN setting information being set in the up-scaling DNN, a number of filter kernels of a last convolution layer from among the plurality of convolution layers is determined to be the same as the number of the plurality of second intermediate images.

7. The AI decoding apparatus of claim 2, wherein the processor is further configured to execute the instructions to:
    determine a number of operations of the up-scaling DNN based on the resolution ratio in the horizontal direction and the resolution ratio in the vertical direction, and
    obtain the third image by combining the plurality of second intermediate images output from the up-scaling DNN as a result of operations performed based on the number of operations,
    wherein the up-scaling DNN outputs a pre-determined number of the plurality of second intermediate images by processing a pre-determined number of the plurality of first intermediate images.

8. The AI decoding apparatus of claim 7, wherein,
    based on the up-scaling DNN operating to increase one of a resolution of the second image in a horizontal direction and a resolution of the second image in a vertical direction by n times, the processor is further configured to execute the instructions to determine the number of operations of the up-scaling DNN to be a+b when the resolution ratio in the horizontal direction is $1/n^a$ and the resolution ratio in the vertical direction is $1/n^b$,
    wherein n is a natural number, and
    wherein a and b are each an integer equal to or greater than 0.

9. The AI decoding apparatus of claim 7, wherein the processor is further configured to execute the instructions to:
    combine the plurality of second intermediate images obtained as a result of a previous operation of the up-scaling DNN while the up-scaling DNN operates based on the determined number of operations, and
    input the plurality of first intermediate images obtained from an image to which the plurality of second intermediate images are combined to the up-scaling DNN.

10. The AI decoding apparatus of claim 1, wherein the processor is further configured to execute the instructions to:
    scale the second image, and
    obtain a final third image by adding the scaled second image and the third image.

11. An artificial intelligence (AI) decoding apparatus comprising:
    a memory storing instructions; and
    a processor configured to execute the instructions to:
        obtain AI data related to AI down-scaling of an original image and image data generated as a result of encoding a first image,
        obtain a second image corresponding to the first image by decoding the image data, determine a resolution ratio in a horizontal direction and a resolution ratio in a vertical direction between the original image and the first image, based on the AI data, and obtain, by an up-scaling deep neural network (DNN), a third image in which a resolution in at least one of a horizontal direction and a vertical direction is increased from the second image based on the resolution ratio in the horizontal direction and the resolution ratio in the vertical direction, wherein the resolution ratio in the horizontal direction and the resolution ratio in the vertical direction are determined as different values, and wherein the processor is further configured to obtain, based on information included in the AI data, DNN setting information corresponding to the up-scaling DNN for up-scaling the second image to the third image.

* * * * *